US009382352B2

(12) United States Patent
Chisholm et al.

(10) Patent No.: US 9,382,352 B2
(45) Date of Patent: Jul. 5, 2016

(54) POLYMERS DERIVED FROM PLANT OIL

(75) Inventors: Bret Ja Chisholm, West Fargo, ND (US); Samim Alam, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 400 days.

(21) Appl. No.: 13/469,940

(22) Filed: May 11, 2012

(65) Prior Publication Data
US 2012/0316309 A1 Dec. 13, 2012

Related U.S. Application Data

(63) Continuation-in-part of application No. PCT/US2010/056580, filed on Nov. 12, 2010.

(60) Provisional application No. 61/608,980, filed on Mar. 9, 2012, provisional application No. 61/281,073, filed on Nov. 12, 2009.

(51) Int. Cl.
C08F 16/36 (2006.01)
C08F 22/20 (2006.01)

(52) U.S. Cl.
CPC .............. *C08F 22/20* (2013.01); *C08F 2800/20* (2013.01); *C08F 2810/30* (2013.01)

(58) Field of Classification Search
CPC ...... C08F 22/20; C08F 116/14; C08F 216/18; C08F 8/06; C08F 8/08; C08F 8/10; C08F 2800/20; C08F 2810/30
See application file for complete search history.

(56) References Cited

U.S. PATENT DOCUMENTS

| 2,335,651 | A | | 11/1943 | D'Alelio | |
|---|---|---|---|---|---|
| 2,692,256 | A | * | 10/1954 | Bauer et al. | 526/320 |
| 4,006,270 | A | | 2/1977 | Morgan | |
| 4,010,126 | A | | 3/1977 | Kuzma | |
| 4,215,024 | A | * | 7/1980 | Gomez et al. | 524/313 |
| 4,367,311 | A | * | 1/1983 | Brandstetter et al. | 525/68 |
| 4,436,773 | A | * | 3/1984 | Yamabe et al. | 427/380 |
| 4,616,685 | A | | 10/1986 | Harakon et al. | |
| 4,617,238 | A | | 10/1986 | Crivello et al. | |
| 4,975,488 | A | | 12/1990 | Furukawa et al. | |
| 5,196,491 | A | | 3/1993 | Cho et al. | |
| 5,556,930 | A | | 9/1996 | Brehm et al. | |
| 5,576,407 | A | | 11/1996 | Kroner et al. | |
| 5,605,941 | A | * | 2/1997 | Steinmann et al. | 522/170 |
| 5,731,450 | A | | 3/1998 | Alexander et al. | |
| 8,785,582 | B2 | | 7/2014 | Hojo et al. | |
| 2005/0187414 | A1 | * | 8/2005 | Faust et al. | 568/687 |
| 2007/0259166 | A1 | | 11/2007 | Killilea et al. | |
| 2007/0293652 | A1 | | 12/2007 | Schwendeman et al. | |
| 2008/0146738 | A1 | | 6/2008 | Dershem | |
| 2008/0234447 | A1 | | 9/2008 | Shaffer et al. | |
| 2009/0029162 | A1 | | 1/2009 | Ukei et al. | |
| 2009/0208872 | A1 | | 8/2009 | Wolf et al. | |
| 2011/0057340 | A1 | | 3/2011 | Perichaud et al. | |
| 2013/0245189 | A1 | | 9/2013 | Hojo et al. | |
| 2013/0320255 | A1 | | 12/2013 | Chisholm et al. | |
| 2014/0296444 | A1 | | 10/2014 | Chisholm et al. | |

FOREIGN PATENT DOCUMENTS

| EP | 406977 A1 * | 1/1991 |
|---|---|---|
| GB | 2239248 A | 6/1991 |
| JP | 2002-155114 A | 5/2002 |
| WO | 2009/111722 A2 | 9/2009 |
| WO | 2009/111722 A3 | 12/2009 |
| WO | WO 2010/035903 A1 | 4/2010 |
| WO | 2011/060293 A1 | 5/2011 |
| WO | WO 2011/060293 A1 | 5/2011 |
| WO | WO 2013/173734 A1 | 11/2013 |

OTHER PUBLICATIONS

Meier et al., "Plant Oil Renewable Resources as Green Alternatives in Polymer I Science," Chem. Soc. Rev., 2007; 36: 1788-1802.*
Yagci et al; Macromolecules; 1999, 32, 6367-6370.*
Extended European Search Report, issued on May 16, 2014, in connection with related European Patent Application No. EP 10830812.3, filed Nov. 12, 2010; 6 pages.
Alam, et al., "Synthesis and characterization of a novel epoxy-functional polymer from soybean oil," Oral Presentation on Mar. 28, 2011 at the 241$^{st}$ American Chemical Society National Meeting and Exposition Mar. 27-31, 2011 held in Anaheim, CA. Retrieved from the Internet on Apr. 30, 2013: abstracts.acs.org/chem/214nm/program/view.php/obj_id=68555&terms=.
Aoshima et al., "Living Cationic Polymerization of Vinyl Monomers by Organoaluminum Halides. 3. Living Polymerization of Isobutyl Vinyl Ether by Ethyldichloroaluminum in the Presence of Ester Additives," *Macromolecules*, 1989; 22(3): 1009-1013.
Aoshima et al., "A Renaissance in Living Cationic Polymerization," *Chem. Rev.*, 2009; 109: 5245-5287.
Brekke et al., "Nonconjugated Linseed Vinyl Ether by Vinyl Transetherification Preparation Procedure," *J. Am. Oil Chemists' Soc.*, 1960; 37(11): 568-570.
Brentin et al., "Rubber Compounds: A Market Opportunity Study." Omni Tech International, Ltd., Midland, MI, Sep. 2011; pp. 1-92.
Chisholm, "An investigation of the utility of novel soybean oil-based copolymers in rubber compounds," Grant Abstract, United Soybean Board 2013, Retrieved from the Internet on Apr. 30, 2013: www.soybeancheckoffresearch.org/DetailsbyPaperid.php/id_Paper=3189.
Chisholm, "Novel polymers based on soybean oil," Grant Abstract, North Dakota Soybean Council 2013. Retrieved from the Internet on Apr. 30, 2013: www.soybeancheckoffresearch.org/DetailsbyPaperid.php/id_Paper= 3090.

(Continued)

*Primary Examiner* — Karuna P Reddy
(74) *Attorney, Agent, or Firm* — Mueting, Raasch & Gebhardt, P.A.

(57) ABSTRACT

Polymers and copolymers are formed from vinylether monomers having fatty acid ester pendent groups derived from plant oils, such as soybean oil.

6 Claims, 18 Drawing Sheets

(56) References Cited

OTHER PUBLICATIONS

Chisholm, "Novel soybean oil-based polymers," Grant Abstract, North Dakota Soybean Council 2011. Retrieved from the Internet on Apr. 30, 2013: www.soybeancheckoffresearch.org/DetailsbyPaperid.php/id_Paper=1569.

Dufek et al., "Reactions of Unsaturated Fatty Alcohols. VII. Polymerization of Vinyl Ethers Catalyzed by Stannic and Ferric Chlorides," *J. Am. Oil Chemists' Soc.*, Jan. 1960; 37:37-40.

Dufek et al., "Reactions of Unsaturated Fatty Alcohols. XIII. Copolymers of Unsaturated Fatty Vinyl Ethers and Cyclic Monomers," *J. Am. Oil Chemists' Soc.*, May 1962; 39: 238-241.

Eckey et al., "Production of Polyvinyl Esters by Ester Interchange," *J. Am. Oil Chemists' Soc.*, Apr. 1955; 32(4): 185-191.

Gast et al., "Reactions of Unsaturated Fatty Alcohols. IV. Oxidative Degradation of Lauryl Isopropyl Ether," *J. Org. Chem.*, Feb. 1959; 24:160-165.

Gast et al., "Reactions of Unsaturated Fatty Alcohols. VIII. Preparation and Properties of Some Copolymers of Nonconjugated Linseed Vinyl Ether and Lower Alkyl Vinyl Ethers," *J. Am. Oil Chemists' Soc.*, Feb. 1960; 37:78-80.

International Preliminary Report on Patentability issued May 15, 2012 in regard to International Application No. PCT/US2010/056580.

International Search Report mailed Jan. 24, 2011 in regard to International Application No. PCT/US2010/056580.

Khot et al., "Development and application of triglyceride-based polymers and composites," *J. Polym. Sci., Part A: Polym. Chem.*, Oct. 17, 2001; 82(3):703-723.

Meier et al., "Plant Oil Renewable Resources as Green Alternatives in Polymer Science," *Chem. Soc. Rev.*, 2007; 36: 1788-1802. Available online on Jul. 23, 2007.

NDSU News, "NDSU researchers receive competitive coatings award," Apr. 1, 2011, available online: www.ndsu.edu/news/view/article/10889/. Retrieved on Apr. 30, 2013; 1 page.

Schneider et al., "Reactions of Unsaturated Fatty Alcohols. II. Polymerization of Vinyl Ethers and Film Properties of Polymers," *J. Am. Oil Chemists' Soc.*, 1957; 34(5): 244-247.

Schneider et al., "Reactions of Unsaturated Fatty Alcohols. XIV. Preparation and Properties of Styrenated Fatty Vinyl Ether Polymers," *J. Am. Oil Chemists' Soc.*, May 1962; 39: 241-244.

Teeter et al., "Reactions of Unsaturated Fatty Alcohols. I. Preparation and Properties of Some Vinyl Ethers," *J. Am. Oil Chemists' Soc.*, Sep. 1956; 33: 399-404.

Teeter et al., "Promising Materials for Protective Coatings. Vinyl Ethers of Polyunsaturated Fatty Alcohols," *Ind. Eng. Chem.*, Nov. 1958; 50(11): 1703-1704.

Teeter, "Vinyl Monomers Derived from Fats and Oils," Paper presented at the $53^{rd}$ Annual Meeting of The American Oil Chemists' Society on May 7, 1963 in New Orleans, LA. Published in the *J. Am. Oil Chemists' Soc.*, Apr. 1963; 40(4): 143-156.

Wan Rosli et al., "UV Radiation Curing of Epoxidized Palm Oil-Cycloaliphatic Diepoxide System Induced by Cationic Photoinitiators for Surface Coatings," *Eur. Polym. J.*, 2003; 39(3): 593-600.

Written Opinion mailed Jan. 24, 2011 in regard to International Application No. PCT/US2010/056580.

Zlatanic et al., "Effect of Structure on Properties of Polyols and Polyurethanes Based on Different Vegetable Oils," *J. Polym. Sci., Part B: Polym. Phys.*, 2004; 42: 809-819.

Zou et al., "UV-Curable Cycloaliphatic Epoxide Based on Modified Linseed Oil: Synthesis, Characterization and Kinetics," *Macromol. Chem. Phys.*, 2005; 206(9): 967-975.

Clarient "Your universally applicable Polymer—Polyalkylen-/Polyethylenglykole". Edition 2007. Brochure. 48 pages.

International Search Report and Written Opinion for International Application No. PCT/US14/23181—Issued Nov. 28, 2014. 10 pages total.

Alam et al., "Synthesis and Characterization of a Novel Epoxy-Functional Polymer from Soybean Oil," *Polymer Preprints*, 2011; (52)1:57-58 (available Feb. 11, 2011).

International Search Report and Written Opinion for International Application No. PCT/US2014/69993—Issued Aug. 11, 2015. 10 pages.

* cited by examiner

POLYMERS DERIVED FROM PLANT OIL

This application is continuation-in-part of International Application No. PCT/US2010/056580, filed Nov. 12, 2010, which claims the benefit of U.S. Provisional Application Ser. No. 61/281,073, filed Nov. 12, 2009; and also claims the benefit of U.S. Provisional Application Ser. No. 61/608,980, filed Mar. 9, 2012, each of which is incorporated by reference herein.

GOVERNMENT FUNDING

The present invention was made with government support under Grant No. N00014-07-1-1099, awarded by the Office of Naval Research. The Government has certain rights in this invention.

BACKGROUND

Plant oil-based materials have many applications. For example, they are in use as lubricants, cosmetics, plastics, coatings, detergents, composites and drying agents. Commercial and industrial interest in plant oil-based materials is high due to the fact that plant oils are renewable resources and typically biodegradable. Soybean oil is the most widely used vegetable oil for non-food applications due to its low cost and availability.

SUMMARY OF THE INVENTION

The present invention provides vinylether monomers, as well as polymers and copolymers of vinylether monomers, wherein the vinylether monomers include fatty acid ester pendent groups derived from plant oils, such as soybean oil. Also included in the invention are methods for making the monomers and polymers, and methods of using them to produce lubricating liquids such as lubricants, oils, and gels, as well as coatings, films, elastomers, surfactants, composite materials, and the like.

In one aspect, the invention provides a polymer formed from vinyl ether monomers derived from plant oil and having the structure

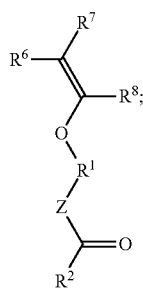

wherein $R^1$ is divalent organic group that functions as a spacer between the vinyl ether and the heteroatom; Z is a heteroatom selected from O, N or S; $R^2$ contains an aliphatic group derived from a renewable resource such as a plant oil; and $R^6$, $R^7$, and $R^8$ are each independently H or alkyl.

The polymer of the invention thus preferably includes a repeating unit having the general structure

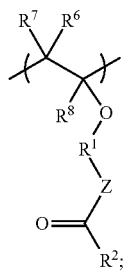

wherein $R^1$ is divalent organic group that functions as a spacer between the vinyl ether and the heteroatom; Z is a heteroatom selected from O, N or S; $R^2$ contains an aliphatic group derived from a renewable resource such as a plant oil; and $R^6$, $R^7$, and $R^8$ are each independently H or alkyl.

The plant oil is preferably a vegetable or nut oil, more preferably soybean oil. In one embodiment, the polymer is the product of a carbocationic polymerization reaction in which the polymer molecular weight increases linearly or substantially linearly with monomer conversion. In some embodiments, a plot of molecular weight as a function of monomer conversion is approximately linear. One example of this type of carbocationic polymerization reaction is a "living" or controlled carbocationic polymerization. A "living" polymerization is polymerization that occurs substantially without termination or chain transfer reactions resulting in the ability to produce polymers with controlled molecular weight and polymers and potentially copolymers with well-defined molecular architectures such as block copolymers, star polymers, telechelic polymers, and graft copolymers. Optionally, the polymerization reaction, such as the living carbocationic polymerization, occurs in the absence of a Lewis base. In another embodiment, the polymer or copolymer is the product of a free radical polymerization. Optionally, the polymer has a polydispersity index of less than 1.5. The polymer can include a plurality of monomers, such that for each of the plurality of monomers, $R^2$ is independently an aliphatic group derived from a renewable resource such as a plant oil, preferably a C8-C21 aliphatic group derived from a plant oil.

The fatty acid pendant group of the vinyl ether monomer can be derived directly or indirectly from a plant oil. For example, the vinyl ether compound can be derived from a plant oil-derived compound such as a transesterified plant oil-based long chain alkyl ester, such as a biodiesel compound, for example an alkyl soyate such as methyl soyate.

Chemical derivatives of the polymer, including but not limited to an epoxy-functional polymer, an acrylate-functional polymer and a polyol polymer, are also encompassed by the invention. An epoxy-functional polymer includes, as an $R^2$ group, at least one aliphatic group derived from a plant oil that has been functionalized to include at least one epoxide group; an acrylate functional polymer includes, as an $R^2$ group, at least one aliphatic group derived from a plant oil that has been functionalized to include at least one acrylate-functional group; and a polyol polymer includes, as an $R^2$ group, at least one aliphatic group derived from a plant oil that has been functionalized to include at least one alcohol group.

The invention further includes copolymers of the vinyl ether plant oil-derived fatty acid ester monomers described herein, such as a copolymer with a poly(ethylene glycol)-functional vinylether monomer.

In another aspect, the invention provides a method for making a polymer of the invention that includes contacting vinyl ether plant oil-derived fatty acid ester monomers with an optional organic initiator molecule, and a Lewis acid, under reaction conditions to allow polymerization of the monomer. When the organic initiator is omitted, the polymerization may, without being bound by theory, be initiated by adventitious water present in the reaction mixture. Polymerization may, or may not, be a "living" polymerization. The polymerization reaction is optionally performed in the absence of a Lewis base. In another aspect, the invention provides a method for making a polymer from plant oil that includes polymerizing vinylether plant oil-derived fatty acid ester monomers to yield a polymer having a polydispersity index of less than 2.0, preferably less than 1.5, more preferably less than 1.2. Optionally, the methods include extracting the plant oil from a plant or plant part to obtain the oil. The method optionally further includes cleaving triglycerides found in the plant oil to yield the monomers comprising vinylethers of plant oil-derived fatty acid esters. Cleavage can be accomplished using base-catalyzed transesterification.

In a further aspect, the invention provides a method for producing a polymer that includes contacting vinylether plant oil-derived fatty acid ester monomers with an optional initiator to form a reaction mixture; contacting the reaction mixture with a co-initiator, e.g., a Lewis acid, to initiate a polymerization reaction under conditions and for a time to allow polymerization to proceed; and terminating the polymerization reaction to yield the polymer. In another aspect, the invention provides a method for producing a copolymer that includes contacting vinylether plant oil-derived fatty acid ester monomers with at least one additional monomer and an optional initiator to form a reaction mixture; contacting the reaction mixture with a co-initiator, e.g., a Lewis acid, to initiate a polymerization reaction under conditions and for a time to allow polymerization to proceed; and terminating the polymerization reaction to yield the copolymer. An exemplary additional monomer is a vinylether monomer such as poly(ethylene glycol)-functional vinylether monomer or tri(ethylene glycol) ethyl vinyl ether. Another exemplary additional vinylether monomer is cyclohexyl vinyl ether. Polymerization can take place at a temperature less than 10° C.; preferably less than 5° C., more preferably at about 0° C. The plant oil monomers are preferably vegetable oil or nut oil monomers, more preferably soybean oil monomers. In a preferred embodiment, the first initiator includes 1-isobutoxyethyl acetate and the co-initiator includes ethyl aluminum sesquichloride.

Also included in the invention is a polymer or copolymer produced by a method described herein, as well a composition that includes the polymer or copolymer. The composition can be an uncured composition or a cured composition; it can be an oil, a lubricant, a detergent, a coating, a gel, a surfactant, a film, elastomer or a composite, without limitation. Also included in the invention is an article, surface or substrate that includes a polymer or copolymer, cured or uncured, as described herein, such as, without limitation, a coated article, surface or substrate, or an article formed from a composite.

DETAILED DESCRIPTION OF ILLUSTRATIVE EMBODIMENTS

Figure 1A:
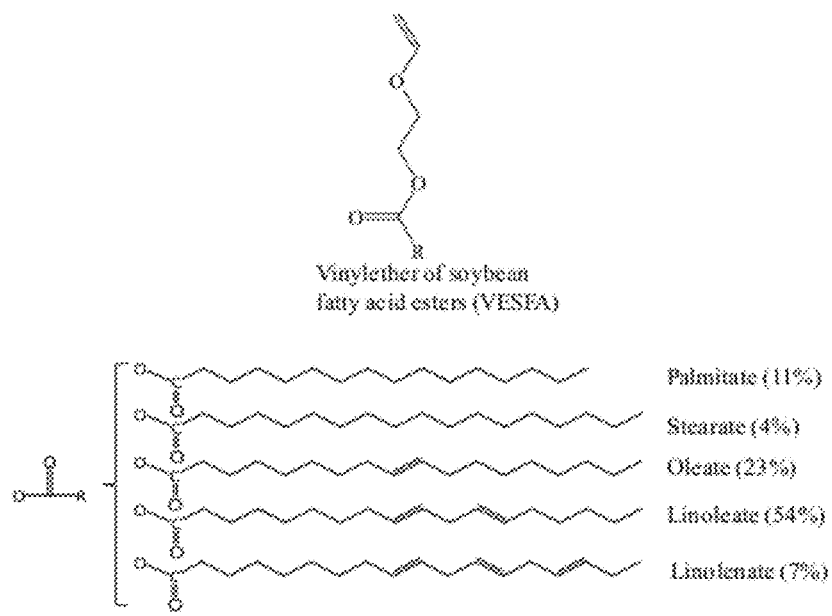
FIG. 1 shows (A) an exemplary monomeric vinyl ether of a fatty acid ester; (B) an exemplary polymer of a vinyl ether of soybean oil fatty acid ester; (C) an exemplary polymer of vinyl ether of soybean oil fatty acid esters (polyVESFA); and (D) an exemplary epoxidized polymer of vinyl ether of soybean oil fatty acid esters (E-polyVESFA).

The present invention provides vinylether monomers, as well as polymers and copolymers of vinylether monomers, wherein the vinylether monomers include fatty acid ester pendent groups derived from plant oils, such as soybean oil. Also included in the invention are methods for making the monomers and polymers, and methods of using them to produce lubricating liquids such as lubricants, oils, and gels, as well as coatings, films, elastomers, surfactants, composite materials, and the like. Articles, coatings, films, elastomers, detergents, composites, oils, gels and lubricants that include monomers or polymers of the invention, cured or uncured, as well as methods for making and using them, also provided by the invention.

An illustrative embodiment of the plant oil polymer of the invention is referred to herein as a polymer of a vinyl ether of soybean oil fatty acid esters (polyVESFA), although it should be understood that the polymer of the invention is not limited to a polymer produced from soybean oil. As noted elsewhere herein, any plant oil can be used, for example corn oil. The various methods and uses described herein, therefore, although described for convenience with reference to an embodiment of the polymer derived from soybean oil, apply generally to embodiments derived from any suitable plant oil. Thus, in one embodiment, the exemplary polyVESFA is synthesized from monomers derived from the transesterification of soybean oil (the exemplary plant oil) with ethylene glycol monovinylether. These exemplary monomers are referred to herein as vinyl ethers of soybean oil fatty acid esters (VESFA). Because soybean oil contains five different fatty acids (stearic acid, oleic acid, linoleic acid, palmitic and linolenic acid) the vinylether monomers produced by transesterification of soybean oil include a mixture of vinylethers of stearic acid, oleic acid, linoleic acid, palmitic acid and linolenic acid esters. The resulting polymer, polyVESFA, is heterogeneous in the sense that it contains monomers derived from all five fatty acids. PolyVESFA can be produced, for example, using carbocationic polymerization. Alternatively, polyVESFA can be produced, for example, using free radical polymerization.

The polymer of the invention can be derivatized. For example, the polymer can be subjected to epoxidation and optionally subjected to epoxy-amine curing, epoxy-anyhydride curing, cationic photocuring, and/or converted to a polyol or component for use in polyurethane; it can function as an elastomeric alcohol. The polymer can be made acrylate-functional, sulfonated to form an ionomer, vulcanized, subjected to a Diels-Alder reaction to form a film, cured to a film with a thiol using thio-ene chemistry, cured with a peroxide, or it can be air-dried under conditions to initiate crosslinking or exposed to radiation, preferably UV radiation.

Plant oils that can be used to form the monomers and polymers of the invention include vegetable oils, such soybean oil, linseed oil, tung oil, oiticica oil, perilla oil, safflower oil and corn oil; oil from trees or wood pulp such as tall oil and palm oil, or nut-based oils such as cashew oil. The vegetable oils include at least one triglyceride and contain fatty acids such as at least one of oleic acid, stearic acid, linoleic acid, linolenic acid, palmitic acid, lauric acid, myristic acid, arachidic acid, and palmitoleic acid.

Vinyl ether monomers provided by the invention include vinyl ethers of plant oil-derived fatty acids, more particularly, vinylethers of soybean oil-derived fatty acids (VESFA). A preferred monomer has the structure $R^6R^7C=C(R^8)-O-R^1-Z-C(O)-R^2$, wherein $R^1$ is divalent organic group that functions as a spacer between the vinyl ether and the heteroatom; Z is a heteroatom selected from O, N or S; $R^2$ contains an aliphatic group derived from a renewable resource such as a plant oil, such as soybean oil; and $R^6$, $R^7$, and $R^8$ are each independently H or alkyl.

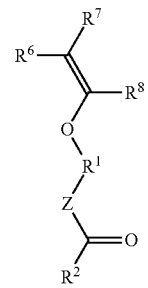

A particularly preferred monomer has the structure $CH_2=CH-O-R^1-Z-C(O)-R^2$.

The spacer, $R^1$, can be a branched or unbranched hydrocarbon having 1 to 40 or more carbon atoms; it may be substituted or unsubstituted at one or more sites; it may be saturated or unsaturated at one or more sites; it may contain one or more monocyclic or polycyclic divalent ring structures (aliphatic or aromatic); and it may contain one or more divalent functionalities such as ether, thioether, ester, thioester, amine and amido.

In one embodiment, the spacer $R^1$ is $(CR^3R^4)_m$ wherein, for each instance of m, each of $R^3$ and $R^4$ is independently selected from H, methyl, ethyl, propyl, hydroxy, methyl, methoxy, aryl, and halo, including substituted forms thereof; and wherein m is 1 to 10, more preferably m=1, 2, 3, 4 or 5.

In another embodiment, the spacer $R^1$ is $(CR^3R^4)_n-X-(CR^3R^4)_p$ wherein n and p are each independently 0, 1, 2, 3, 4 or 5; X is O (ether), C(O) (carbonyl), OC(O) (ester), C(O)O (ester), S (thioether), OS(O) (thioester), S(O)O (thioester), $N(R^5)$ (a secondary tertiary amine, wherein $R^5$ is H or an organic substituent), N(H)C(O) (amide) C(O)N(H) (amide), or a substituted unsubstituted monocyclic or polycyclic cycloaliphatic or aromatic moiety, preferably cyclohexyl or benzyl; and $R^3$ and $R^4$ are independently selected from H, methyl, ethyl, propyl, hydroxy, methyl, methoxy, aryl, and halo, including substituted forms thereof. Monomers having a spacer ($R^1$) that contains a cycloaliphatic moiety may be expected to be more rigid, which may increase the glass transition temperature of a polymer into which it is incorporated, a property that would be desirable for many applications.

$R^2$ is any aliphatic moiety obtained from a plant oil. $R^2$ is preferably a C8-C21 aliphatic group, more preferably a C8-C21 alkyl group or a C8-C21 alkenyl group, even more preferably a linear C8-C21 alkyl group or a linear C8-C21 alkenyl group. The aliphatic group preferably includes a linear chain of 8, 9, 10, 11, 12, 13, 14, 15, 16, 17, 18, 19, 20, 21 or 22 carbon atoms, and preferably contains 0 (saturated), 1 (monounsaturated), 2 or 3 double bonds. Preferred polymers, co-polymers, and polymeric materials are those derived from a preferred monomer.

The monomer of the invention may contain an ester linkage (in embodiments where Z=O), an amide linkage (in embodiments where Z=N) or a thioester linkage (in embodiments where Z=S). Embodiments having an amide linkage may be expected to exhibit certain advantages with respect to thermal and mechanical properties due to the introduction of hydrogen bonding via the amide nitrogen.

Exemplary monomers (see, e.g., FIG. 1A), wherein $R^2$ is derived from a plant oil, are shown below.

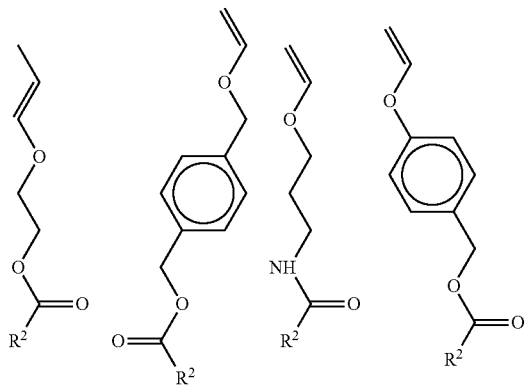

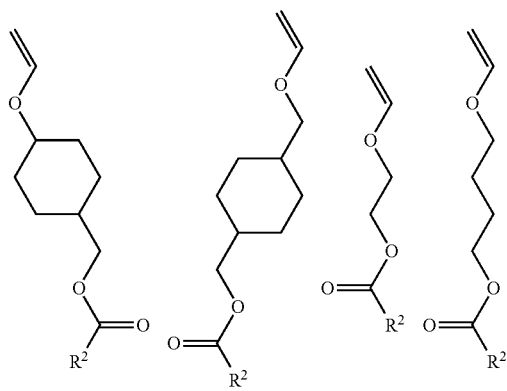

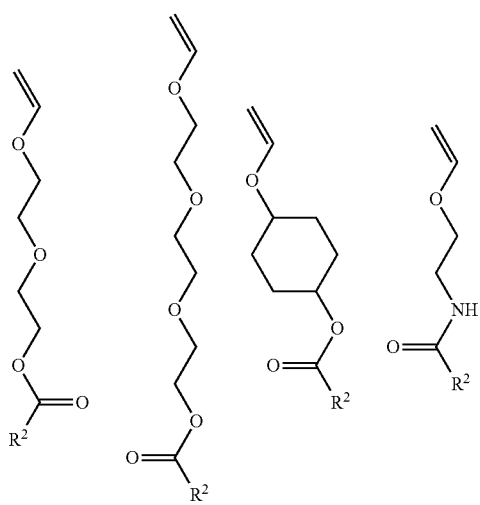

-continued

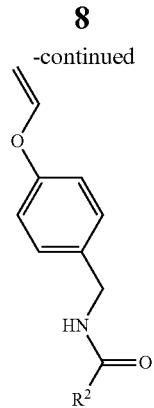

As used herein, the terms "aliphatic" or "aliphatic group" mean a saturated or unsaturated linear (i.e., straight chain), cyclic, or branched hydrocarbon group. The hydrocarbon or hydrocarbon group can be substituted or unsubstituted. The term "aliphatic" encompasses monovalent and divalent aliphatic groups, including alkyl (e.g., —CH$_3$) (or alkylene if within a chain such as —CH$_2$—), alkenyl (or alkenylene if within a chain), and alkynyl (or alkynylene if within a chain) groups, as well as substituted forms thereof, for example.

The terms "alkyl" or "alkyl group" mean a saturated linear or branched hydrocarbon group including, for example, methyl, ethyl, isopropyl, t-butyl, amyl, heptyl, dodecyl, octadecyl, amyl, 2-ethylhexyl, and the like, as well as their divalent counterparts. "Alkyl" and "alkylene" are also meant to include substituted alkyls and alkylenes. Suitable substituents include aryl groups (which may themselves be substituted), as in the case where the "alkyl" is a phenyl-substituted methyl group (e.g., a benzyl moiety). Other suitable substituents include heterocyclic rings (saturated or unsaturated and optionally substituted), hydroxy groups, alkoxy groups (which is meant to include aryloxy groups (e.g., phenoxy groups)), thiol groups, alkylthio groups, arylthio groups, amine groups (which is meant to include unsubstituted, monosubstituted, or disubstituted (e.g., with aryl or alkyl groups) amine groups), carboxylic acid groups (which is meant to include COOH groups as well as carboxylic acid derivatives, e.g., carboxylic acid esters, amides, etc.), phosphine groups, sulfonic acid groups, halogen atoms (e.g., F, Cl, Br, and I), and the like. Further, alkyl groups bearing one or more alkenyl or alkynyl substituents (e.g., a methyl group itself substituted with a prop-1-en-1-yl group to produce a but-2-en-1-yl substituent or a methyl group itself substituted with a vinyl group to produce an allyl substituent) are meant to be included in the meaning of "alkyl."

The terms "alkenyl" or "alkenyl group: mean an unsaturated, linear or branched monovalent or divalent hydrocarbon group with one or more olefinically unsaturated groups (i.e., carbon-carbon double bonds), such as a vinyl group. Alkenyl groups include, for example, ethenyl, propenyl, butenyl, 1-methyl-2-buten-1-yl, and the like.

The term "alkynyl group" means an unsaturated, linear or branched monovalent or divalent hydrocarbon group with one or more carbon-carbon triple bonds. Representative alkynyl groups include, but are not limited to, ethynyl, 2-propynyl (propargyl), 1-propynyl, and the like.

The term "aliphatic" also encompasses monovalent or divalent cyclic hydrocarbons such as cycloaliphatic groups or heterocyclic groups. The term "cycloaliphatic" refers to a cyclic or polycyclic hydrocarbon group, which may have properties resembling those of linear aliphatic groups. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. The term "cycloaliphatic" also includes aliphatic rings that are fused to one or more aromatic or nonaromatic rings, such as decahydronaphthyl or tetrahydronaphthyl, where the radical or point of attachment is on the aliphatic ring. The term "heterocyclic group" means a cyclic or polycyclic closed ring hydrocarbon in which one or more of the atoms in the ring is an element other than carbon (e.g., nitrogen, oxygen, sulfur, etc.).

Unless otherwise specified, an aliphatic group can contain 1 or 2 or 3 or 4, and so on, up to 38 or 39 or 40 carbon atoms; that is, 1 to 40 carbon atoms. In certain embodiments, aliphatic groups contain 1 to 20 carbon atoms. In certain embodiments, aliphatic groups contain 2 to 20 carbon atoms. In certain embodiments, aliphatic groups contain 1 to 12 carbon atoms, or 1 to 8 carbon atoms, or 1 to 6 carbon atoms, 1 to 5 carbon atoms, 1 to 4 carbon atoms, 1 to 3 carbon atoms, or 1 to 2 carbons atoms. Exemplary aliphatic groups include, but are not limited to, linear or branched alkyl, alkylene, alkenyl, and alkynyl groups, and hybrids thereof such as (cycloalkyl)alkyl, (cycloalkenyl)alkyl or (cycloalkyl)alkenyl.

The term "unsaturated", as used herein, means that a moiety has one or more double or triple bonds.

An aliphatic group may be unsubstituted, or optionally substituted with one or more substituents. "Substituted" means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable substituents include, but are not limited to, alkyl, alkenyl, alkynyl, cycloalkyl, heterocycloalkyl, aryl, heteroaryl, aroyl, halo (e.g., F, Cl, Br and I), hydroxy, oxo, nitro, alkoxy, amino, amido, imino, azido, mercapto, acyl, carbamoyl, carboxy, carboxamido, amidino, guanidino, thiol, alkylthio, arylthio, sulfonyl, sulfinyl, sulfonamido, phosphine, formyl, cyano, and ureido groups.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The terms "aromatic," "aromatic group," "aryl" and "aryl group" mean a mono- or polynuclear aromatic hydrocarbon group. These hydrocarbon groups may be substituted with heteroatoms, which can be in the form of functional groups. The term "aromatic" or "aryl" used alone or as part of a larger moiety as in "aromatic hydrocarbon," "aralkyl," "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring" or "aromatic ring." In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like.

In describing substituents, the term "radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent.

The term "heteroatom" means an element other than carbon (e.g., nitrogen, oxygen, sulfur, chlorine, etc.). A "hetero-" moiety as described herein, such as a heteroaliphatic group, a heterocyclic group and the like, refers to a moiety having, in place of one or more carbon atoms, a heteroatom independently selected from nitrogen, oxygen, or sulfur. Examples of saturated or partially unsaturated heterocyclic groups include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

Preferably, the monomer is derived from a vegetable or a nut oil; more preferably, it is a derivative of one of the plant fatty acids found in soybeans: stearic acid, oleic acid, palmitic, linoleic acid or linolenic acid. The fatty acid pendant group of the vinyl ether monomer can be derived directly or indirectly from a plant oil. For example, the vinyl ether compound can be derived from a plant oil-derived compound such as a transesterified plant oil-based long chain alkyl ester, such as a biodiesel compound, for example an alkyl soyate such as methyl soyate.

In one embodiment, monomers are synthesized using base-catalyzed transesterification of a plant oil, such as soybean oil, with ethylene glycol vinyl ether, propylene glycol vinyl ether, isopropylene glycol vinyl ether, butylene glycol vinyl ether or iso-butylene glycol vinyl ether. The base can be potassium hydroxide, sodium hydroxide, or any convenient base. Ethylene glycol vinyl ether and butylene glycol vinyl ether are relatively inexpensive chemicals, and the resulting monomers are isolated in high purity. In another embodiment, the monomer is synthesized using acid-catalyzed transesterification. More generally, any convenient transesterification method can be used to generate the vinyl ether plant oil-derived fatty acid ester monomers of the invention.

Vinyl ethers synthesized from fatty alcohols have been reported by others (see additional references, supra). Fatty alcohols are typically produced from hydrogenation of fatty acids. The conversion of the fatty alcohols to the vinyl ether was done using vinylation with acetylene, and the process involved several steps. One advantage of the present invention is that the vinyl ether is produced directly from a reaction between a vinyl ether possessing a nucleophilic group and the plant oil, preferably vegetable oil, by a single-step simple nucleophilic substitution reaction similar to the process used to produce biodiesel (i.e. methyl esters of vegetable oil fatty acids). The resulting monomer is much easier and less expensive to make. The vinyl ether reactant used to produce the monomer of the invention can be a linear (branched or unbranched) aliphatic vinyl ether, or it can contain a ring structure. It can be functionalized, for example, with an alcohol (—OH), an amino (—NH$_2$) or a thiol (—SH). The vinyl ether monomers produced therefrom include an ester, an amide, or a thioester functionality, respectively. Exemplary vinyl ether reactants include 2-(vinyloxy)ethanol (Shanghai FWD Chemicals Limited), 4-(vinyloxy)butanol (BASF), 4-hydroxymethyl)cyclohexyl methyl vinyl ether (BASF), diethylene glycol monovinyl ether (BASF), as well as 3-amino propyl vinyl ether (BASF).

Figure 1B:
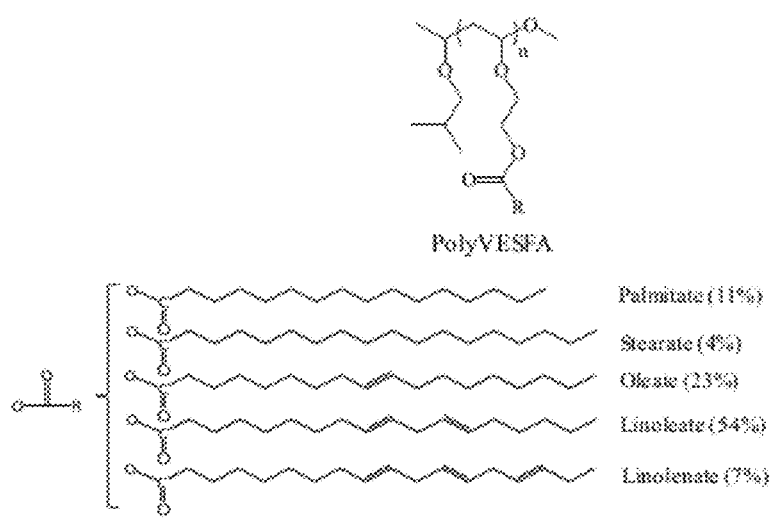

A polymer of the invention is formed from one or more of the monomers of the invention, and optionally includes other monomers, preferably other monovinylidene monomers. A preferred polymer (see, e.g., FIG. 1B) contains a repeating unit:

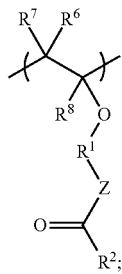

wherein $R^1$, $R^2$, $R^6$, $R^7$, $R^8$, and Z are as defined above for the monomer. The polymer is optionally activated or functionalized with the aliphatic group $R^2$ at the site of one or more double bonds, e.g., by epoxidation, acrylation, or by the incorporation of alcohol groups. The polymer preferably contains a plurality of different monomers, such that $R^2$ encompasses a plurality of aliphatic groups $R_n$, where n=1, 2, 3, 4, 5, 6, 7, 8, 9, or 10, which aliphatic groups are optionally activated. For example, when the polymer is derived from an oil such as soybean oil that contains five fatty acids, the polymer may contain monomers having five different aliphatic groups. Below is an exemplary polymer that incorporates an ethylene space between the ether and the ester functionalities, and methylene in the polymer backbone:

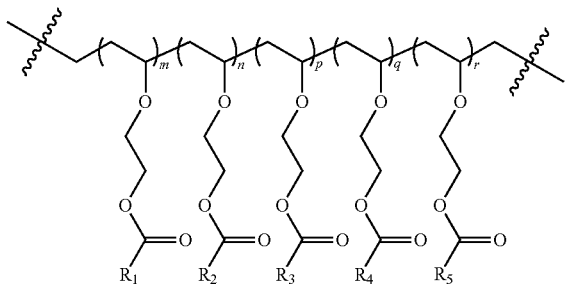

Figure 1C:
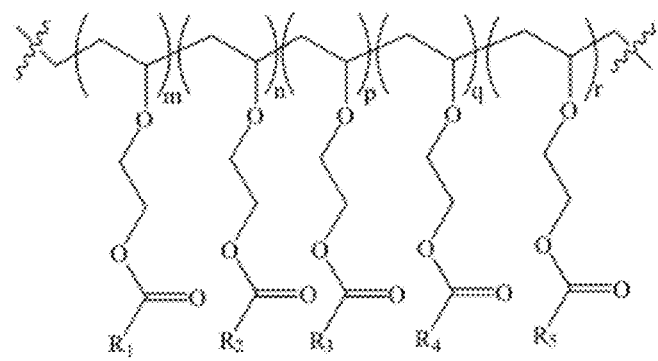

See, for example, FIG. 1C wherein m, n, p, q and r vary with the relative amount of each monomer, and $R_1$=stearate, $R_2$=oleate, $R_3$=linoleate, $R_4$=linoleate and $R_5$=linolenate. It should be understood that the five monomers are typically randomly dispersed throughout the polymer, according to their abundance. An exemplary composition of soybean oil is about 11% palmitic acid, about 4% stearic acid, about 23% oleic acid, about 54% linoleic acid, and about 7% linolenic acid.

In other embodiments of the polymer of the invention, the $R^2$ group(s) can be activated at the site of one or more double bonds, e.g., by epoxidation, acrylation, or by the incorporation of alcohol groups, as described in more detail elsewhere herein. Briefly, incorporation of acrylate groups or alcohol groups typically first involves the generation of an epoxide intermediate. The double bonds can be derivatized using epoxidation, Diels-Alder chemistry, or thiol-ene chemistry. Derivatives such as epoxy-functional, acrylate-functional and alcohol-functional (polyol) polymers are likewise included in the invention.

Monomers produced from oil in accordance with the method of the invention contain an ester, amide, or thioester group. Advantageously, these monomers can be polymerized in a controlled fashion without destroying the ester functionality. In a preferred embodiment, the method of polymerizing monomers of the invention utilizes carbocationic polymerization in which the polymer molecular weight increases linearly or substantially linearly with monomer conversion, for example, controlled or living cationic polymerization. Typically, living carbocationic polymerization utilizes an initiating system that includes an optional organic initiator molecule, a Lewis acid (i.e., a co-initiator), and a Lewis base (i.e. electron donor), and results in controlled addition of monomers to the growing chain until all monomers are essentially consumed. Side reactions, such as chain transfer and chain termination, are kept to a minimum. Living cationic polymerization of alkyl vinyl ethers is described, for example, in U.S. Pat. No. 5,196,491. Advantageously, the use of a carbocationic polymerization in which molecular weight increases linearly with increasing monomer conversion allows the viscosity of the liquid to be controlled. The concentration of the initiator affects the molecular weight of the resulting polymer; the lower the initiator concentration, i.e., the higher the [Monomer]:[Initiator] ratio, the higher the molecular weight of the resulting polymer.

The use of an organic initiator molecule is optional. When the organic initiator molecule is omitted, the polymerization may, without being bound by theory, be initiated by adventitious water present in the reaction mixture. Polymerization may, or may not, be a "living" polymerization.

Polymerization of vinyl ethers typically requires the inclusion of a Lewis base, such as ethylacetate, methylchloroacetate or methyldichloroacetate, to prevent uncontrolled polymerization. A Lewis base is typically included to mediate the polymerization reaction through coordination with the carbocation, thereby lowering its reactivity such that it undergoes propagation reactions but not chain termination or chain transfer reactions. However, it has been surprisingly discovered that the inclusion of a Lewis base during polymerization of the monomers of the invention is not required and, in fact, may slow down polymerization to the point that it does not occur. Without wishing to be bound by theory, it is thought that the monomer itself provides the carbonyl or ester group needed to mediate the polymerization reaction; in other words, it is self-mediated. Thus, the polymerization method of the invention, when based on a carbocationic polymerization in which molecular weight increases linearly with increasing monomer conversion, such as controlled or living cationic polymerization, preferably omits a Lewis base, although a Lewis base may optionally be included in the reaction mixture. Optionally, when the Lewis base is omitted, the amount of the Lewis acid is increased. The amount of Lewis acid used, which is also referred to herein as a "co-initiator," affects the polydispersity in the mixture, and can be adjusted so that it is high enough to produce polymerization, but not so high as to produce an undesirably broad molecular weight dispersion. Polydispersity indices (PDI) of under 1.3, more particularly about 1.1 or 1.2, can be achieved using the polymerization method of the present invention. In one embodiment of the polymerization method, monomers derived from plant oils, preferably vegetable oils, more preferably vinylether esters of soybean fatty acids, are contacted with a carbonyl-containing initiator compound and a Lewis acid co-initiator in a reaction mixture under conditions sufficient to generate a carbocation which initiates polymerization of the monomers. Exemplary Lewis acids include $Et_{1.5}AlCl_{1.5}$ used in the examples below, as well as $BCl_3$, $BF_3$, $AlCl_3$, $SnCl_4$, $TiCl_4$, $SbF_5$, $SeCl_3$, $ZnCl_2$, $FeCl_3$ and $VCl_4$.

An exemplary method for making a polymer from vegetable oil such as soybean oils thus involves polymerizing monomers comprising vinylether esters of vegetable oil fatty acids to yield a polymer. The method optionally includes cleaving the triglycerides present in the vegetable oil, preferably in a base-catalyzed transesterification process, to yield the monomers. In a particularly preferred embodiment of the method of making the polymer, the polymerizing step comprises a carbocationic polymerization in which molecular weight increases linearly with increasing monomer conversion, such as a controlled or living carbocationic polymerization, wherein the monomers are contacted with an optional organic initiator molecule and a Lewis acid co-initiator under reaction conditions to allow polymerization of the monomer. As noted elsewhere herein, surprisingly, the polymerization reaction can be performed in the absence of a Lewis base. The method further optionally includes extracting the vegetable oil from a plant or plant part. It is to be understood that a polymer produced by any method described herein is also provided by the invention. For example, free radical polymerization can be used to form a polymer of the invention.

Polymerization yields linear polymers which include pendent groups derived from the various fatty acids found in the oil. The polymers produced using the polymerization method are also included in the invention. When the polymerization method constitutes carbocationic polymerization in which molecular weight increases linearly with increasing monomer conversion, such as controlled or living carbocationic polymerization, the resulting polymer advantageously has a narrower molecular weight distribution compared with other polymerization methods, making the polymers especially suitable for commercial and industrial applications. The molecular weight distribution (MWD, also known as the polydispersity index, PDI) for the polymer resulting from this polymerization reaction is typically less than 2 and can be less than 1.8, less than 1.5, and is preferably less than 1.3. Thus, in one embodiment, the polymer of the invention, which is optionally activated at the site of one or more double bonds, e.g., by epoxidation, acrylation, or by the inclusion of alcohol groups; optionally has a PDI of less than 2.0, less than 1.9, less than 1.8, less than 1.7, less than 1.6, less than 1.5, less than 1.4, less than 1.3, less than 1.2, or less than 1.1. Additionally, the molecular weight of the polymers produced can be controlled by adjusting the nature or amount of the reactants or changing the reaction conditions. More particularly, the molecular weight of the polymer or copolymer can be controlled by controlling the relative amounts or concentrations of initiator, co-initiator, and monomer(s), and the time allowed for polymerization. For example, the [monomer]:[initiator] ratio can be between [10,000]:[1] to [25]:[1], with ranges bounded on the upper and lower ends by a [monomer] of any integer between 100 and 10,000. One example of a range of [monomer]:[initiator] ratios is [5000:1] to [100:1]. As a further example, the [monomer]:[co-initiator] ratio can be between [2]:[1] to [200]:[1], with ranges bounded on the upper and lower ends by a [monomer] of any integer between 1 and 200. One example of a range of [monomer]:[co-initiator] ratios is [4:1] to [20:1]. Generally, increasing the amount of Lewis acid (co-initiator) will result in an increase in the polymerization rate.

Figure 1D:
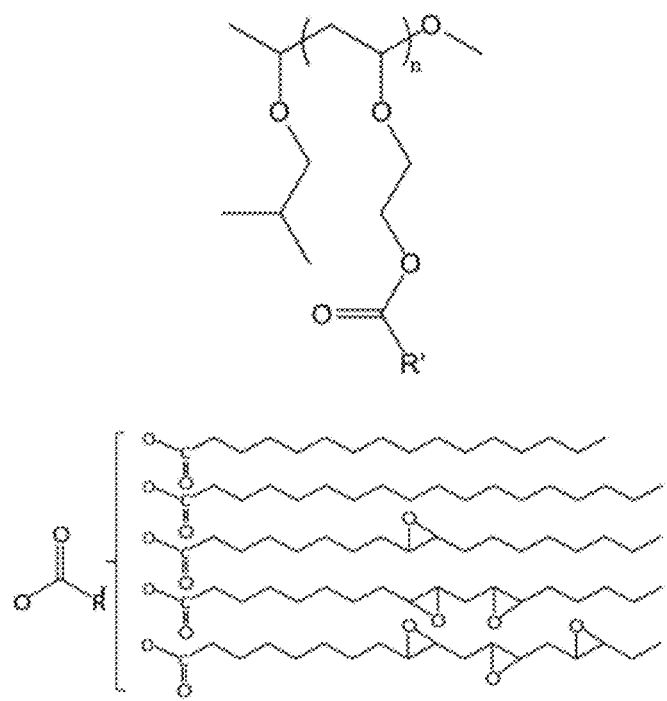

In another embodiment, the polymer of the invention contains the repeating unit shown in the structure above, as well as a single initiator fragment linked to the beginning of the polymer chain (e.g., at the left side of the structure above; see also FIG. 1D showing an initiator fragment).

In any embodiment, the polymer can be derivatized, for example epoxidized or acrylated, as described in more detail elsewhere herein.

Figure 2:
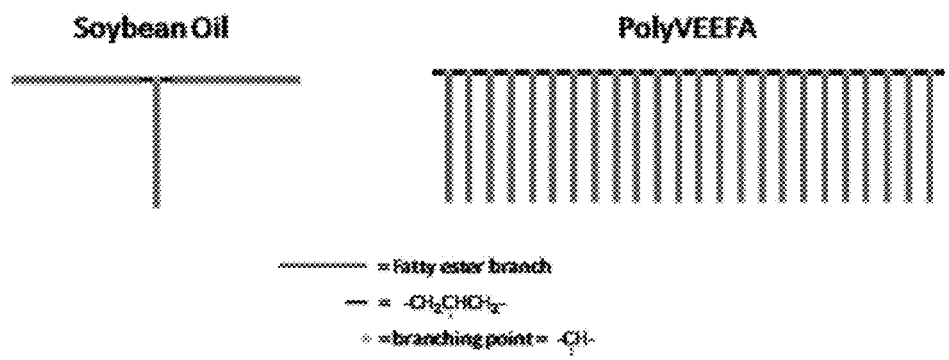
FIG. 2 is a schematic showing the difference in molecular architecture between soybean oil and polyVESFA.

Importantly, polyVESFA contains significantly more fatty ester pendent groups per molecule than soybean oil triglycerides (FIG. 2). Depending on the initiator to monomer ratio used for the polymerization of VESFA, each molecule of polyVESFA can possess from 10 s to 100 s to 1,000 s of fatty ester pendent groups as compared to just three for soybean oil triglycerides. This can be used to great advantage for many applications such as coatings, composites and lubricants. Since the unsaturated fatty acid groups in the molecule can result in a crosslink for a cured material, properties that increase with increasing crosslink density, such as modulus, hardness, chemical resistance, corrosion resistance, stain resistance, etc., are expected to be higher for materials based on polyVESFA as compared to analogous materials based on soybean oil. In addition, the higher molecular weight and higher number of fatty ester branches associated with polyVESFA are expected to reduce shrinkage upon cure which ultimately enhances adhesion in coatings and mechanical properties in composites. Advantageously, polyVESFA, like soybean oil, is a biodegradable liquid, but unlike soybean oil, it can be engineered by controlling chain length, degree of cross-linking etc., to have properties, such as viscosity, that are tailored to the particular application, significantly increasing its industrial utility.

The polymer of the invention, for example polyVESFA, can be incorporated into a liquid formulation such as a lubricant, detergent, gel or an oil. In another embodiment, the polymer can be cured and incorporated into surface treatments, coatings, films, elastomers and the like. Cross-linking and further treatment of the polymer to form a coating, film or other surface treatment can be achieved using any convenient method, for example, by air-drying or auto-oxidation (using, e.g., a cobalt, zirconium or zinc catalyst); by sulfur vulcanization (using, for example, sulfur and zinc oxide), via a Diels-Alder reaction followed by air drying, by peroxide curing, acrylate-based curing, or via thiol-ene formation and radiation curing.

The polymer of the invention, for example polyVESFA, can also be incorporated into a rubber or rubberized compound, as further described in the examples. The large number of unsaturated groups per molecule of the polymer of the invention is expected to ensure grafting of the polymer into the crosslinked rubber matrix, thereby preventing extraction of the polymer from the vulcanized rubber and enhancing mechanical properties such as modulus, strength, and abrasion resistance. In addition, and perhaps more importantly, the ability to copolymerize polyVESFA with other monomers provides a new method for tailoring basic polymer properties such as glass transition temperature, solubility parameter, tensile strength, and modulus. By proper selection of co-monomers for use in conjunction with polyVESFA copolymers, the solubility/compatibility of the copolymer with a specific type of rubber can be enhanced. In addition, appropriate functional groups can be incorporated through co-polymerization. These functional groups can be selected to provide for favorable interactions between the copolymer and specific components of the rubber compound such as filler particles. Enhancing interactions between the polymer matrix and filler particles is expected to provide dramatic enhancements in mechanical properties including modulus, tensile strength, toughness, and abrasion resistance. A practical example of the use of polyVESFA in rubber compounds is the incorporation of this polymer into rubber compounds used for making tires.

In yet another embodiment, the polymer of the invention can be incorporated into a composite material, such as a fiber-reinforced composite.

The polymers of the invention include homopolymers, heteropolymers and co-polymers, including block co-polymers, whether cross-linked or non-cross-linked, that incorporate or contain a vegetable oil or other plant oil monomer or polymer as described herein. Plant oil monomers of the invention can be copolymerized with other monomers, such as vinyl ether monomers and styrenic monomers, to create new polymers with fatty acid ester branches. Accordingly, the invention provides copolymers of plant oil vinyl ether monomers, such as VESFA, with other monomers. Copolymerization offers tremendous potential for tailoring polymer properties for a given application and is used extensively in the polymer industry. One example of a useful copolymer is a copolymer containing vinylether monomers as described herein and polyethylene glycol (PEG) vinyl ether monomers. The resulting co-polymer is amphiphilic, further expanding its industrial utility. Other examples of useful copolymers are those containing vinylether monomers as described herein, and tri(ethylene glycol) ethyl vinyl ether, or copolymers formed from copolymerization of the vinylether monomers of the invention with styrene monomers. The copolymer of the invention is not limited by monomer that can be copolymerized with the vinyl ether monomers of the invention; examples of other monomers that can be copolymerized with the vinylether monomers described herein can be found in Aoshima et al., Chem Rev 2009, 109, 5245-5287.

Copolymerization reactions can be using any suitable copolymerization technique. For example, carbocationic polymerization can be used, as described in detail herein. Another example of a polymerization reaction method that can be used is free radical polymerization. For example, the vinylether monomers of the invention can be copolymerized with other vinyl monomers that possess strongly electron withdrawing groups, such as an anhydride, e.g. maleic anyhydride, or a nitrile, such as acrylonitrile, using free radical polymerization.

The monomer or polymer of the invention can be derivatized. For example, the invention includes monomers or polymers that have been activated by epoxidation, as well as acrylate-functional and polyol functional polymers synthesized using an epoxy-functional intermediate. Thus, the monomer or polymer can be chemically treated, altered or derivatized for further use according to the desired application, for example by epoxidation, acrylation, and other chemical reactions to produce epoxidized derivatives, acrylates, polyols and the like. Treatment may or may not involve polymer cross-linking.

In one embodiment, the polymer is epoxidized at the sites of the double bonds on the aliphatic groups. For example, a soybean oil polymer, polyVESFA, is optionally epoxidized to yield epoxidized polyVESFA (E-polyVESFA; see FIG. 1D).

Epoxidized polymers of the invention (also referred to herein as epoxy-functional or epoxide-functional), such as E-polyVESFA, are well-suited for use to produce curable coating compositions. The epoxidized coating composition can be cured using radiation e.g., UV-curing (e.g., via cationic photopolymerization), using an amine curing agent, using an anhydride-functional curing agent and optionally a tertiary amine catalyst, acid catalyst, or any suitable curing agent or method. Surface coatings can be readily generated from E-polyVESFA. Compared to analogous coatings based on commercially available epoxidized soybean oil (ESO), coatings based on E-polyVESFA display many advantageous characteristics, including unexpectedly fast cure rates which are not presently fully understood, and higher modulus in the rubbery plateau region. Without wishing to be bound by theory, it is believed that the higher rubbery plateau modulus can be attributed, at least in part, to the tertiary carbon atoms present in the polymer backbone which serve as additional crosslinks in the cured crosslinked network.

In another embodiment, the invention provides an acrylate-functional polymer. For example, an epoxidized vinyl ether fatty acid ester polymer, such as E-polyVESFA, can be reacted with acrylic acid to yield an acrylate-functional polymer; see Example VIII. The acrylated polymer can be cured, for example using radiation (e.g., UV), peroxide or a thermal curing process.

In yet another embodiment, the invention provides a polyol polymer. For example, an epoxidized vinyl ether fatty acid ester polymer, such as E-polyVESFA, can be subjected to a ring-opening reaction to produce a polyol, which finds use in the preparation of, for example, polyurethanes, alkyd resins, and the like.

Vegetable oil-based materials are currently commercially available for a large number on non-food applications, such as lubricants, hydraulic fluids, coatings, drying agents, plastics, composites, insulators, soaps, candles, cosmetics, etc. Essentially, and importantly, the plant oil-derived polymers of the invention, such as polymers derived from soybean oil, can be used for any application which currently utilizes soybean oil. In this regard, see Meier et al., Chem. Soc. Rev., 2007, 36, 1788-1802, which reviews the utilization of plant oil as raw material for monomers and polymers, particularly as replacements for petrochemicals currently in use. Due to the renewable aspect of vegetable oil derivatives, many industries are trying to use more chemicals from renewable sources. The polymers of the invention can be used in any and all of these applications. Also included are liquids and solids, including articles of manufacture of any type, that contain monomers or polymers as described herein, including lubricating and hydraulic fluids, gels, plastics, composites, elastomers, polyurethanes, additives, adhesives and the like.

EXAMPLES

The present invention is illustrated by the following examples. It is to be understood that the particular examples, materials, amounts, and procedures are to be interpreted broadly in accordance with the scope and spirit of the invention as set forth herein.

Example I

Synthesis and Characterization of a Novel Epoxy-Functional Polymer from Soybean Oil A novel monomer was synthesized using base catalyzed transesterification of soybean oil with ethylene glycol vinyl ether (also referred to as 2-(vinyloxy)ethanol). Ethylene glycol vinyl ether is a relatively inexpensive chemical and the resulting monomer, which will be referred to as the "vinylether of soybean oil fatty acids (VESFA)," was able to be isolated in high purity.

A novel polyvinylether polymer containing fatty acid ester pendent groups derived from soybean oil was also synthesized. This novel polymer is referred to as the "polymer of the vinyl ether of soybean oil fatty acid esters (polyVESFA). Using a carbocationic polymerization system with tailored reactivity, VESFA was successfully polymerized to polyVESFA homopolymer.

This example also describes epoxidation of polyVESFA to produce epoxidized polyVESFA (E-polyVESFA) and the generation of surface coatings from E-polyVESFA. Additional examples describing synthesis of a monomer (Example II), polymer (Example III), epoxidized polymer (Example VI) and surface coating using the epoxidized polymer (Example VII).

Experimental

Materials.

Reagent grade ethylene glycol monovinylether (TCI America, >95%) and soybean oil (Cargill Inc.) were used as supplied. 1-isobutoxyethyl acetate was prepared according to the procedure described by Aoshima and Higashimura (*Macromolecules* 1989, 22(3):1009-13). The polymerization solvent, toluene (Sigma-Aldrich, 99.8%), was distilled over calcium hydride prior to use. $Et_{1.5}AlCl_{1.5}$ (25 wt. % in toluene) and 3-chloroperoxybenzoic acid$_{(77\% \, pure)}$ were purchased from Sigma-Aldrich and used as received. UVR 6000 and UVI 6974 were purchased from Dow Chemical and used as received.

Synthesis of the Vinyl Ether of Soybean Fatty Acid Esters (VESFA).

7.5 gm of ethylene glycol monovinylether, 7.5 gm of soybean oil, and 0.21 gm of anhydrous potassium hydroxide were combined in a 100 ml, round-bottom flask and stirred at 70° C. for 3 hours. The excess ethylene glycol monovinylether was removed by rotary evaporation of the reaction mixture at 56° C. for 10 minutes at 5 milibar pressure. The crude product was cooled to 16° C. to remove the byproduct glycerol and subsequently diluted with n-hexane. The solution was washed with deionized water and dried with anhydrous magnesium sulfate. The product monomer was recovered by rotary evaporation and drying under vacuum overnight.

Synthesis of polyVESFA.

VESFA was polymerized using a carbocationic polymerization process. The characteristics of the polymerization of VESFA monomer was determined by monitoring polymer yield and polymer molecular weight as a function of polymerization time. Prior to use, VESFA was dried with magnesium sulfate. The reaction was carried out in a dry 250 ml two neck round bottom flask partially immerged into heptanes bath at 0° C. inside a dry box. In the reaction vessel, 9.1 mg of initiator (1-isobutoxyethyl acetate) and 4 gm of VESFA monomer ($[M]_0$:$[I]_0$=200:1) were dissolved in 20 gm of toluene and solutions chilled to 0° C. The polymerization was started by the addition of 1.25 ml of ethylaluminum sesquichloride solution (25 wt. % in toluene) ($[M]_0$: $[Et_{1.5}AlCl_{1.5}]_0$=200:40) to the reaction mixture. Polymers were obtained after withdrawing known weight of aliquot at different time of intervals and terminated with chilled methanol. Each polymer was isolated and washed with methanol using centrifugation. Polymer yield was determined gravimetrically after drying the purified polymer at 40° C. under vacuum overnight. Polymer molecular weight was characterized using a high-throughput Symyx Rapid Gel Permeation Chromatography equipped with an evaporative light scattering detector (PL-ELS 1000) and polystyrene standards.

A plot of number average molecular weight obtained from gel permeation chromatograph (GPC) analysis as a function of VESFA monomer conversion yielded a straight line with a slope of 72.7, a Y-axis intercept of 3511, and correlation coefficient of 0.99. The data used to generate the plot is shown below:

| Reaction Time (hour) | % Monomer Conversion | GPC number Average Molecular Weight | PDI* |
|---|---|---|---|
| 0.32 | 14.8 | 4691 | 1.22 |
| 0.68 | 24.1 | 5243 | 1.23 |
| 0.85 | 28 | 5392 | 1.23 |
| 1.2 | 32.8 | 6008 | 1.21 |
| 1.5 | 37.9 | 6199 | 1 22 |
| 2.1 | 42.7 | 6506 | 1.25 |
| 2.6 | 47.6 | 6960 | 1.21 |
| 3.3 | 51.5 | 7285 | 1.21 |
| 4.8 | 60.8 | 8079 | 1.22 |
| 6 | 65.1 | 8388 | 1.23 |
| 9 | 74.3 | 8757 | 1.23 |

*PDI is the polydispersity index

Synthesis of E-polyVESFA.

4 gm of polyVESFA was dissolved in 80 ml of methylene chloride in a two-neck, round-bottom flask. Next, 4.73 gm of 3-chloroperoxybenzoic acid was added under vigorous stirring and the reaction allowed to occur over a 4 hour period at room temperature. The epoxidized polymer was isolated by precipitation into methanol and drying overnight under vacuum.

Preparation of Surface Coatings.

E-polyVESFA was mixed with a reactive diluent (UVR 6000) and a photoinitiator (UVI 6974) at different ratios (Table 1) to produce a series of homogeneous coating solutions. The coatings were cast over Teflon® coated glass slides using a draw down bar (BYK Gardner) to produce approximately 200 μm wet films that were subsequently cured by passing them through a F 300 UVA lamp (Fusion UV Systems, UVA light intensity ~1420 mW/cm$^2$ as measured by UV Power Puck II® from EIT Inc) equipped with a conveyer belt set at a belt speed of 24 feet/min. Coating samples were prepared using a single pass (1P) under the lamp and two passes (2P) under the lamp. Dynamic mechanical thermal analysis was conducted on coating free films using a TA800 from TA Instruments.

TABLE 1

Coatings formulations.

| Formulation | ESO (g) | E-poly VESFA (g) | UVR 6000 (g) | UVI 6974 (g) |
|---|---|---|---|---|
| Control-1 | 8.0 | — | 3.42 | 0.28 |
| Control-2 | 7.7 g | — | 3.3 | 0.55 |
| Exp-1 | — | 5.04 | 2.16 | 0.18 |
| Exp-2 | — | 6.18 | 2.65 | 0.44 |

The kinetics of photopolymerization was investigated using a Q1000 differential scanning calorimeter equipped with a photocalorimetric accessory (photo DSC). Experiments were performed at a UV light intensity of 50 mW/cm$^2$ and a temperature of 30° C. Samples were equilibrated for 1 minute and exposed to UV light for 7 minutes followed by a temperature ramp from 0° C. to 200° C. at a ramp rate of 10° C./min.

Real time infrared spectroscopy (RTIR) experiments were carried out using a Nicolet Magna-IR 850 spectrometer Series II fitted with a 100 W DC UVA mercury vapor lamp from LESCO Super Spot MK II. Samples were spin coated and exposed to UVA light for 3 minutes followed by 2 minutes of dark cure. FTIR spectra were taken at a rate of 1 spectrum/s with a resolution of 4 cm$^{-1}$. Conversion of epoxy groups was monitored after integrating the base line in between 800 cm$^{-1}$ to 860 cm$^{-1}$.

Results and Discussion.

Figure 3:
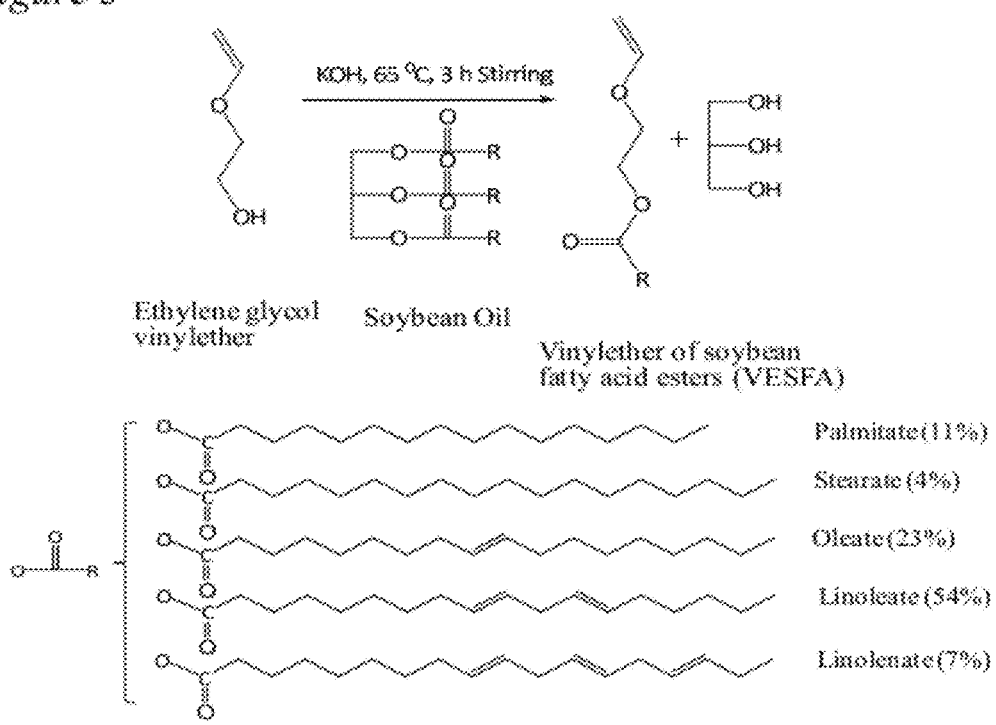
FIG. 3 shows an exemplary synthesis of vinyl ether of soybean oil fatty acid esters (VESFA).
Figure 4:
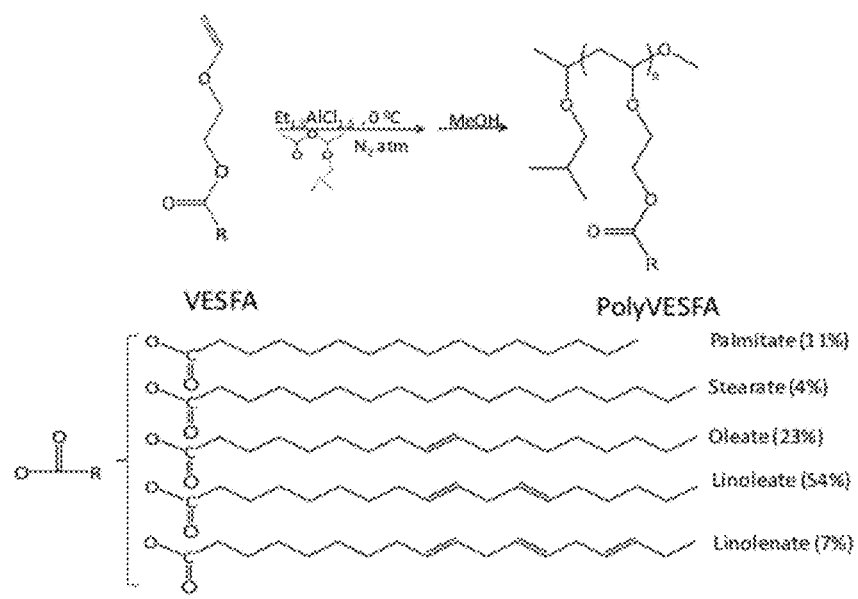
FIG. 4 shows an exemplary synthesis of the polymer of the vinyl ether of soybean oil fatty acid esters (polyVESFA) using carbocationic polymerization.
Figure 5:
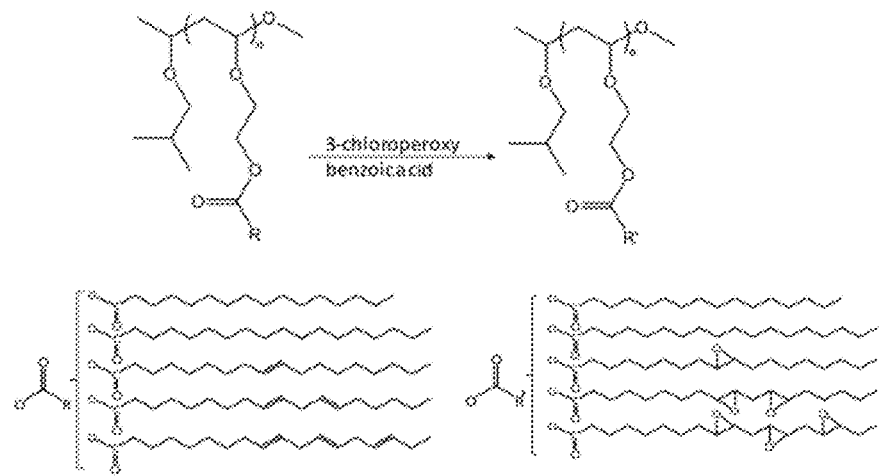
FIG. 5 shows an exemplary synthesis of epoxidized polyVESFA (E-polyVESFA) from the polymer of the vinyl ether of soybean oil fatty acid esters (polyVESFA).
Figure 6:
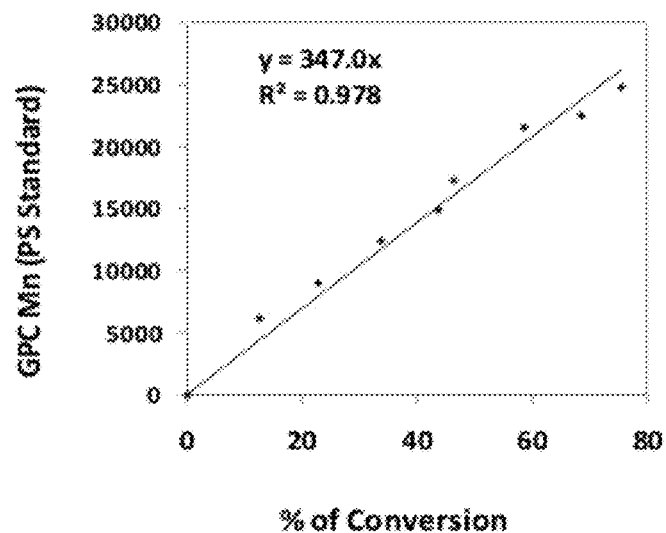
FIG. 6 shows a plot of number-average molecular weight (Mn) as a function of monomer conversion for the polymerization of vinyl ether of soybean oil fatty acid esters (VESFA).

FIGS. 3, 4, and 5 display the synthetic schemes for producing VESFA, polyVESFA, and E-polyVESFA, respectively. Both polyVESFA and E-polyVESFA were viscous liquids at room temperature. The living nature of the carbocationic polymerization of VESFA was demonstrated by the linear relationship between number-average molecular weight (Mn) determined using gel permeation chromatograph (GPC) and VESFA conversion, as shown in FIG. 6. Additionally, the narrow molecular weight distribution (<1.4) indicated fast and efficient initiation.

Figure 7:
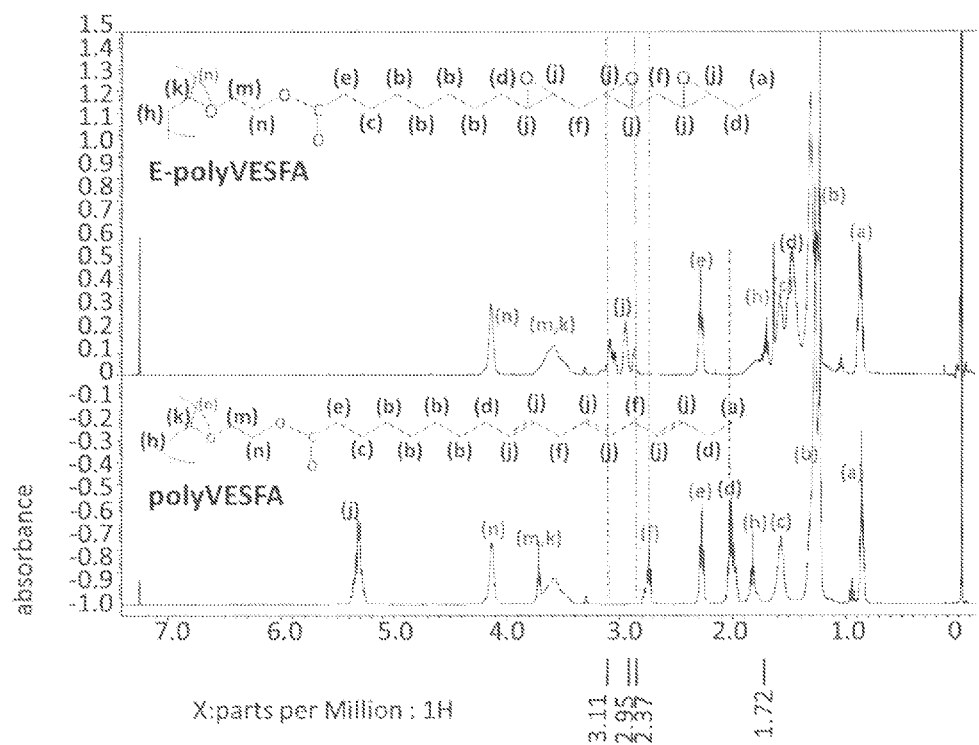
FIG. 7 shows an $^1$H NMR spectra of the polymer of the vinyl ether of soybean oil fatty acid esters (polyVESFA) and epoxidized polyVESFA (E-polyVESFA).

The successful polymerization of polyVESFA was confirmed by the absence any peaks associated with methylene protons attached to the vinylether double bond at 6.4 ppm (FIG. 7). It should be noted that polymerization occurred exclusively through the vinylether groups. No vinyl groups in the fatty acid ester side chains were consumed during the polymerization. The synthesis of E-polyVESFA from poly-VESFA was also confirmed using $^1$H NMR. As shown in FIG. 7, the shift of the methine proton at 5.3 ppm in polyVESFA to 2.9 ppm in E-polyVESFA was due to successful epoxidation of the double bonds in fatty acid ester side chains.

Figure 8A:
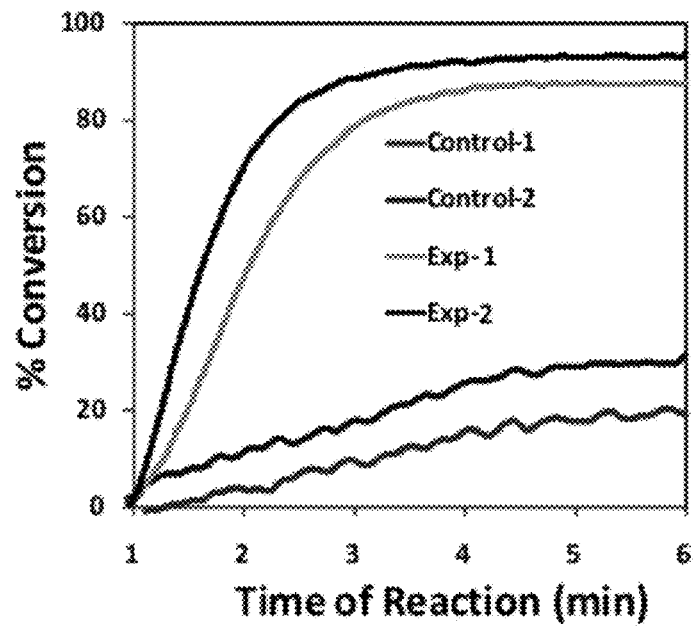
FIG. 8A shows real time infrared (RTIR) spectroscopy results for various coatings and FIG. 8B shows differential scanning calorimeter equipped with a photocalorimetric accessory (photo-DSC) results for various coatings.
Figure 8B:
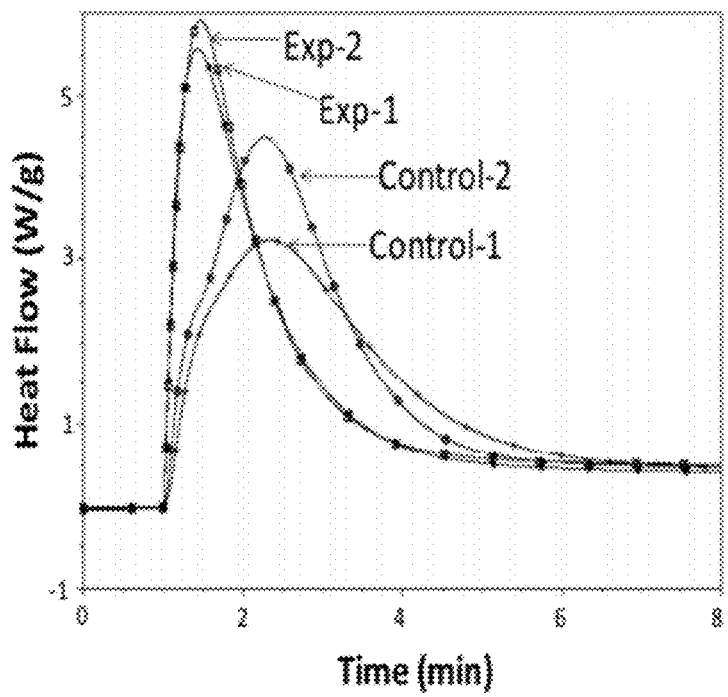

Results obtained from RTIR spectroscopy analysis (FIG. 8A) showed that the rate of epoxy consumption with E-poly-VESFA was much higher than with ESO. A faster reaction rate with E-polyVESFA was also illustrated using photo-DSC (FIG. 8B).

Figure 9A:
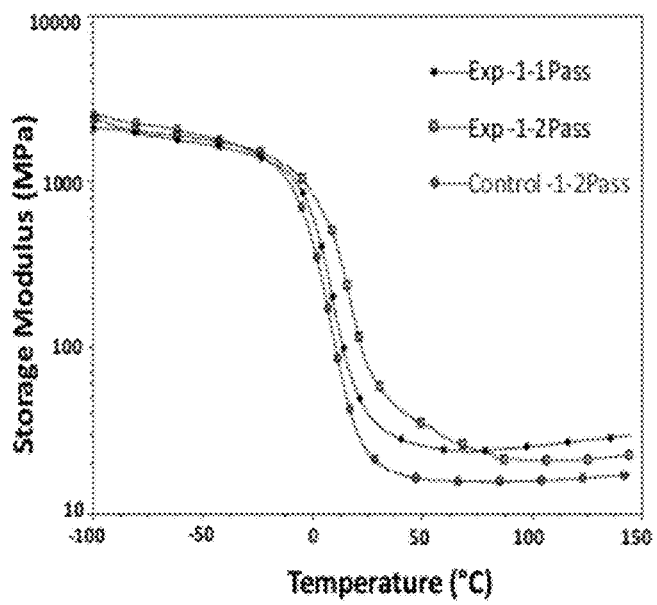
FIG. 9 shows a storage modulus as a function of temperature for various coatings cured with 1 pass (FIG. 9A) and 2 passes (FIG. 9B) under the UV lamp using a belt speed of 24 ft/min.
Figure 9B:
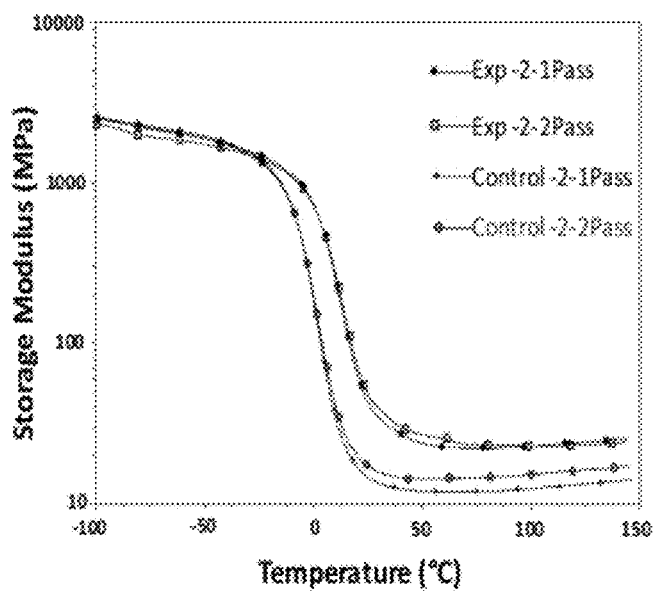

DMTA analysis showed (FIGS. 9A and 9B) that use of E-polyVESFA provided significantly higher storage modulus for the rubbery plateau region than could be obtained with commercially available ESO. The higher modulus of the rubbery plateau region can be attributed to the higher crosslink density associated with the polymeric nature of E-poly-VESFA. For E-polyVESFA, each tertiary carbon in the polymer backbone serves as a crosslink in the cured film. Thus, for a given extent of epoxy conversion during cure, films based on E-polyVESFA will necessarily possess a higher crosslink density compared to analogous films based on ESO.

CONCLUSION

A novel monomer, VESFA, was synthesized by base-catalyzed transesterification of soybean oil with ethylene glycol monovinylether. PolyVESFA containing fatty acid ester pendent groups was synthesized using living carbocationic polymerization. It was found that the polymerization process occurred selectively through the vinyl groups of VESFA enabling the double bonds in the fatty acid esters to remain intact. PolyVESFA was successfully epoxidized to E-poly-VESFA, which was subsequently used to produce UV-curable coating compositions. Compared to analogous coatings based on commercially available ESO, coatings based on E-polyVESFA displayed much faster cure rates and higher modulus in the rubbery plateau region. At present, the higher cure rate associated with use of E-polyVESFA is not fully understood. The higher rubbery plateau modulus can be attributed, at least in part, to the tertiary carbon atoms present in the polymer backbone which serve as additional crosslinks in the cured crosslinked network.

Example II

Synthesis of Vinyl Ether of Soybean Oil Fatty Acid Esters (VESFA)

One example of a synthesis of a monomeric VESFA is described in Example I. Another exemplary synthesis of the monomer, also using the same general synthetic scheme shown in FIG. 3, is as follows: 20 g of soybean oil, 20 g of ethylene glycol monovinylether, and 0.56 g of anhydrous potassium hydroxide were added to a two-neck, 100 ml, round-bottom flask and stirred at 70° C. for 3 hours under a blanket of nitrogen. The reaction mixture was cooled to room temperature and diluted with 120 ml of n-hexane. The organic layer was separated from the aqueous layer and washed once with 35 ml of aqueous acid (pH 4) and multiple times with deionized (DI) water until the wash water was neutral as indicated by litmus paper. The hexane layer was then dried with magnesium sulfate. The product was recovered by rotary evaporation of n-hexane and dried under vacuum overnight. Proton NMR was used to confirm the production of VESFA: $^1$H NMR: 6.45 ppm (q, 1H, OCH=C), 4.0-4.2 ppm (m, 2H, C=CH$_2$), 4.25 ppm (t, 2H, COOCH$_2$C), 3.82 ppm (t, 2H, OCH$_2$C), 5.3 ppm (m, 3.3H, CH=CH), 2.3 ppm (t, 2H, OCOCH$_2$), 0.8 ppm (m, 3H, CH$_3$C), 1.55 ppm (m, 2H, COCH$_2$CH$_2$C).

Example III

Polymerization of Soybean Oil-Derived Vinylether Monomers

One example of a synthesis of the homopolymer of VESFA (polyVESFA) is described in Example I.

Another exemplary synthesis of the homopolymer of VESFA, using the same general carbocationic polymerization scheme shown in FIG. 4 and producing a polymer referred to herein as polyVESFA-1, is as follows: Prior to use, VESFA was dried with magnesium sulfate. The dried VESFA was polymerized at 0° C. within a glove box in a three-neck, round-bottom flask baked at 200° C. prior to use. 23.4 mg of initiator (1-isobutoxyethyl acetate) and 256 g of VESFA monomer ($[M]_0$:$[I]_0$=5000:1) were dissolved in 1600 ml of dry toluene and chilled to 0° C. The polymerization was initiated by the addition of 36.05 ml of ethylaluminum sesquichloride solution (25 wt. % in toluene) ($[M]_0$:[Co-initiator]$_0$=200:18). The reaction was terminated after 17 hours by the addition of 1600 ml of chilled methanol which caused the polymer to precipitate. The polymer was isolated and washed multiple times with methanol using centrifugation. The purified polymer was collected as a viscous liquid after centrifuging at 4500 rpm at 21° C. for 10 minutes and drying under vacuum overnight. This synthesis resulted in a low polydispersity index (PDI) polyVESFA, as shown below.

Yet another exemplary synthesis of polyVESFA, producing a polymer referred to herein as polyVESFA-2, and also using the same general carbocationic polymerization scheme shown in FIG. 4, is as follows: Prior to use, VESFA was dried with magnesium sulfate. The dried VESFA was polymerized at 0° C. within a glove box in a three-neck, round-bottom flask baked at 200° C. prior to use. 9.7 mg of initiator (1-isobutoxyethyl acetate) and 105.9 g of VESFA monomer ($[M]$:$[I]$=5000:1) were dissolved in 643.7 ml of dry toluene and chilled to 0° C. The polymerization was initiated by the addition of 36.5 ml of ethylaluminum sesquichloride solution (25 wt. % in toluene). ($[M]_0$:[Co-initiator]$_0$=200:44). The reaction was terminated after 17 hours by the addition of 643 ml of methanol which caused the polymer to precipitate. The polymer was isolated and washed multiple times with methanol using centrifugation. The purified polymer was collected as a viscous liquid after centrifuging at 4500 rpm at 21° C. for 10 minutes and drying under vacuum overnight. The chemical structure of polyVESFA was confirmed using proton NMR: $^1$H NMR: 4.1-4.2 ppm (m, COOCH$_2$C), 3.4-3.8 ppm (m, OCH$_2$C, OCHC), 5.2-5.4 ppm (m, CH=CH), 2.2-2.3 ppm (m, OCOCH$_2$), 0.8 ppm (m, CH$_3$C), 1.45-1.7 ppm (m, COCH$_2$CH$_2$C).

The thermal properties of the polymer were determined using differential scanning calorimetry (Q1000 from TA Instruments) by first heating the sample from −120° C. to 70° C. at a heating rate of 10° C./minute (1$^{st}$ heat), cooling from 70° C. to −120° C. at a cooling rate of 10° C./minute (cooling), and reheating from −120° C. to 120° C. at a heating rate 10° C./minute (2$^{nd}$ heat). The thermogram obtained from the 2$^{nd}$ heat showed a glass transition at −98.7° C. and a very weak, diffuse melting transition with an enthalpy of melting of 8.43 J/gm and a peak maximum at −27.6° C. The rheological characteristics of the polymer produced were compared to that of soybean oil using an ARES Rheometer from TA Instruments. The shear rate was varied from 0.1 radians/sec. to 500 radians/sec. while temperature was held constant at 25° C. Over this shear rate range, the soybean oil showed a constant shear viscosity of 45 centipoise, while the polyVESFA displayed a constant shear viscosity of 2,971 centipoise. Over a shear rate range of 500 radians/sec. to 1,000 radians/sec., the viscosity of the soybean oil remained constant at 45 centipoise while the viscosity of the polyVESFA dropped dramatically illustrating the pseudoplasticity typically seen with polymers that possess a molecular weight above the minimum required for polymer chain entanglement.

The characteristics of the polymerization of VESFA monomer was determined by monitoring polymer yield and polymer molecular weight as a function of polymerization time. The reaction was carried out in a dry 250 ml two-neck, round-bottom flask partially submerged in a heptane bath at 0° C. inside a dry box. In the reaction vessel, 14.3 mg of initiator (1-isobutoxyethyl acetate) and 6.25 gm of VESFA monomer ($[M]_0$:$[I]_0$=200:1) were dissolved in 32.06 gm of toluene and the solution chilled to 0° C. The polymerization was started by the addition of 882 μl of ethylaluminum sesquichloride solution (25 wt. % in toluene) ($[M]_0$:[Co-initiator]$_0$=200:18) to the reaction mixture. Aliquots of the reaction mixture were removed from the vessel at various time intervals and terminated with chilled methanol. Polymers from each aliquot were isolated and washed with methanol using centrifugation. Polymer yield was determined gravimetrically after drying the purified polymer at 40° C. under vacuum overnight. Polymer molecular weight was characterized using a high-throughput Symyx Rapid Gel Permeation Chromatography equipped with an evaporative light scattering detector (PL-ELS 1000) and polystyrene standards.

A plot of number average molecular weight obtained from gel permeation chromatograph (GPC) analysis as a function of VESFA monomer conversion yielded a straight line that passed through the origin with a slope of 504 and correlation coefficient of 0.977. The data used to generate the plot is shown below:

| Reaction Time (hour) | % Monomer Conversion | GPC number Average Molecular Weight | PDI* |
|---|---|---|---|
| 0.92 | 9.5 | 7906 | 1.14 |
| 1.60 | 15.4 | 10450 | 1.13 |
| 4.00 | 29.4 | 16640 | 1.13 |
| 4.08 | 30.0 | 17090 | 1.13 |
| 9.33 | 51.8 | 26670 | 1.13 |
| 13.25 | 62.2 | 30210 | 1.16 |
| 15.83 | 68.2 | 34020 | 1.13 |
| 19.75 | 73.1 | 35430 | 1.15 |

*PDI is the polydispersity index

Another example of the living carbocationic polymerization of VESFA monomer is as follows: A total of eight polymerizations were carried out inside a dry box at 0° C. using dry test tubes as polymerization vessels. In each test tube, 1.6 mg of initiator (1-isobutoxyethyl acetate) and 0.7 gm of VESFA monomer ($[M]$:$[I]$=200:1) were dissolved in 3.68 gm of toluene and solutions chilled to 0° C. Each polymerization was started by the addition of 241 μl of ethylaluminum sesquichloride (Et$_{1.5}$AlCl$_{1.5}$) solution (25 wt. % in toluene) to the reaction mixture. After a predetermined time interval, 20 ml of methanol was added to the polymerization mixture to terminate the polymerization. Each polymer was isolated and washed with methanol using centrifugation. Polymer yield was determined gravimetrically after drying the purified polymer at 40° C. under vacuum overnight. Polymer molecular weight was characterized using a high-throughput Symyx Rapid Gel Permeation Chromatography equipped with an evaporative light scattering detector (PL-ELS 1000) and polystyrene standards.

A plot of number average molecular weight obtained from gel permeation chromatograph (GPC) analysis as a function of VESFA monomer conversion yielded a straight line that passed through the origin with a slope of 347 and correlation coefficient of 0.978. The data used to generate the plot is shown below:

| Reaction Time (hour) | % Monomer Conversion | GPC number Average Molecular Weight | PDI* |
|---|---|---|---|
| 0.333 | 12.56 | 6183 | 1.16 |
| 0.8333 | 22.75 | 9019 | 1.15 |
| 1.5 | 33.73 | 12420 | 1.15 |

-continued

| Reaction Time (hour) | % Monomer Conversion | GPC number Average Molecular Weight | PDI* |
|---|---|---|---|
| 2.166 | 43.68 | 14880 | 1.17 |
| 3 | 46.34 | 17300 | 1.17 |
| 4.83 | 58.54 | 21580 | 1.18 |
| 8.133 | 68.5 | 22530 | 1.25 |
| 15.533 | 75.55 | 24810 | 1.31 |

*PDI is the polydispersity index

The linear relationship between monomer conversion and number-average molecular obtained from the experiment showed that the polymerization was a "living" polymerization, which occurs without termination or chain transfer reactions, resulting in the ability to produce polymers with controlled molecular weight and polymers and potentially copolymers with well-defined molecular architectures such as block copolymers, star polymers, and graft copolymers.

Example IV

Copolymers of VESFA and Other Vinylether Monomers

Figure 10:
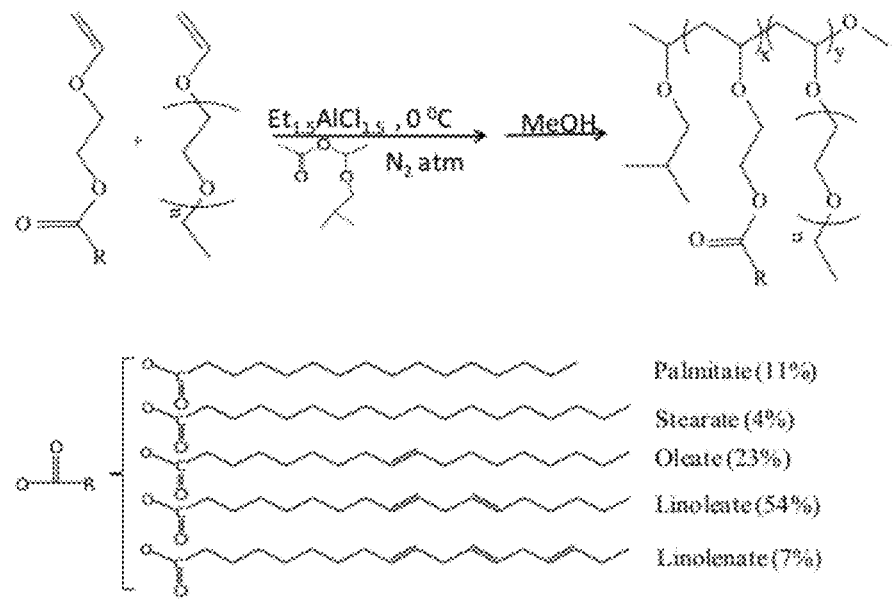
FIG. 10 shows a synthetic scheme for synthesis of a copolymer of VESFA and a poly(ethylene glycol)-functional vinyl ether monomer.

Copolymers of VESFA with a polyethylene glycol-functional vinylether monomer were also produced. The synthetic scheme is shown in FIG. 10. A polyethylene glycol-functional monovinylether monomer (VEPEG) was synthesized by end-capping a commercially available polyethylene glycol monovinylether (R500 from Clariant) as follows: 20 gm of iodoethane and 8.08 gm of potassium hydroxide were added to a 500 ml, round-bottom flask and stirred at 300 rpm at 40° C. Then, 58.8 gm of R500 was added drop-wise to the reaction mixture. After the addition was complete, the temperature was raised to 64° C. and stirring continued for 12 hours under a blanket of nitrogen. R500 possesses a hydroxy group at one end which will terminate a carbocationic polymerization, thus reaction with iodoethane was used to convert the hydroxyl group to an ethoxy group (—O—$CH_2CH_3$). The reaction mixture was cooled to room temperature and then diluted with 300 ml of methylene chloride. The organic layer was filtered as a clear liquid and washed three times with 300 ml of DI water. The organic layer was then dried with anhydrous magnesium sulfate and the product monomer was recovered by rotary evaporation of volatiles. Successful synthesis of VEPEG was confirmed by proton NMR spectra analysis: $^1$H NMR: 6.4 ppm (q, 1H, OCH=C), 3.9-4.13 ppm (dd, 2H, C=$CH_2$), 3.4-3.8 ppm (m, 48H, $OCH_2CH_2O$, $OCH_2CH_3$), 1.2 ppm (t, 3H, $CH_3CH_2$).

VESFA and VEPEG were copolymerized at 0° C. within a glove box in a test tube dried at 250° C. under vacuum just before use. 1 g of VEPEG, 0.61 g of VESFA, and 2.77 mg of initiator (1-isobutoxyethyl acetate) were dissolved in 8.43 g of dry toluene and chilled to 0° C. The polymerization was initiated with the addition of 0.417 ml of ethyl aluminum sesquichloride (25 wt. % in toluene). After 12 hours, the reaction was terminated with addition of 20 ml of methanol. The copolymer was recovered by rotatory evaporation of all the volatiles and drying under vacuum overnight. GPC using polystyrene standards showed that the polymer produced possessed a number average molecular weight of 14,350 g/mol.

Figure 11:
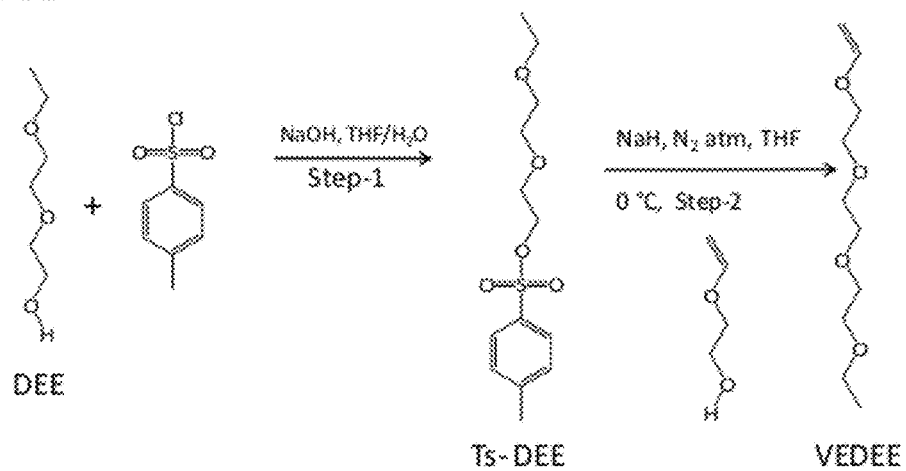
FIG. 11 shows a synthetic scheme for synthesis of a hydrophilic vinyl ether monomer, tri(ethylene glycol) ethyl vinyl ether.

A copolymer of VESFA and tri(ethylene glycol) ethyl vinyl ether (TEGEVE) was also synthesized. TEGEVE was produced using the synthetic scheme shown in FIG. 11.

In the first step, 16.5 gm of diethyleneglycol monoethylether (DEE) (99% purity from Aldrich), 8 gm of sodium hydroxide, 60 ml of tetrahydrofuran, and 40 ml of DI water were combined in a 500 ml, 3-neck, round-bottom flask using constant stirring to produce a homogeneous solution. The mixture was cooled to 0° C. and then 25.7 gm of p-toluenesulfonyl chloride (Aldrich, 99% purity) in 50 ml of tetrahydrofuran (THF) was added to the reaction mixture drop-wise using an addition funnel and the reaction was continued for 2 hours at 0° C. The reaction mixture was then poured into 100 ml of ice cold water and the product extracted with methylene chloride. The organic layer was washed with DI water and dried with anhydrous magnesium sulfate. The product (Ts-DEE) was recovered after rotary evaporation of all the volatiles and dried under vacuum overnight. In the second step, 1.5 gm of sodium hydride (Aldrich 95% purity) and 75 ml of THF were dissolved in a 500 ml, 3-neck, round-bottom flask equipped with a nitrogen blanket. The solution was cooled at 0° C. and a solution of 4.77 gm of ethylene glycol monovinyl ether (TCI America, 95% purity) in 30 ml THF was added drop wise. Next, a solution of 15 gm of Ts-DEVE in 45 ml THF was added to the reaction mixture and the temperature was raised to 60° C. After 24 hours, the reaction mixture was cooled to room temperature and diluted with 150 ml of diethyl ether. The organic layer was washed three times with 75 ml of DI water and dried with anhydrous magnesium sulfate. The product monomer, TEGEVE, was collected after rotary evaporation of all volatiles and dried under vacuum overnight. Successful synthesis of TEGEVE was confirmed by proton NMR: 6.4 ppm (q, 1H, OCH=C), 4.0-4.2 ppm (m, 2H, C=$CH_2$), 3.4-3.8 ppm (m, 14H, $OCH_2CH_2O$, $OCH_2C$), 1.2 ppm (t, 3H, $CH_3C$).

VESFA and TEGEVE were copolymerized at 0° C. within a glove box in a test tube dried at 200° C. under vacuum just before use. A series of copolymers were synthesized by varying the initial concentration of monomer to co-initiator (i.e. Lewis acid) ratio. The table below describes the amount of raw materials use to synthesize the copolymers. VESFA, TEGEVE, and initiator (1-isobutoxyethyl acetate) were dissolved in dry toluene and chilled to 0° C. Each polymerization was initiated with the addition of ethyl aluminum sesquichloride (25 wt. % in toluene). After 17 hours, the reactions were terminated with the addition of 3 mls of methanol. 5 ml of methylene chloride was added to the terminated solutions and the organic layers were washed with 3 ml of deionized water three times to remove the initiator and co-initiator residues. The polymers were recovered by rotary evaporation of all the volatiles and drying under vacuum overnight. Successful polymerization was demonstrated using proton NMR by observing the absence of protons associated with the vinyl ether units of the monomers. GPC using polystyrene standards showed that copolymers 1, 2, and 3 possessed number average molecular weight of 15210, 13800, and 12880 g/mol respectively.

| Formulation ($[M_1]_0$:$[M_2]_0$:$[I]_0$: $[Et_{1.5}AlCl_{1.5}]_0$) | VESFA ($M_1$) wt., gm | TEGEVE ($M_2$) wt., gm | Initiator (I) wt., mg | Co-initiator ($Et_{1.5}AlCl_{1.5}$) volume, ml | Toluene wt., gm |
|---|---|---|---|---|---|
| Copolymer 1 (74:126:1:44) | 0.51 | 0.51 | 3.2 | 0.48 | 5 |
| Copolymer 2 (74:126:1:18) | 0.50 | 0.50 | 0.31 | 0.19 | 5.10 |
| Copolymer3 (74:126:1:9) | 0.51 | 0.51 | 3.2 | 0.096 | 5.28 |

Example V

Cured Films of PolyVESFA

Figure 12:
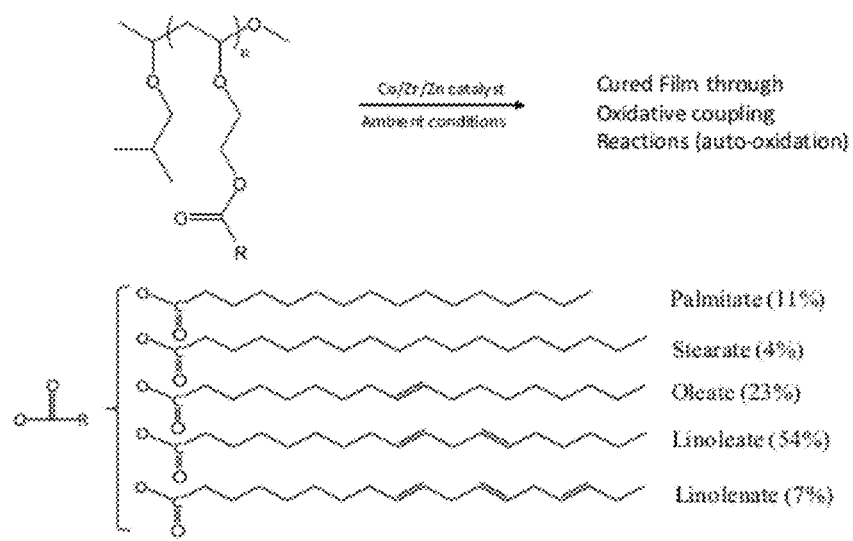
FIG. 12 shows a synthetic scheme for production of cured polyVESFA films using an auto-oxidation process.

Cured films of polyVESFA were prepared using an auto-oxidation process. The synthetic scheme used to produce the cured films is shown in FIG. 12.

An example of a cured film produced with this method is as follows: 2 g of polyVESFA was dissolved in 0.5 g toluene in a 20 ml vial equipped with an overhead stirrer. 16.6 mg of 12% cobalt octoate in mineral spirit, 55.6 mg of 18% zirconium octoate in mineral spirit, and 75 mg of 8% zinc nuxtra in mineral spirit was added to the solution and the solution stirred at 5000 rpm for 10 minutes. The liquid solution was cast over a clean aluminum panel using a draw down bar (BYK Gardner) to produce approximately a 200 micron thick film which was cured by allow the film to stand at room temperature for 2 days and then heating at 40° C. for 3 days. The thermal properties of the cured film were determined using differential scanning calorimetry (Q1000 from TA Instruments) by first heating the sample from 25° C. to 100° C. at a heating rate of 10° C./minute ($1^{st}$ heat), cooling from 100° C. to −120° C. at a cooling rate of 10° C./minute (cooling), and reheating from −120° C. to 100° C. at a heating rate 10° C./minute ($2^{nd}$ heat). The thermogram obtained from the $2^{nd}$ heat showed a glass transition at −27.2° C.

In another experiment, a series of cured films produced with this method is as follows: polyVESFA, 12% cobalt octoate in mineral spirit, 18% zirconium octoate in mineral spirit, and 8% zinc nuxtra in mineral spirit were mixed together using a FlackTek mixer at 3500 rpm for 3 minutes. The table below describes the compositions of the coatings produced. The air drying behavior of liquid coatings was characterized using a BK 3-Speed Drying Recorder (MICKLE Laboratory Engineering Co. Ltd., United Kingdom). A needle carrier holding 6 hemispherical ended needles travels across the length of six 305×25 mm glass strips with time. A weight of 5 gm is attached to each hemispherical needle to study the through drying property of coating. Each liquid coating mixture was casted over glass strips using a 25 mm cube film applicator to produce wet films about 75 microns in thickness. The coating drying time was evaluated as open time, dust free time and tack free time for 48 hour time period.

| Formulation | Cobalt octoate (mg) | Zirconium octoate (mg) | Zinc nuxtra (mg) | PolyVESFA-1 (gm) |
|---|---|---|---|---|
| Formulation-1 | 16.7 | 111.1 | 31.3 | 5 |
| Formulation-2 | 8.3 | 27.8 | 31.3 | 5 |
| Formulation-3 | 4.2 | 27.8 | 31.3 | 5 |

The table below lists drying time for films produced by air oxidative curing.

| Formulation | Open time (hr) | Dust free time (hr) | Tack free time (hr) |
|---|---|---|---|
| Formulation-1 | 1.5 | 2.5 | 23 |
| Formulation-2 | 6.5 | 18 | 22 |
| Formulation-3 | 3 | 10 | 24 |

The rate of crosslinked network formation was characterized by a dynamic time sweep test using the ARES Rheometer. Each liquid mixture was placed in between the two parallel plates and heated for 63 minutes at a constant frequency of 10 rad/s, strain rate of 0.3%, and temperature of 120° C. For the coating based on PolyVESFA-1, storage modulus increased from 1.8 KPa to 46.1 KPa while the storage modulus of the reference coating based on soybean oil showed no increase in modulus at 120° C. over this time period.

Figure 13:
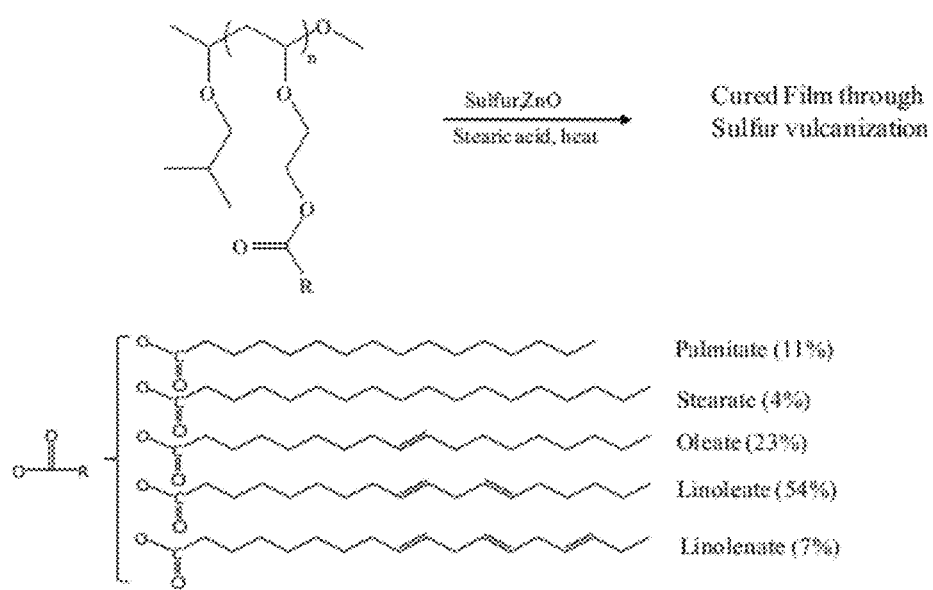
FIG. 13 shows a synthetic scheme for production of cured polyVESFA films using a vulcanization process.

In addition to curing using an auto-oxidation process, curing was also accomplished using a vulcanization process as shown in FIG. 13.

One example of a cured film produced with this process is as follows: In an 8 ml glass vial, 5 g polyVESFA, 0.3 g zinc oxide, and 0.025 g stearic acid were added and stirred with an overhead stirrer at 9000 rpm for 2 minutes. Next, 0.175 g sulfur and 0.025 g tetramethylthiuram disulfide were added and the mixture stirred at 18000 rpm for 4 minutes with constant cooling by partial immersion in a water bath. The rate of development of the crosslinked network due to sulfur vulcanization reaction of C═C double bonds in fatty acid ester chains was characterized by dynamic temperature ramp test using ARES Rheometer (TA Instruments). The liquid dispersion was placed in between two parallel plates and heated at a constant temperature of 140° C. The storage modulus was measured with time at a constant frequency of 10 radian/s and a strain of 0.3%. Over the period of 22 minutes, storage modulus increased from about 1 Pa to 0.19 MPa and then remained relatively constant with time over a total time period of 100 minutes.

Another example of a cured film produced with this process is as follows: The table below describes the compositions of three liquid coatings produced from polyVESFA-1, polyVESFA-2, and soybean oil. Generally, in a 20 ml glass vial, polyVESFA, zinc oxide, and stearic acid were added and stirred with an overhead stirrer at 15,000 rpm for 2 minutes. Next, sulfur and tetramethylthiuram disulfide were added and the mixture stirred at 15000 rpm for 4 minutes with constant cooling by partial immersion in a water bath. The rate of development of crosslinked network due to sulfur vulcanization reaction of C═C double bonds in fatty acid ester chains was characterized by dynamic temperature ramp test using ARES Rheometer (TA Instruments). The liquid dispersion was placed in between two parallel plates and heated at a constant temperature of 140° C. The storage modulus was measured with time at a constant frequency of 10 radian/s and a strain of 0.3%. Over the period of 22 minutes, the storage modulus of Formulation-2 increased from about 1 Pa to 0.19 MPa and then remained relatively constant with time over a total time period of 65 minutes. For Formulation-1, the storage modulus increased from about 1 Pa to 0.27 MPa over a time period of 22 minutes and then remained relatively constant with time over a total time period of 54 minutes. In contrast, the reference formulation based on soybean oil showed a storage modulus value of 1.82 Pa after 4.56 h under the same curing condition.

| Chemicals | Formulation-1 | Formulation-2 | Reference |
|---|---|---|---|
| PolyVESFA-1 (gm) | 5 | — | — |
| PolyVESFA-2 (gm) | — | 5 | — |
| Soybean oil (gm) | — | — | 7.17 |
| Zinc oxide (gm) | 0.3 | 0.3 | 0.43 |
| Stearic acid (gm) | 0.025 | 0.025 | 0.036 |
| Sulfur (gm) | 0.175 | 0.175 | 0.251 |
| Tetramethylthiuram disulfide (gm) | 0.025 | 0.025 | 0.036 |

Example VI

Epoxy-Functional polyVESFA

For many material applications, soybean oil is subjected to a chemical conversion and used as one component of a formulated material. For example, epoxidized soybean oil (ESO) is a commercial product produced by epoxidation of the double bonds of soybean oil. ESO has found application as a component of epoxy-based coatings and composites. ESO has been further chemically modified to produce other reactive soybean-oil based materials such as soybean oil-based polyols, which are typically used to produce polyurethanes, and soybean oil-based acrylates, which are typically used in radiation-curable coatings.

An example of the synthesis of E-polyVESFA is as follows (see also Example I): 4 g of polyVESFA-2 was dissolved in 80 ml of methylene chloride in a round bottom flask and 4.73 g of 3-chloroperoxybenzoic acid added with vigorous stirring. The reaction was continued for 4 hours at room temperature at a stirrer speed of 650 rpm. After the reaction was complete, the polymer was precipitated into methanol, isolated by centrifugation, and dried under vacuum overnight. Successful synthesis of E-polyVESFA-2 was confirmed using proton NMR by observing the disappearance of peaks associated with CH=CH groups in the fatty acid ester chain of poly-VESFA at 5.3 ppm (m) and the corresponding appearance of peaks at 2.8-3.1 ppm (m) associated with the glycidyl groups in E-polyVESFA-2. The thermal properties of the polymer were determined using differential scanning calorimetry by first heating the sample from $-120°$ C. to $70°$ C. at a heating rate of $10°$ C./minute ($1^{st}$ heat), cooling from $70°$ C. to $-120°$ C. at a cooling rate of $10°$ C./minute (cooling), and reheating from $-120°$ C. to $120°$ C. at a heating rate $10°$ C./minute ($2^{nd}$ heat). The thermogram obtained from the $2^{nd}$ heat showed a glass transition at $-58.0°$ C. and a very weak, diffuse melting transition with an enthalpy of melting of 5.97 J/gm and a peak maximum at $-21.7°$ C.

Example VII

Cured Films from Epoxy-Functional polyVESFA

Figure 14:
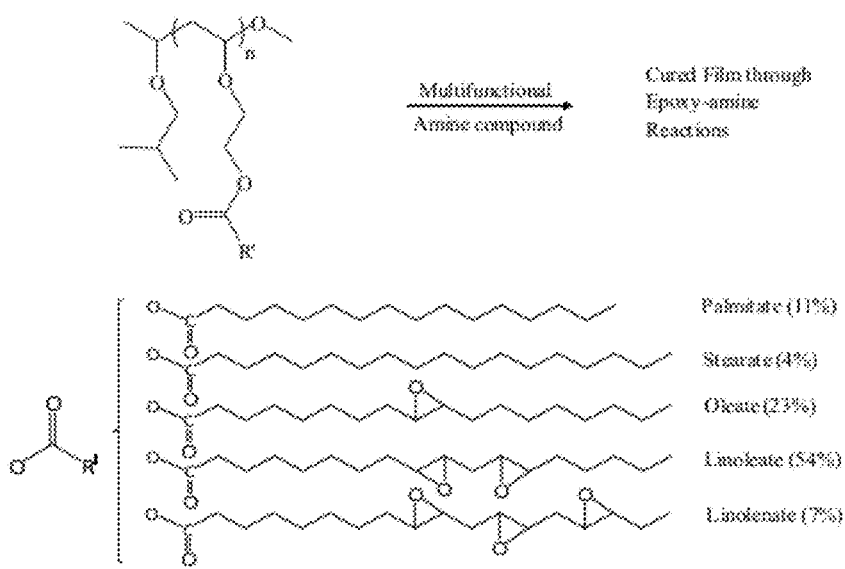
FIG. 14 shows a synthetic scheme for production of cured E-polyVESFA films using an amine curing agent.

From the E-polyVESFA-2 (Example VI), cured films were prepared by crosslinking using an amine curing agent as shown in FIG. 14.

An example of the production of an amine-cured film produced from E-polyVESFA-2 is as follows: 3 g of E-polyVESFA-2 (epoxy equivalent weight=290 g/eq) and 0.421 g triethylene tertamine (technical grade 60% purity, used as received from Sigma Aldrich, amine hydrogen equivalent weight of 24.372 g/eq) were mixed with a FlackTek mixer using 3500 rpm for 3 minutes. The clear mixture was coated over a Teflon® film adhered to a glass panel. The wet film thickness was approximately 1 mm and the film cured in a forced air oven at $120°$ C. for 36 hours. A reference coating based on epoxidized soybean oil (Vikoflex-7170 from Arkema, epoxy equivalent weight=233 g/eq) was produced by mixing 3 gm of the epoxidized soybean oil (ESO) with 0.524 g of triethylene tertamine using the FlackTek mixer. The coating mixture was cast over a Teflon® film adhered to a glass panel. The wet film thickness was approximately 1 mm and the film cured in a forced air oven at $120°$ C. for 99 hours. A cure time exceeding 36 hours was used for the reference coating because the coating was still liquid after 36 hours at $120°$ C. Free films were characterized using an ARES Rheometer (TA Instruments). Cured films were placed in between two parallel plates and the storage modulus measured by ramping the temperature from $-90°$ C. to $120°$ C. at ramp rate of $5°$ C./min with a constant frequency of 10 rad/s and a strain rate of 0.3%. From the experiment, the film based on E-polyVESFA-2 gave a glass transition temperature (Tg) of $15.2°$ C. and a rubbery plateau modulus (at $70°$ C.) of 27.7 MPa. The reference coating based on ESO showed a Tg and rubbery plateau modulus (at $70°$ C.) of $-5.3°$ C. and 11.6 MPa, respectively. These results indicate a higher crosslink density was achieved with use of E-polyVESFA-2 as compared to ESO. In addition, the rate of crosslinked network formation was characterized by a dynamic time sweep using the ARES Rheometer. Each liquid mixture was placed in between the two parallel plates and heated for 20 hours at a constant frequency of 2 rad/s, strain rate of 0.1%, and temperature of $120°$ C. For the coating based on E-polyVESFA-2, storage modulus increased from 17 Pa to 778 KPa over the period of 5 hours while the storage modulus of the reference coating based on ESO showed no increase in modulus until 16 hours at $120°$ C. After 20 hours, the reference coating reached a storage modulus of 4.63 KPa, while the experimental coating based on E-polyVESFA-2 reached this storage modulus after just 49 minutes at $120°$ C. These results indicate that E-polyVESFA develops a crosslinked network much faster than the analogous material based on ESO.

Figure 15:
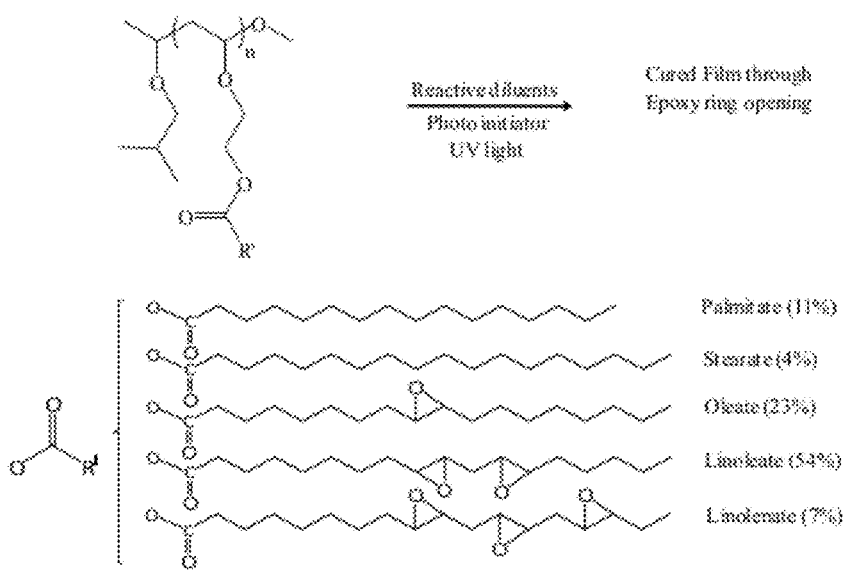
FIG. 15 shows a synthetic scheme for production of cured E-polyVESFA radiation-curable coatings using an ultraviolet (UV) light initiated cationic polymerization process.

E-polyVESFA was investigated for use in radiation-curable coatings using a ultraviolet light (UV) initiated cationic polymerization process as shown in Example I and further, as shown in FIG. 15.

A series of radiation cured coatings were prepared by mixing E-polyVESFA-2,3-methyloxetan-3-yl)methanol (Oxetane 101 from Dow Chemical), and 50 wt. % triarylsulfonium hexafluoroantimonate salt in propylene carbonate (UVI 6974 photoinitiator from Dow Chemical) together using a FlackTek mixer at 3500 rpm for 3 minutes. An analogous series of reference coatings was produced by replacing E-polyVESFA-2 with commercially available ESO (Vikoflex-7170 from Arkema). The table below describes the compositions of the coatings produced. Each liquid coating mixture was casted over Teflon® film adhered to a glass using a square draw down bar (BYK Gardner) to produce wet films about 200 microns in thickness. The films were cured by passing coated substrates once or twice under a F300 UVA lamp from Fusion UV Systems (UVA light intensity ~1420 mW/cm$^2$ as measured by UV Power Puck® II from EIT Inc.) equipped with a bench top conveyor belt set at a belt speed of 24 feet/min. Free films were characterized using dynamic mechanical thermal analysis (Q800 from TA Instruments). The experiment was carried out from $-90°$ C. to $140°$ C. using a heating rate of $5°$ C./min., frequency of 1 Hz, and strain amplitude of 0.02%. The $T_g$ was obtained from the peak maximum in the tan δ response.

| Sample ID | Wt. % ESO | Wt. % E-polyVESFA-2 | Wt. % Oxetane 101 | Wt. % UVI 6974 |
|---|---|---|---|---|
| Control-1 | 68.4 | — | 29.3 | 2.3 |
| Control-2 | 66.8 | — | 28.6 | 4.6 |
| Exp-1 | — | 68.4 | 29.3 | 2.3 |
| Exp-2 | — | 66.8 | 28.6 | 4.6 |

The table below lists $T_g$ and storage modulus of the rubbery plateau region (at $70°$ C.) for films produced using one and two passes under the UVA lamp.

| Coating ID | Number of passes under UVA lamp | Tg (° C.) | Storage modulus at 70° C. (MPa) |
| --- | --- | --- | --- |
| Control-1 | One | Not Cured* | Not Cured* |
| Control-2 | One | 4.7 | 11.97 |
| Exp-1 | One | 11.8 | 23.7 |
| Exp-2 | One | 15.7 | 22.4 |
| Control-1 | Two | 12.1 | 15.4 |
| Control-2 | Two | 5.0 | 14.6 |
| Exp-1 | Two | 18.9 | 25.4 |
| Exp-2 | Two | 16.6 | 23.5 |

*Coating was still in the liquid state

In order to characterize cure kinetics of the UV curable materials described above, a photo DSC experiment was performed using a Q 1000 differential scanning calorimeter (TA Instruments) equipped with a photocalorimetric accessory (PCA). The experiment was carried out at a UV light intensity of 50 mW/cm$^2$ and a temperature of 30° C. Samples were equilibrated for 1 minute before exposure to UV light for 7 minutes followed by a temperature ramp from 0° C. to 200° C. at a rate of 10° C./min under nitrogen to determine the residual heat associated with thermal cure of residual (unreacted functional groups). The % of total conversion was calculated by the following formula:

$$\% \text{ of Total Conversion} = \frac{\Delta H_{Photopolymerization}}{\Delta H_{Photopolymerization} + \Delta H_{Residual\ Heat}} \times 100$$

The following table lists the time period associated with the peak maximum of the reaction exotherm (i.e. time to peak maximum) and the percent of conversion obtained by UV light exposure for both the control and experimental coatings. From the table below, it can be seen that the coatings based on E-polyVESFA-2 possess faster cure rates as indicated by the shorter time period associated with peak of the reaction exotherm and higher extent of conversion after a 2 minute UV exposure.

| Sample ID | Time to peak maximum (minutes) | % of conversion (2 minutes UV exposure) | % of conversion (7 minutes UV exposure) |
| --- | --- | --- | --- |
| Control-1 | 1.31 | 26.9 | 97.8 |
| Control-2 | 1.26 | 36.8 | 98.6 |
| Exp-1 | 0.43 | 62.1 | 97.1 |
| Exp-2 | 0.46 | 64.3 | 97.6 |

In addition to photo-DSC, a real-time FTIR(RTIR) instrument was used to characterize cure kinetics. The RTIR experiments were carried out using a Nicolet Magna-IR 850 spectrometer Series II. The light source was a LESCO Super Spot MK II 100 W DC UVA mercury vapor short lamp. Samples were spin-coated onto a KBR plate at 4000 rpm for 20 seconds and exposed to UV light for 3 minutes followed by a dark cure of 2 minutes. FTIR spectra were taken at 1 spectrum/s with a resolution of 4 cm$^{-1}$. The experiment was carried out in air at 25° C. and the UV light intensity was 34 mW/cm$^2$ as measured by UV Power Puck II from EIT Inc. The consumption of epoxy groups was determined by monitoring the peak area in between 800 cm$^{-1}$ and 860 cm$^{-1}$. For Control-1, Control-2, Exp-1, and Exp-2, the percent of epoxide conversion after 2 minutes of UV light exposure were 9.7, 17.9, 78.5, and 88.4, respectively. With 3 minutes of light exposure, Control-1, Control-2, Exp-1, and Exp-2, reached epoxide conversions of 15.8%, 25.9%, 86.1% and 91.8%, respectively. This data further illustrates the surprising result that coatings based on E-polyVESFA provide much faster cationic photocure than analogous coatings based on ESO.

Example VIII

Acrylated Derivatives

Acrylate-functional materials can be prepared by reaction of epoxidized polyVESFA with acrylic acid and the acrylate-functional materials used to prepare coatings produced using a radiation-cure process (Khot et al., *J. Polym. Sci., Part A: Polym. Chem.*, 82, 703-723 (2001)). The properties of UV-cured coatings based on acrylate-functional polyVESFA can be compared to analogous coatings based on acrylate-functional soybean oil.

Figure 16:
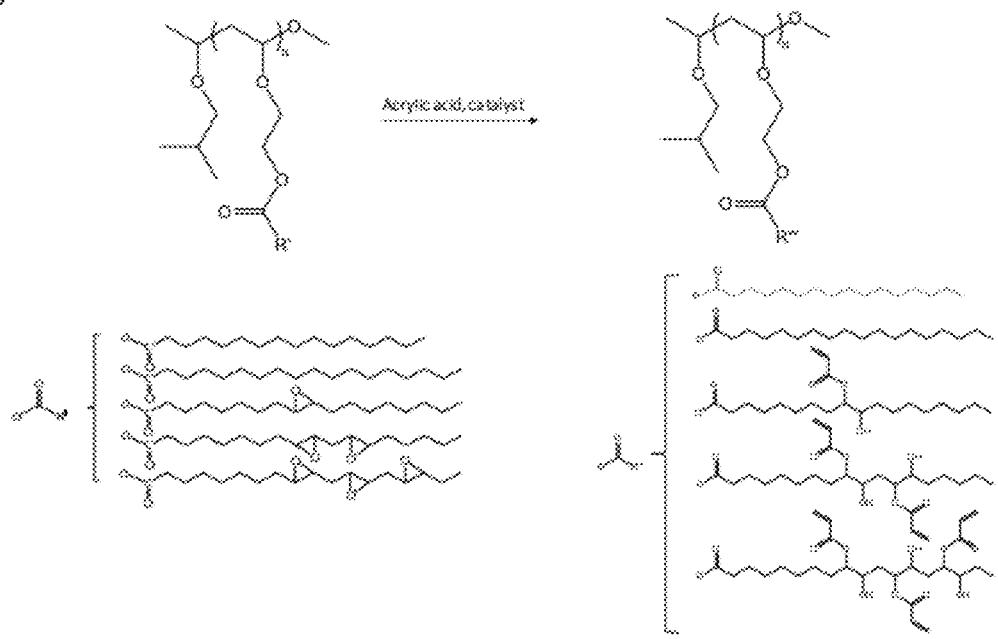
FIG. 16 shows a synthetic scheme for production of acrylated materials using polyVESFA and E-polyVESFA.

Acrylated materials for use in applications such as radiation-curable coatings can be produced from E-polyVESFA and VESFA copolymers precursors by epoxide ring-opening with acrylic acid as shown in FIG. 16.

An example of the synthesis of acrylated polyVESFA is as follows: In a 40 ml vial, 1.41 gm of epoxidized polyVESFA-2, 1.7 mg hydroquinone, and 8.6 mg potassium acetate were dissolved in 7.93 ml of toluene. The rapidly stirring solution was heated to 110° C. and 0.316 gm of acrylic acid was added drop wise over the period of 30 minutes. After 42 hours of reaction, the temperature was cooled to room temperature and the toluene was removed by rotary evaporation. The crude product was diluted with methylene chloride and washed with deionized water. The organic layer was dried with anhydrous magnesium sulfate. The pure polymer was isolated by rotary evaporation of methylene chloride and drying under vacuum overnight. Successful synthesis of acrylated polyVESFA was confirmed using proton NMR by observing the disappearance of peaks associated with the glycidyl groups in the fatty acid ester chains of E-polyVESFA at 2.8-3.1 ppm (m) and the corresponding appearance of new peaks at 4.2-4.3 ppm (m, CHOCO) and 3.7-3.8 ppm (m, CHOH) associated with ring-opening of the epoxide groups with acrylic acid. The incorporation of acrylate groups into polyVESFA was also demonstrated by the appearance of new peaks at 5.8 ppm, 6.4 ppm (m, C=CH$_2$), and 6.1 ppm (m, C=CH) associated with the vinyl groups of acrylic acid esters.

An example of the production of a cured film produced from acrylated polyVESFA is as follows: 47 mg of Irgacure 184 photoinitiator from Ciba was dissolved in 0.178 gm of 1,6-hexanediol diacrylate. Next, 1 gm of acrylated poly-VESFA-2 was added to the mixture resulting in a homogeneous solution. The solution was applied over a Teflon® film adhered to a glass panel using a drawdown bar (BYK Gardner) to produce a 200 micron thick wet film and the mixture cured by passing the coated panel through a F300 UVA lamp from Fusion UV Systems (UVA light intensity ~1420 mW/cm$^2$ as measured by UV Power Puck® II from EIT Inc) equipped with a bench top conveyor belt running at a belt speed of 24 feet/min. A free film of the coating was characterized using dynamic mechanical thermal analysis (Q800 from TA Instruments). The experiment was carried out from −90° C. to 150° C. using a heating rate of 3° C./min., frequency of 1 Hz, and strain amplitude of 0.03%. The T$_g$ obtained from the peak maximum in the tan δ response was 29.9° C.

An example of the synthesis of acrylated polyVESFA (A-polyVESFA-1) is as follows: In a 250 ml two-neck round-bottom flask, epoxidized polyVESFA-1, hydroquinone, and potassium acetate were dissolved in toluene. The rapidly stirring solution was heated to 110° C. and acrylic acid was added drop wise over the period of 30 minutes. After 42 hours of reaction, the temperature was cooled to room temperature. The crude product was diluted with methylene chloride and washed with deionized water. The organic layer was dried with anhydrous magnesium sulfate. The pure polymer was isolated by rotary evaporation of solvents and drying under vacuum overnight. A reference material, acrylated soybean oil, was produced from epoxidized soybean oil (Vikoflex-7170 from Arkema, epoxy equivalent weight=233 g/eq). The following table lists the amount of raw materials used to synthesize A-polyVESFA-1 and acrylated soybean oil.

| Formu-lation | Hydro-quinone (mg) | Potassium acetate (mg) | Toluene (gm) | Acrylic acid (gm) | E-poly VESFA-1 (gm) | ESO (gm) |
|---|---|---|---|---|---|---|
| Experi-mental | 12.9 | 62.5 | 49.7 | 2.46 | 10.09 | — |
| Reference | 130.4 | 652 | 492.6 | 30.38 | — | 100 |

A series of radiation cured coatings were prepared by mixing A-polyVESFA-1, Irgacure 184 photoinitiator from Ciba, and 1,6-hexanediol diacrylate together using a FlackTek mixer at 3500 rpm for 3 minutes. An analogous series of reference coatings was produced by replacing A-poly-VESFA-1 with synthesized A-soybean oil. The table below describes the compositions of the coatings produced.

| Sample ID | Wt. % A-polyVESFA-1 | Wt. % Acrylated soybean oil | Wt. % 1,6-hexanediol diacrylate | Wt. % Irgacure 184 |
|---|---|---|---|---|
| Experimental-1 | 58.6 | — | 39 | 2.4 |
| Experimental-1 | 59.4 | — | 39.6 | 1 |
| Reference-1 | — | 58.6 | 39 | 2.4 |
| Reference-2 | — | 59.4 | 39.6 | 1 |

In order to characterize cure kinetics of the UV curable materials described above, a photo DSC experiment was performed using a Q 1000 differential scanning calorimeter (TA Instruments) equipped with a photocalorimetric accessory (PCA). The experiment was carried out at a UV light intensity of 50 mW/cm$^2$ and a temperature of 30° C. Samples were equilibrated for 1 minute before exposure to UV light for 30 seconds. The following table lists the time period associated with the peak maximum of the reaction exotherm (i.e. time to peak maximum) obtained by UV light exposure for both the reference and experimental coatings. From the table below, it can be seen that the coatings based on A-polyVESFA-1 possessed faster cure rates as indicated by the shorter time period associated with peak of the reaction exotherm.

| Sample ID | Time to peak maximum (seconds) | $\Delta H_{Photopolymerization}$ (J/g) |
|---|---|---|
| Experimental-1 | 2.0 | 306.8 |
| Experimental-2 | 2.8 | 294.5 |
| Reference-1 | 3.0 | 315.2 |
| Reference-2 | 3.8 | 311.5 |

In addition to photo-DSC, a real-time FTIR(RTIR) instrument was used to characterize cure kinetics. The RTIR experiments were carried out using a Nicolet Magna-IR 850 spectrometer Series II. The light source was a LESCO Super Spot MK II 100 W DC UVA mercury vapor short lamp. Samples were spin-coated onto a KBR plate at 4000 rpm for 20 seconds and exposed to UV light for 1 minute. FTIR Spectra were taken at 1 spectrum/s with a resolution of 4 cm$^{-1}$. The experiment was carried out in air at 25° C. and the UV light intensity was 34 mW/cm$^2$ as measured by UV Power Puck II from EIT Inc. The consumption of C=C groups in the acrylate was determined by monitoring the peak area in between 1605 cm$^{-1}$ and 1650 cm$^{-1}$. For Experimental-1, Experimental-2, Reference-1, and Reference-2, the percent of C=C conversion after 5 seconds of UV light exposure were 72.2, 58.5, 65.5, and 34.3, respectively. With 1 minute of light exposure, Experimental-1, Experimental-2, Reference-1, and Reference-2, reached C=C conversions of 77.1%, 63.6%, 74.9% and 38.5%, respectively. This data further illustrates the result that coatings based on A-polyVESFA provide faster free radical photocure than analogous coatings based on A-soybean oil.

Example IX

Polyols

Model polymer networks based on epoxidized polyVESFA can be produced, characterized, and compared to analogous networks derived from epoxidized soybean oil. Both epoxidized polyVESFA and epoxidized soybean oil can be converted to polyol derivatives by ring-opening the epoxide groups with methanol (Zlatanic, et al., *J. Polym. Sci., Part B: Polym. Phys.*, 42, 809-819 (2003)). The polyols can be used to prepare model polyurethane networks and the properties of the networks prepared from polyVESFA-based polyols compared to analogous polyols derived from soybean oil.

Figure 17:
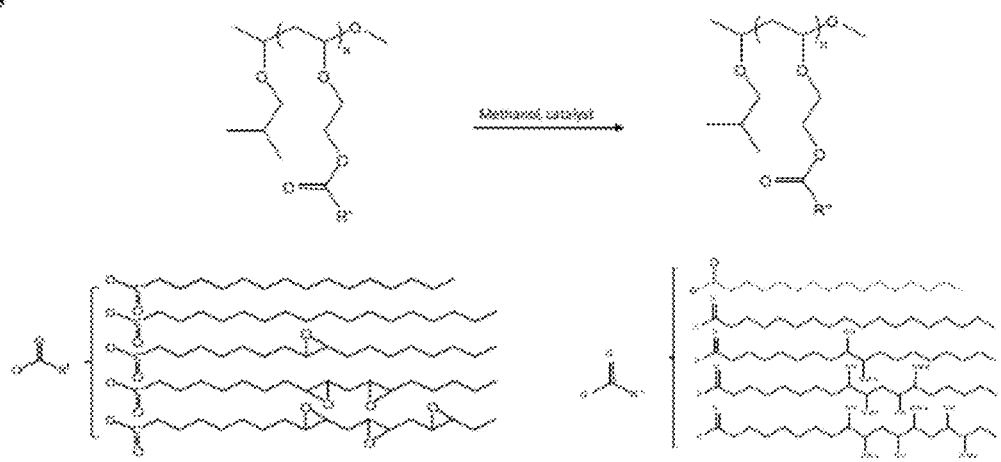
FIG. 17 shows a synthetic scheme for production of polyols using polyVESFA and E-VESFA.

Polyols are important building-blocks for producing crosslinked materials such as crosslinked polyurethanes. Polyols can be produced from E-polyVESFA and epoxidized VESFA copolymers using a process such as that shown in FIG. 17.

Example X

Utility of Novel Soybean Oil-Based Polymers in Rubber Compounds

Rubber compounds for applications such automobile tires are multicomponent materials based largely on petroleum-derived starting materials. For example, it has been shown that soybean oil and/or its derivatives can be used to improve the elongation of EPDM rubbers and displace some of the petroleum-based processing oils in tire tread compounds (Brentin and Sarnacke, "Rubber Compounds: A Market Opportunity Study").

The International Rubber Study Group reported that the total volume of rubber consumed globally in 2011 was 25.7 million metric tons with tire manufacturing consuming about 60% of the total. Based on the size of this market, it can be understood that even modest use of soybean oil-based materials in this market translates to significant volumes of soybeans. For example, if just 1% of the total volume of rubber consumed in 2011 was displaced by polyVESFA, which is 75 weight percent soybean oil, the total number of bushels of soybeans would be over 2 million bushels. Previous research has shown that soybean oil has the potential to replace some petroleum-based components in rubber compounds. Considering the enormous size of the rubber industry and the price and supply volatility of petrochemicals, this market may represent a major opportunity for the use soybean oil-based materials.

We have developed a process to produce high molecular weight polymers from a novel monomer derived from soybean oil. The novel monomer, which is being referred to as vinyl ether of soybean oil fatty acid esters (VESFA) or (2-vinyloxy)ethyl soyate (2-VOES) is 75 weight percent soybean oil and can be readily produced using a process analogous to that used to produce soy biodiesel. We have scaled the monomer synthesis up to a volume of 10 liters without issue. The polymerization process developed for VESFA allows for high molecular weight polymer to be produced without consuming the unsaturation in the fatty acid pendent groups. The polymerization process also enables control of polymer molecular weight and the production of copolymers.

The primary difference between the homopolymer of VESFA (i.e. polyVESFA) and soybean oil is the number of unsaturated groups per molecule. In contrast to soybean oil triglycerides which have three fatty acid chains per molecule, polyVESFA possesses 100 s of fatty acid chains per molecule. Thus, the number of functional groups per molecule for polyVESFA is 1 to 2 orders of magnitude higher than soybean oil. This difference in chemical structure was shown to dramatically decrease cure times of coating compositions and significantly increase coating modulus/hardness. In addition, due to the higher molecular weight of polyVESFA as compared to soybean oil much less shrinkage upon cure occurs which enables higher adhesion to substrates.

With respect to rubber compounds, the polymer technology developed is expected to possess some major advantages over traditional soybean oil and soybean oil derivatives. First, the dramatically higher number of unsaturated groups per molecule associated with polyVESFA will ensure grafting of the polymer into the crosslinked rubber matrix preventing extraction of the polymer from the vulcanized rubber and enhancing mechanical properties such as modulus, strength, and abrasion resistance. In addition, and perhaps more importantly, the ability to copolymerize VESFA with other monomers provides a new method for tailoring basic polymer properties such as glass transition temperature, solubility parameter, and chemical functionality. By proper selection of comonomers for use in conjunction with VESFA copolymers, the solubility/compatibility of the copolymer with a specific type of rubber can be enhanced. In addition, appropriate functional groups can be incorporated through copolymerization that provide for favorable interactions between the copolymer and specific components of the rubber compound such as filler particles. Enhancing interactions between the polymer matrix and filler particles can provide dramatic enhancements in mechanical properties including modulus, tensile strength, toughness, and abrasion resistance.

PolyVESFA polymers can be incorporated into rubber compounds for tires. Vulcanized polyVESFA and VESFA copolymers may also have potential application as factice. These vulcanized polymers can be compared to soybean oil factice produced using analogous vulcanization conditions.

The soybean oil-based polymer technology of the present invention is expected to be useful for application in rubber compounds, particularly in tire tread applications.

Figure 18:
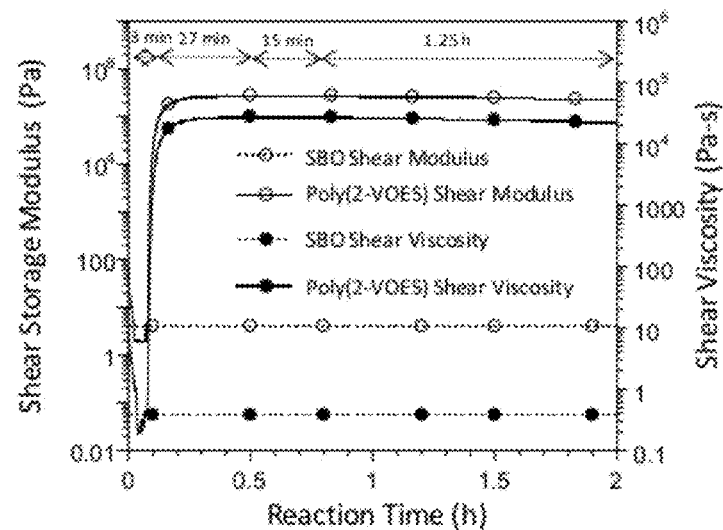
FIG. 18 shows rheology data obtained at 140° C.
Figure 19:
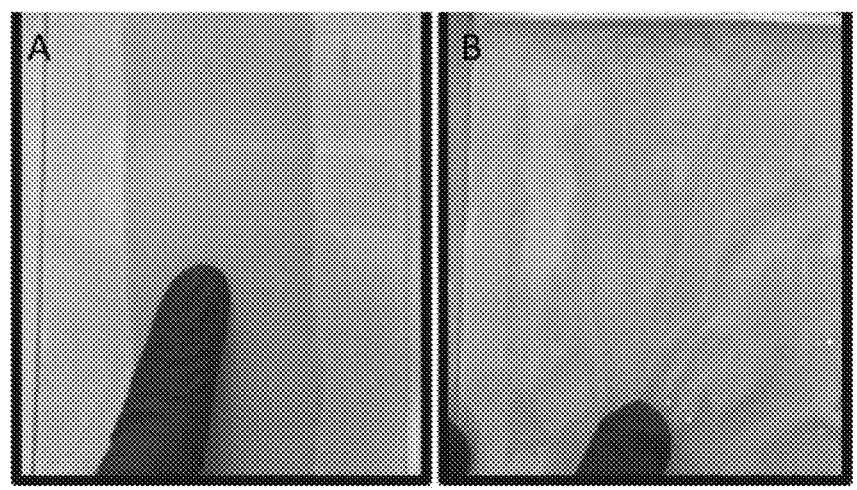
FIG. 19A shows an image of a poly(VESFA) composition cast onto a glass panel and cured at 140° C. for 45 minutes.
FIG. 19B shows an image of a soybean oil composition cast onto a glass panel and cured at 140° C. for 45 minutes.

A proof-of-concept experiment has been conducted in which a polyVESFA sample was blended with typical reagents used to vulcanize rubber and the composition cured at 140° C. For comparison, an analogous composition was prepared using conventional soybean oil in place of polyVESFA. The vulcanization process was monitored with time at 140° C. using a parallel plate rheometer. As shown in FIG. 18, the viscosity and shear modulus of the polyVESFA material increased by a few orders of magnitude in under 5 minutes, while that of the soybean oil-based material remained unchanged over the entire two hour period. This result indicates that polyVESFA produces a crosslinked network dramatically faster than that of soybean oil. In addition, films were cast onto glass panels and the panels placed in an oven set at 140° C. for 45 minutes. As shown in FIG. 19, the material based on soybean oil was still liquid while the material based on polyVESFA was a tack-free rubber. These results clearly demonstrate unique capabilities for polyVESFA as compared to conventional soybean oil in rubber compositions.

This technology will have major utility in rubber compounds which will drive the utilization of soybean-based materials in the rubber industry.

Example XI

Copolymerization of VESFA and Cyclohexyl Vinyl Ether (CHVE)

Copolymers of VESFA and CHVE were successfully produce using carbocationic copolymerization as follows: Prior to use, VESFA was dried with magnesium sulfate inside a glove box. CHVE (98%) was purchased from Sigma-Aldrich and distilled over calcium hydride before use. The copolymerization was carried out in a dry 500 ml, three-neck, round-bottom flask that was partially submerged in a heptane bath located inside a dry box and cooled to 0° C. The flask was equipped with an overhead stirrer. Within the glass vessel, the initiator (1-isobutoxyethyl acetate), VESFA, and CHVE were dissolved in dry toluene and the mixture allowed to cool to 0° C. The copolymerization was initiated by the addition of a 25 weight percent solution of ethylaluminum sesquichloride in toluene. Table 2 lists the weights of the components used for two different copolymerizations. After 17 hours of reaction, each copolymerization was terminated with chilled methanol, which caused the copolymer to precipitate. Each copolymer was washed multiple times with methanol. Copolymer yield was determined gravimetrically after drying the purified copolymer at 48° C. under vacuum overnight. Copolymer molecular weight was characterized using a high-throughput Symyx Rapid Gel Permeation Chromatography equipped with an evaporative light scattering detector (PL-ELS 1000) and polystyrene standards. Table 3 lists the data for monomer conversion and molecular weight.

TABLE 2

Compositions used to produce poly(VESFA-r-CHVE).

| Sample name | VESFA (g) | CHVE (g) | IBEA (mg) | Toluene (g) | $Et_{1.5}AlCl_{1.5}$ Solution (g) | $[VESFA]_o:[CHVE]_o$ $[IBEA]_o:[Et_{1.5}AlCl_{1.5}]_o$ |
|---|---|---|---|---|---|---|
| Poly(VESFA-r-CHVE)-50/50 | 10 | 10 | 86.2 | 105 | 4.8 | 53:147:1:18 |
| Poly(VESFA-r-CHVE)-75/25 | 15 | 5 | 66 | 105 | 3.67 | 104:96:1:18 |

TABLE 3

Data obtained from GPC and gravimetric analysis for the synthesis of poly(VESFA-r-CHVE).

| Sample name | Reaction Time (hour) | % Monomer Conversion | GPC number Average Molecular Weight | PDI* |
|---|---|---|---|---|
| Poly(VESFA-r-CHVE)-50/50 | 17 | 88.7 | 16,150 | 1.64 |
| Poly(VESFA-r-CHVE)-75/25 | 17 | 79.3 | 14,960 | 1.30 |

*PDI is the polydispersity index

The thermal properties of the poly(VESFA-r-CHVE) copolymers were determined using differential scanning calorimetry (Q1000 from TA Instruments) by first heating the sample from −120° C. to 70° C. at a heating rate of 10° C./minute ($1^{st}$ heat), cooling from 70° C. to −120° C. at a cooling rate of 10° C./minute (cooling), and reheating from −120° C. to 120° C. at a heating rate 10° C./minute ($2^{nd}$ heat). The thermogram obtained from the $2^{nd}$ heat of poly(VESFA-r-CHVE)-75/25 showed a glass transition at −86° C. and a very weak, diffuse melting transition with an enthalpy of melting of 0.63 J/g and a peak maximum at −23.5° C. The thermogram obtained from the $2^{nd}$ heat of poly(VESFA-r-CHVE)-50/50 showed a glass transition at 29° C. and a very weak, diffuse melting transition with an enthalpy of melting of 0.37 J/g and a peak maximum at −24.2° C.

Example XII

Cured Films of Poly(VESFA-r-CHVE)

Since the poly(VESFA-r-CHVE) copolymers possess unsaturation as a result of the VESFA repeat units, it was of interest to determine if crosslinked coatings could be produced using an auto-oxidation process. Cured films were produced as follows: poly(VESFA-r-CHVE), 12% cobalt octoate in mineral spirits, 18% zirconium octoate in mineral spirits, and 8% zinc Nuxtra® in mineral spirits, and toluene were mixed together using a FlackTek mixer at 3500 rpm for 3 minutes. Table 4 describes the compositions of the coating solutions produced. The cure/drying kinetics at ambient conditions were determined using a BK 3-Speed Drying Recorder (MICKLE Laboratory Engineering Co. Ltd., United Kingdom). Each coating mixture was casted over glass strips using a 25 mm cube film applicator to produce wet films of about 75 microns in thickness. The coating drying time was evaluated as open-time, dust-free time, and tack-free time according to the a BK 3-Speed Drying Recorder. The results obtained are shown in Table 5.

TABLE 4

Liquid coating compositions derived from poly(VESFA-r-CHVE) copolymers.

| Formulation | Cobalt octoate (mg) | Zirconium octoate (mg) | Zinc Nuxtra ® (mg) | Toluene (g) | Poly(VESFA-r-CHVE) (g) |
|---|---|---|---|---|---|
| Poly(VESFA-r-CHVE)-50/50 Co—Zr—Zn | 4.2 | 27.7 | 250 | 2.33 | 5 |
| Poly(VESFA-r-CHVE)-75/25 Co—Zr—Zn | 4.2 | 27.7 | 250 | — | 5 |

TABLE 5

Results obtained using a BK 3-Speed Drying Recorder

| Formulation | Open time (hr) | Dust free time (hr) | Tack free time (hr) |
|---|---|---|---|
| Poly(VESFA-r-CHVE)-50/50 Co—Zr—Zn | 0 | 0.7 ± 0.05 | 2.28 ± 0.3 |
| Poly(VESFA-r-CHVE)-75/25 Co—Zr—Zn | 1.81 ± 0.16 | 0.67 ± 0.14 | 20.3 ± 3.8 |

Example XIII

Epoxy-Functional Poly(VESFA-r-CHVE) Copolymers

Epoxy-functional poly(VESFA-r-CHVE) copolymers, referred to herein as E-poly(VESFA-r-CHVE), were prepared as follows: Poly(VESFA-r-CHVE) was dissolved in methylene chloride in a 1-liter, round-bottom flask and 3-chloroperoxybenzoic acid added with vigorous stirring. Table 6 lists the concentration of the reagents used to produce two different E-poly(VESFA-r-CHVE) copolymers. The reaction was run for 4 hours at room temperature at a stirrer speed of 650 rpm. After the reaction was complete, the polymer was precipitated into methanol, isolated by centrifugation, and dried under vacuum overnight. Successful synthesis of E-poly(VESFA-r-CHVE) was confirmed using proton NMR by observing the disappearance of peaks associated with CH═CH groups in the fatty acid ester chain of poly (VESFA-r-CHVE) at 5.3 ppm (m) and the corresponding appearance of peaks at 2.8-3.1 ppm (m) associated with the glycidyl groups in E-poly(VESFA-r-CHVE).

TABLE 6

A description of the reaction mixtures used to produce two different E-poly(VESFA-r-CHVE) copolymers.

| Sample name | poly(VESFA-r-CHVE)-50/50 (g) | poly(VESFA-r-CHVE)-75/25 (g) | Methylene Chloride (ml) | 3-chloroperoxybenzoic acid (g) |
|---|---|---|---|---|
| E-poly(VESFA-r-CHVE)-50/50 | 10 | — | 200 | 5.92 |
| E-poly(VESFA-r-CHVE)-75/25 | — | 10 | 200 | 8.88 |

The thermal properties of the two E-poly(VESFA-r-CHVE) copolymers were determined using differential scanning calorimetry (Q1000 from TA Instruments) by first heating the sample from −120° C. to 70° C. at a heating rate of 10° C./minute (1$^{st}$ heat), cooling from 70° C. to −120° C. at a cooling rate of 10° C./minute (cooling), and reheating from −120° C. to 120° C. at a heating rate 10° C./minute (2$^{nd}$ heat). The thermogram obtained from the 2$^{nd}$ heat of E-poly(VESFA-r-CHVE)-75/25 showed a glass transition at −53.5° C. and a very weak, diffuse melting transition with an enthalpy of melting of 0.57 J/g and a peak maximum at −19.4° C. The thermogram obtained from the 2$^{nd}$ heat of E-poly(VESFA-r-CHVE)-50/50 showed a glass transition at 34.5° C. and a very weak, diffuse melting transition with a peak maximum at −24.5° C.

Example XIV

Copolymers of VESFA and Triethylene Glycol Ethyl Vinyl Ether (TEGEVE)

Six different copolymers of VESFA and TEGEVE were synthesized using carbocationic polymerization. A representative procedure is as follows: VESFA and TEGEVE were dried with MgSO$_4$ inside a glove box. Inside a glove box, the dry VESFA and TGEVE were copolymerized at 0° C. in a three-neck, round-bottom that had been dried by heating at 200° C. overnight. A general procedure to synthesize copolymer 1 (Table 7) is as follows: 51.43 g of VESFA, 4.0 g of TGEVE, and 130 mg of initiator (1-isobutoxyethyl acetate (IBEA)) were dissolved in 346 mL of dry toluene and chilled to 0° C. The polymerization was initiated by the addition of 4.56 mL of a 25 weight percent solution of ethylaluminum sesquichloride in toluene. The reaction was terminated after 18 h by the addition of 346 mL of chilled methanol, which precipitated the copolymer. The copolymer was isolated and washed four times with methanol. The purified polymer was collected as a viscous liquid after drying under vacuum (5-7 mm of Hg) overnight.

Table 7 lists the composition of the reaction mixtures used to produce the six copolymers. For copolymers 5 and 6, precipitation upon addition of methanol did not occur. As a result, methanol was removed by vacuum stripping and the copolymer purified by passing a hexane solution of the copolymer through a column packed with silica to remove unreacted VESFA and then adding methylene chloride to column to recover the copolymer. The polymer was then recovered by vacuum stripping volatiles. The actual composition of the copolymers produced was determined using proton nuclear magnetic resonance spectroscopy ($^1$H NMR) and the results are displayed in Table 8. Using differential scanning calorimetry (DSC) the thermal properties obtained for the copolymers were determined. Each copolymer displayed a single glass transition temperature (Tg) and copolymers 1, 2, and 3 displayed a weak melting endotherm. Copolymers 4, 5, and 6 did not display a distinct melting transition. The Tg and melting temperatures obtained are provided in Table 8. For comparison purposes, data for a polyVESFA homopolymer and a polyTEGEVE homopolymer produced using carbocationic polymerization are also provided in the table. The molecular weight and molecular weight distribution (MWD) of the copolymers were characterized using gel permeation chromatography. The number-average molecular weight (Mn) and MWD data obtained are shown in Table 3. Values of Mn are expressed relative to polystyrene standards.

TABLE 7

Composition of the polymerization mixtures used to produce copolymers of VESFA and TEGEVE.

| Formulation ([M$_1$]$_0$:[M$_2$]$_0$:[I]$_0$: [Et$_{1.5}$AlCl$_{1.5}$]$_0$) | VESFA (M$_1$) wt., g | TEGEVE (M$_2$) wt., g | Initiator (I) wt., mg | Co-initiator (Et$_{1.5}$AlCl$_{1.5}$) volume, ml | Toluene volume, ml |
|---|---|---|---|---|---|
| Copolymer1 | 51.43 | 4.00 | 130 | 4.559 | 346 |
| Copolymer2 | 75.56 | 8.00 | 198 | 6.984 | 522 |
| Copolymer3 | 58.33 | 15.00 | 186 | 6.576 | 458 |
| Copolymer4 | 45.20 | 27.12 | 203 | 7.175 | 452 |
| Copolymer5 | 6.25 | 15.00 | 71 | 2.502 | 132 |
| Copolymer6 | 2.85 | 15.00 | 62 | 2.220 | 110 |

TABLE 8

Data obtained for Copolymers of VESFA and TEGEVE.

| Polymer | Wt. % VESFA | Wt. % TEGEVE | Tg (° C.) | Tm (° C.) | Mn (g/mole) | MWD |
|---|---|---|---|---|---|---|
| polyVESFA | 100 | 100 | −102 | 31 | 19,400 | 1.14 |
| polyTEGEVE | 0 | 0 | −77 | — | 15900 | 1.51 |
| Copolymer1 | 10 | 90 | −97 | 34 | 17,500 | 1.19 |
| Copolymer2 | 15 | 85 | −96 | 35 | 15,900 | 1.24 |
| Copolymer3 | 30 | 70 | −92 | 35 | 14,800 | 1.28 |
| Copolymer4 | 49 | 51 | −82 | 40 | 18,000 | 1.34 |
| Copolymer5 | 25 | 75 | −80 | — | 16100 | 1.39 |
| Copolymer6 | 16 | 84 | −79 | — | 15500 | 1.43 |

All of the copolymers synthesized produced stable dispersion in water when added to water at a concentration of 30 wt %. In contrast, polyVESFA does not disperse in water and polyTEGEVE is completely soluble in water. Since these copolymers possess unsaturation in pendent groups derived from VESFA, it was of interest to determine if these copolymers could be used to produce crosslinked coatings when cast from an aqueous dispersion. Coatings were produced by simply mixing 12 g of copolymer, 28 g of water, and a certain amount of catalyst mixture (Co, Zr & Zn), which is shown in Table 9, using a SpeedMixer™-DAC 150 FVZ-K (Hauschild Engineering, Germany) for 10 minutes at 3500 rpm. The coatings were cast onto aluminum and glass panels and allowed to cure at ambient conditions. The cure time, defined as the time required to obtain a tack-free film as specified using a BK 3-Speed Drying Recorder (MICKLE Laboratory Engineering Co. Ltd., United Kingdom), was measured for the coatings and compared to analogous data obtained for polyVESFA. Since polyVESFA is not dispersible in water, the coating solution for this material was produced by mixing only with catalyst (i.e. no solvent was used). In addition to cure time, the Tg, hardness, water contact angle, surface energy, water contact angle hysteresis, and optical transparency of the coatings was measured. Tg was measured using DSC while water contact angle, surface energy, and water contact angle hysteresis were measured using a FTÅ 2000 (First Ten Angstrom, USA) instrument and FTA 32 software. Pendulum hardness was measured according to ASTM method D4366-95. Optical transparency was characterized using a UV-VIS spectrometer (Cary 50000, Varian) and scanning wavelengths ranging from 400 to 800 cm$^{−1}$. Table 10 displays the data obtained for the four experimental coatings and the control coating derived from polyVESFA.

TABLE 9

Catalyst description and composition for coating of 12 g polymer.

| Chemical/tradename | Description | Supplier | % of metal | Amount used (mg) |
|---|---|---|---|---|
| Cobalt octoate | Cobalt 2-ethylhexanoate, 12% cobalt | OMG Americas | 12% Co | 10.08 |
| Zirconium octoate | Zirconium 2-ethylhexanoate, 18% zirconium | OMG Americas | 18% Zr | 66.48 |
| Nuxtra ® Zinc | Zinc carboxylate in mineral spirits, 8% | Dura Chemicals | 8% Zn | 600.00 |

TABLE 10

Properties of coatings produced from copolymers 1, 2, 3, and 4.

| | Cure time (hrs) | Tg (° C.) | Hardness | WCA (°) | SE (mN/m) | CAH | RT @ 450/cm* | RT @ 600/cm* | RT @ 700/cm* |
|---|---|---|---|---|---|---|---|---|---|
| polyVESFA | 6.1 | −9 | 41 | 91 | 36 | 5.7 | 3.9 | 2.3 | 1.7 |
| Copolymer1 | 1.2 | −12 | 45 | 91 | 37 | 10.4 | 1.3 | 1.4 | 1.6 |
| Copolymer2 | 1.3 | −14 | 48 | 91 | 37 | 7.8 | 1.0 | 0.8 | 0.9 |
| Copolymer3 | 2.2 | −15 | 48 | 90 | 38 | 11.1 | 0.6 | 0.6 | 0.7 |
| Copolymer4 | 2.7 | −17 | 62 | 88 | 39 | 10.1 | 1.8 | 0.5 | 1.6 |

*RT is the reduction in transmittance compared to the uncoated glass substrate.

All of the coatings based on the VEFSA/TEGEVE copolymers cured into highly transparent coatings. Due to this result, it was interest to determine if VESFA/TEGEVE copolymers could be used to emulsify polyVESFA in water without having to use surfactant. The advantage of using a VESFA/TEGEVE copolymer as an emulsifier is that, unlike a conventional surfactant, it will crosslink into the cured polymer network and, thus, should not phase separate resulting in a reduction in the optical transparency. Table 11 describes the coating solutions prepared. The catalyst used for these coating is same as described in Table 9 for 12 g of total polymer.

TABLE 11

Coating dispersions prepared from polyVESFA and VESFA/TEGEVE copolymers.

| | polyVESFA (g) | Copolymer2 (g) | Copolymer3 (g) | Water (g) |
|---|---|---|---|---|
| Coating 1 | 10.2 | 1.8 | — | — |
| Coating 2 | 8.4 | 3.6 | — | 28 |
| Coating 3 | 6.0 | 6.0 | — | 28 |
| Coating 4 | 10.2 | — | 1.8 | 28 |
| Coating 5 | 8.4 | — | 3.6 | 28 |
| Coating 6 | 6.0 | — | 6.0 | 28 |

All six coatings formed stable dispersions that were cast onto glass panels and allowed to cure at ambient conditions. The cure time, defined as the time required to obtain a tack-free film as specified using a BK 3-Speed Drying Recorder (MICKLE Laboratory Engineering Co. Ltd., United Kingdom), was measured for each coating along with Tg, hardness, water contact angle, surface energy, water contact angle hysteresis, and optical transparency. Table 12 lists the data obtained for these coatings.

TABLE 12

Coating dispersions prepared from polyVESFA and VESFA/TEGEVE copolymers.

| | Cure time (hrs) | Tg (° C.) | Hardness | WCA (°) | SE (mN/m) | CAH | RT @ 450/cm* | RT @ 600/cm* | RT @ 700/cm* |
|---|---|---|---|---|---|---|---|---|---|
| Coating 1 | 2.6 | −11 | 36 | 89 | 38 | 12.0 | 1.2 | 1.1 | 1.2 |
| Coating 2 | 3.5 | −12 | 44 | 90 | 39 | 10.4 | 1.0 | 0.9 | 1.0 |
| Coating 3 | 6.7 | −11 | 44 | 89 | 39 | 8.0 | 1.2 | 1.1 | 1.2 |
| Coating 4 | 6.0 | −8 | 41 | 91 | 36 | 5.5 | 1.5 | 1.4 | 1.5 |
| Coating 5 | 7.6 | −11 | 48 | 91 | 37 | 7.0 | 1.1 | 1.0 | 1.2 |
| Coating 6 | 8.2 | −11 | 45 | 90 | 37 | 8.2 | 1.6 | 1.5 | 1.6 |

*RT is the reduction in transmittance compared to the uncoated glass substrate.

As indicated by the data displayed in Table 12, all of the coatings produced highly transparent cured films indicating that VESFA/TEGEVE can be used as a reactive emulsifier for polyVESFA. For comparison purposes, a water-based coating of polyVESFA was prepared using a conventional surfactant (ETHAL OA-23/70% and ETHAL OA-35/70%) of 10 wt % to emulsify the polyVESFA. After drying it was found that the coating surface was not homogeneous and non-transparent.

Example XV

Synthesis of the Vinyl Ether of Corn Oil Fatty Acid Esters (VECFA)

A vinyl ether monomer based on corn oil was synthesized as follows: 185 g of corn oil, 196 g of ethylene glycol monovinylether, and 5.56 g of anhydrous potassium hydroxide were added to a two-neck, 1000 ml, round-bottom flask and stirred at 70° C. for 3 hours under a blanket of nitrogen. The reaction mixture was cooled to room temperature and diluted with 1.1 liter of n-hexane. The organic layer was separated from the aqueous layer and washed once with 350 ml of aqueous acid (pH 4) and multiple times with deionized (DI) water until the wash water was neutral as indicated by litmus paper. The hexane layer was then dried with anhydrous magnesium sulfate. The product was recovered by rotary evaporation of n-hexane and dried under vacuum overnight. Proton NMR was used to confirm the production of VECFA: $^1$H NMR: 6.46 ppm (q, 1H, OCH=C), 4.0-4.15 ppm (m, 2H, C=CH$_2$), 4.25 ppm (t, 2H, COOCH$_2$C), 3.84 ppm (t, 2H, OCH$_2$C), 5.3 ppm (m, 3.3H, CH=CH), 2.3 ppm (t, 2H, OCOCH$_2$), 0.8 ppm (m, 3H, CH$_3$C), 1.58 ppm (m, 2H, COCH$_2$CH$_2$C).

Example XVI

Polymerization of VECFA

VECFA was polymerized using carbocationic polymerization as follows: Prior to use, VECFA was dried with magnesium sulfate inside a glove box. The reaction was carried out in a dry 1000 ml, two-neck, round-bottom flask partially submerged in a heptanes bath at 0° C. inside a dry box. In the reaction vessel 115 mg of initiator (1-isobutoxyethyl acetate) and 50 g of VECFA were dissolved in 258 g of toluene and the solution chilled to 0° C. The polymerization was started by the addition of 7.08 ml of a 25 weight percent solution of ethylaluminum sesquichloride in toluene. The polymerization was terminated after 18 hours by the addition of 300 ml of chilled methanol, which caused the polymer to precipitate. The polymer was washed with methanol and isolated using centrifugation. Polymer yield was determined gravimetrically after drying the purified polymer at 48° C. under vacuum overnight. The yield was found to be 78.5 weight percent. Polymer molecular weight was characterized using a high-throughput Symyx Rapid Gel Permeation Chromatography equipped with an evaporative light scattering detector (PL-ELS 1000) and polystyrene standards. The number average molecular weight and molecular weight distribution were determined as 21,400 g/mole and 1.18 respectively.

Example XVII

Characterization of the Polymerization of VECFA

Figure 20:
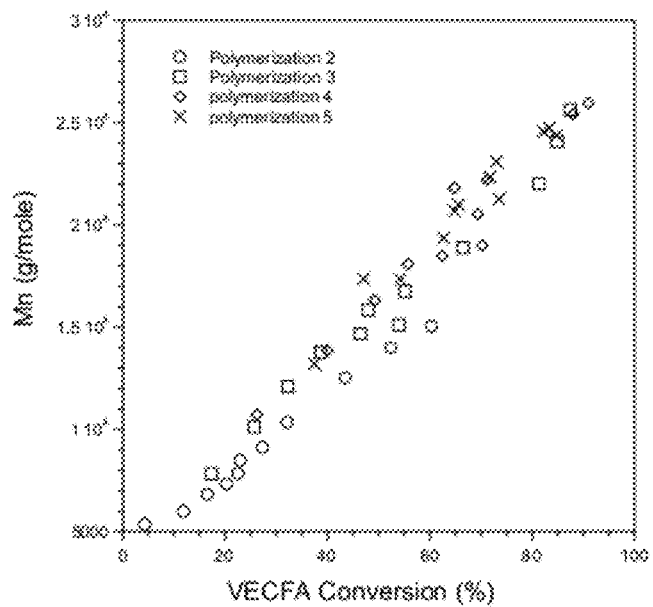
FIG. 20 shows plots of Mn as a function of VECFA conversion for polymerizations conducted using different $Et_{1.5}AlCl_{1.5}$ concentrations.

The characteristics of the polymerization of VECFA were investigated as a function of coinitiator (i.e. ethylaluminum sesquichloride) concentration by monitoring polymer yield and polymer molecular weight as a function of polymerization time. Polymerization was carried out in a series of five dry 250 ml, two-neck, round-bottom flasks partially submerged in a heptane bath at 0° C. inside a dry box. Prior to use, VECFA was dried with magnesium sulfate inside the glove box. To each vessel, a cationic polymerization initiator, 1-isobutoxyethyl acetate (IBEA), and VECFA were dissolved in dry toluene and chilled to 0° C. Each polymerization was initiated by the addition of a 25 weight percent solution of ethylaluminum sesquichloride in toluene. Table 13 lists the quantity of each reagent charged to individual vessels. For each polymerization, aliquots of known weight were removed with time and terminated with chilled methanol, which caused the polymer to precipitate. Each polymer aliquot was washed multiple times with methanol and isolated using centrifugation. Polymer yield was determined gravimetrically after drying the purified polymer at 48° C. under vacuum overnight. Polymer molecular weight was characterized using a high-throughput Symyx Rapid Gel Permeation Chromatography equipped with an evaporative light scattering detector (PL-ELS 1000) and polystyrene standards. Tables 14-18 list the data obtained from the different polymerizations. As shown in Table 14, polymerization using the lowest $Et_{1.5}AlCl_{1.5}$ concentration was extremely slow. As shown in FIG. 20, all other polymerizations occurred within a reasonable time frame and produced polymerizations characterized by a linear relationship between number-average molecular weight (Mn) and VECFA conversion. This result indicates that all these polymerizations possessing "living" character. In addition, PDIs were relatively low. A general trend was found in which PDI increased slightly with increasing $Et_{1.5}AlCl_{1.5}$ concentration.

TABLE 13

Compositions used to investigate the effect $Et_{1.5}AlCl_{1.5}$ concentration on the polymerization of VECFA.

| Sample name | VECFA (g) | IBEA (mg) | Toluene (g) | $Et_{1.5}AlCl_{1.5}$ Solution (ml) | [VECFA]$_o$: [IBEA]$_o$: [$Et_{1.5}AlCl_{1.5}$]$_o$ |
|---|---|---|---|---|---|
| Polymerization 1 | 7 | 16 | 36.55 | 0.28 | 200:1:5 |
| Polymerization 2 | 7 | 16 | 36.38 | 0.55 | 200:1:10 |
| Polymerization 3 | 7 | 16 | 36.08 | 0.99 | 200:1:18 |
| Polymerization 4 | 7 | 16 | 35.51 | 1.65 | 200:1:30 |
| Polymerization 5 | 7 | 16 | 35.12 | 2.42 | 200:1:44 |

TABLE 14

Data obtained from Polymerization 1.

| Reaction Time (hour) | % Monomer Conversion | GPC number Average Molecular Weight | PDI* |
|---|---|---|---|
| 18.58 | 3.41 | 468.3 | 1.16 |
| 24.17 | 4.65 | 470.9 | 1.09 |
| 29.17 | 4.79 | 823 | 1.19 |

*PDI is the polydispersity index

TABLE 15

Data obtained from Polymerization 2.

| Reaction Time (hour) | % Monomer Conversion | GPC number Average Molecular Weight | PDI* |
|---|---|---|---|
| 1.52 | 4.24 | 5374 | 1.14 |
| 2.43 | 11.81 | 5986 | 1.17 |
| 3.43 | 16.56 | 6831 | 1.14 |
| 4.43 | 20.23 | 7326 | 1.16 |
| 5.43 | 22.51 | 7851 | 1.15 |
| 6.43 | 22.92 | 8498 | 1.16 |
| 8.52 | 27.27 | 9135 | 1.17 |
| 10.93 | 32.06 | 10350 | 1.16 |
| 18.52 | 43.40 | 12520 | 1.18 |
| 24.1 | 52.36 | 13990 | 1.17 |
| 29.1 | 60.27 | 15040 | 1.15 |

*PDI is the polydispersity index

TABLE 16

Data obtained from Polymerization 3.

| Reaction Time (hour) | % Monomer Conversion | GPC number Average Molecular Weight | PDI* |
|---|---|---|---|
| 1.48 | 17.30 | 7831 | 1.15 |
| 2.4 | 25.63 | 10130 | 1.16 |
| 3.4 | 32.25 | 12110 | 1.13 |
| 4.4 | 38.67 | 13780 | 1.13 |
| 5.4 | 46.39 | 14680 | 1.14 |
| 6.4 | 47.95 | 15830 | 1.16 |
| 7.48 | 53.99 | 15110 | 1.41 |
| 8.48 | 55.13 | 16760 | 1.17 |
| 10.9 | 66.49 | 18900 | 1.18 |
| 18.48 | 81.31 | 22010 | 1.2 |
| 24.1 | 84.85 | 24080 | 1.19 |
| 29.1 | 87.41 | 25620 | 1.17 |

*PDI is the polydispersity index

TABLE 17

Data obtained from Polymerization 4.

| Reaction Time (hour) | % Monomer Conversion | GPC number Average Molecular Weight | PDI* |
|---|---|---|---|
| 1.42 | 26.09 | 10720 | 1.18 |
| 2.33 | 39.98 | 13860 | 1.17 |
| 3.33 | 49.29 | 16320 | 1.15 |
| 4.33 | 55.73 | 18070 | 1.21 |
| 5.33 | 62.46 | 18470 | 1.22 |
| 6.33 | 64.79 | 21790 | 1.15 |
| 7.42 | 70.13 | 18990 | 1.22 |
| 8.42 | 69.39 | 20560 | 1.24 |
| 10.83 | 71.18 | 22210 | 1.26 |
| 18.42 | 87.97 | 25430 | 1.23 |
| 24 | 91.00 | 25970 | 1.26 |

*PDI is the polydispersity index

TABLE 18

Data obtained from Polymerization 5.

| Reaction Time (hour) | % Monomer Conversion | GPC number Average Molecular Weight | PDI* |
|---|---|---|---|
| 1.37 | 37.46 | 13170 | 1.21 |
| 2.28 | 47.11 | 17360 | 1.17 |
| 3.28 | 54.29 | 17350 | 1.31 |
| 4.28 | 62.61 | 19360 | 1.28 |
| 5.28 | 64.84 | 20710 | 1.26 |
| 6.28 | 65.73 | 21000 | 1.37 |
| 7.37 | 71.65 | 22330 | 1.24 |
| 8.37 | 73.63 | 21270 | 1.31 |
| 10.78 | 73.04 | 23090 | 1.29 |
| 18.37 | 82.23 | 24570 | 1.28 |
| 23.95 | 84.60 | 24380 | 1.35 |
| 28.95 | 83.26 | 24730 | 1.35 |

*PDI is the polydispersity index

The thermal properties of polyVECFA were determined using differential scanning calorimetry (Q1000 from TA Instruments) by first heating a sample from −120° C. to 70° C. at a heating rate of 10° C./minute (1$^{st}$ heat), cooling from 70° C. to −120° C. at a cooling rate of 10° C./minute (cooling), and reheating from −120° C. to 120° C. at a heating rate 10° C./minute (2$^{nd}$ heat). The thermogram obtained from the 2$^{nd}$ heat showed a glass transition at −98.5° C. and a very weak, diffuse melting transition with an enthalpy of melting of 6.3 J/g and a peak maximum at −32.5° C.

Example XVIII

Crosslinked Films of PolyVECFA

Crosslinked films of polyVECFA were prepared using an auto-oxidation process as follows: PolyVECFA, 12% cobalt octoate in mineral spirits, 18% zirconium octoate in mineral spirits, and 8% zinc Nuxtra® in mineral spirits were mixed together using a FlackTek mixer at 3500 rpm for 3 minutes. Table 19 describes the compositions of the liquid coatings produced. The coating based on corn oil was used a reference coating. The air-drying behavior of the coatings was characterized using a BK 3-Speed Drying Recorder (MICKLE Laboratory Engineering Co. Ltd., United Kingdom). A needle carrier holding 6 hemispherical ended needles travel across the length of six 305×25 mm coated glass strips with time. A weight of 5 gm is attached to each hemispherical needle to study the curing kinetics of the coating. Each liquid coating mixture was casted over the glass strips using a 25 mm cube film applicator to produce wet films about 75 microns in thickness. The coating cure was evaluated by determining the open-time, dust-free time, and tack-free time using a BK 3-Speed Drying Recorder. The results of the experiment are shown in Table 20. As indicated by the results shown in Table 20, the use of polyVECFA provides dramatically faster cure than the reference coating based on corn oil.

TABLE 19

Composition of a coating based on PolyVECFA and a reference coating based on corn oil.

| Formulation | Cobalt octoate (mg) | Zirconium octoate (mg) | Zinc Nuxtra ® (mg) | PolyVECFA (g) | Corn Oil (g) |
|---|---|---|---|---|---|
| Poly(VECFA)/Co—Zr—Zn | 4.2 | 27.7 | 250 | 5 | — |
| Corn oil/Co—Zr—Zn | 4.2 | 27.7 | 250 | — | 5 |

TABLE 20

Results obtained using the BK 3-Speed Drying Recorder and the coatings described in Table 8.

| Formulation | Open time (hr) | Dust free time (hr) | Tack free time (hr) |
|---|---|---|---|
| Poly(VECFA)/Co—Zr—Zn | 3.5 | 4.3 | 25 |
| Corn oil/Co—Zr—Zn | 22.4 | 40.5 | >48 |

Example XIX

Synthesis of 4-Vinyloxybutyl Soyate (4-VOBS)

4-VOBS was synthesized as follows: 100 g of soybean oil, 132 g of 1,4-Butanediol vinyl ether (99%, Sigma-Aldrich), and 3.28 g of anhydrous potassium hydroxide (≥85%, Sigma-Aldrich) were added to a two-neck, 100 ml, round-bottom flask and stirred at 70° C. for 3 hours under a blanket of nitrogen. The reaction mixture was cooled to room temperature and diluted with 600 ml of n-hexane. The organic layer was separated from the aqueous layer and washed once with 175 ml of aqueous acid (pH 4) and multiple times with deionized (DI) water until the wash water was neutral as indicated by litmus paper. The hexane layer was then dried with magnesium sulfate. The product was recovered by rotary evaporation of n-hexane and dried under vacuum overnight. Proton NMR was used to confirm the production of 4-VOBS: $^1$H NMR: 6.45 ppm (q, 1H, OCH=C), 3.6-4.2 ppm (m, 6H, C=CH$_2$, COOCH$_2$C, OCH$_2$C), 5.3 ppm (m, 3.3H, CH=CH), 2.3 ppm (t, 2H, OCOCH$_2$), 1.7 ppm (m, 4H, OCCH$_2$CH$_2$COO), 0.8 ppm (m, 3H, CH$_3$C).

Example. XX

Synthesis of Hydroxyl-Functional PolyVESFA

Figure 21:
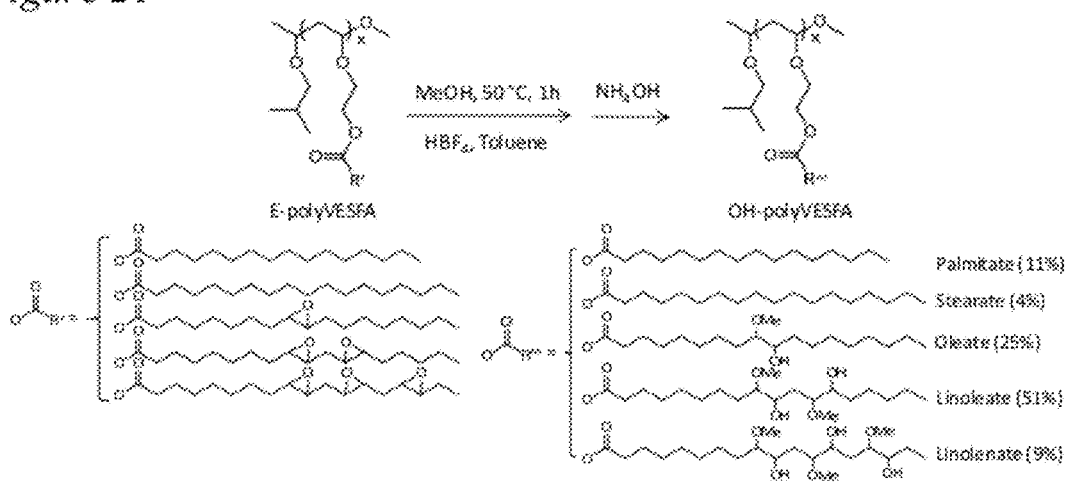
FIG. 21 shows a synthetic scheme used to produce OH-polyVESFA from E-polyVESFA.

A hydroxyl-functional derivative of polyVESFA (OH-polyVESFA) was synthesized from E-polyVESFA using the synthetic scheme shown in FIG. 21. A detailed procedure is as follows: 33.15 g of methanol and 1.94 g of tetrafluoroboric acid solution (48 wt. % in H$_2$O, Sigma-Aldrich) were combined in a 1-liter round bottom flask and the temperature maintained at 30° C. A solution of 60 g of E-polyVESFA and 340 g of toluene was added to the vessel with continuous stirring and the temperature raised to 50° C. After 1 hour of reaction, 3.8 ml of ammonium hydroxide solution (30% v/v NH$_4$OH in water) was added to neutralize the acidity of the reaction mixture and the solution cooled to room temperature. The organic layer was washed with 300 ml of deionized water thrice and dried with anhydrous magnesium sulfate. The polymer was stored as a 20.5 weight percent solution in toluene.

For comparison purposes, a hydroxyl-functional derivative of soybean oil (OH—SBO) was synthesized from epoxidized soybean oil (E-SBO) as follows: 41.26 g of methanol and 2.41 g of tetrafluoroboric acid solution (48 wt. % in H$_2$O, Sigma-Aldrich) were combined in a 1-liter round bottom flask and the temperature maintained at 30° C. A solution of 60 g of E-SBO and 340 g of toluene was added to the vessel with continuous stirring and the temperature raised to 50° C. After 1 hour of reaction, 4.75 ml of ammonium hydroxide solution (30% v/v NH$_4$OH in water) was added to neutralize the acidity of the reaction mixture and the solution cooled to room temperature. The organic layer was washed with 300 ml of deionized water thrice and dried with anhydrous magnesium sulfate. The product was collected after rotary evaporation of toluene and dried under vacuum overnight.

Figure 22:
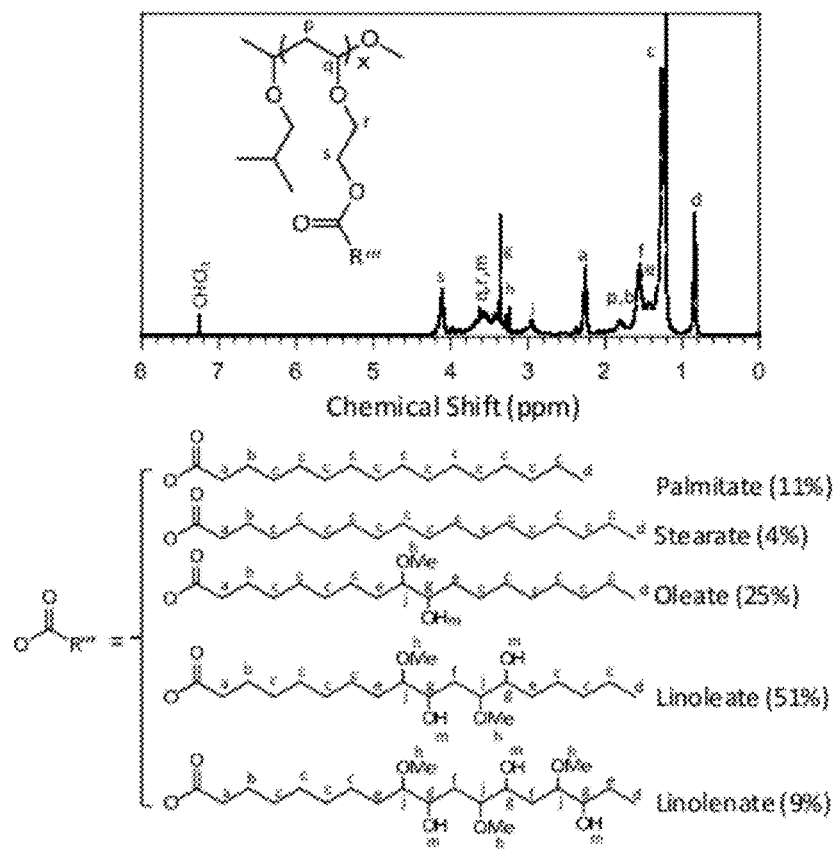
FIG. 22 shows a $^1$H NMR spectrum obtained for OH-polyVESFA.
Figure 23:
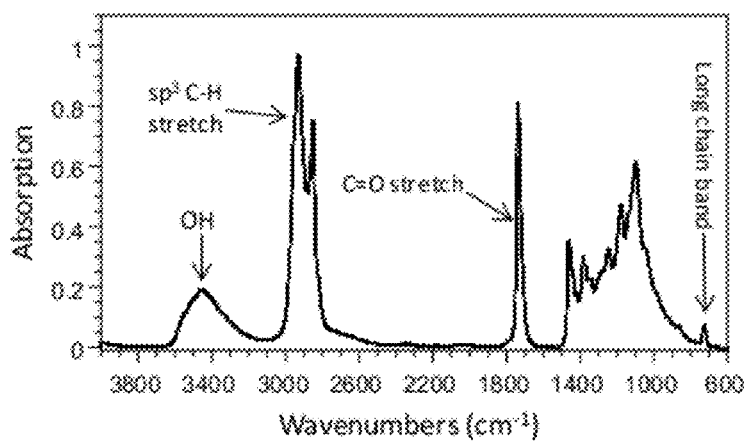
FIG. 23 shows a FTIR spectrum obtained for OH-polyVESFA.
Figure 24:
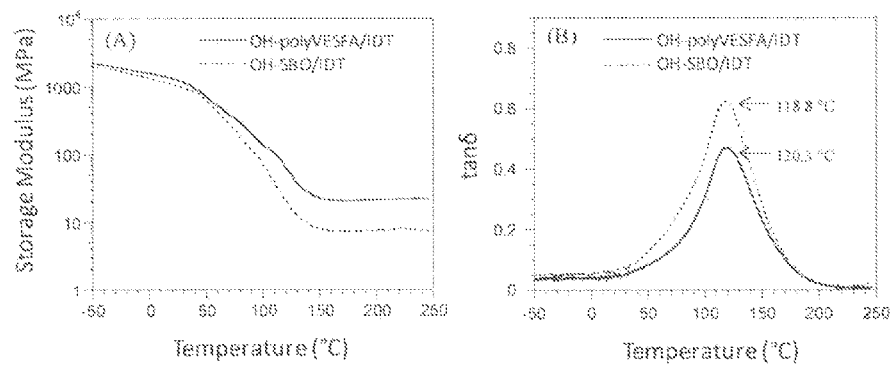
FIG. 24 shows viscoelastic properties obtained for free films produced from OH-polyVESFA and OH—SBO in a polyurethane coating system.

Successful synthesis of OH-polyVESFA was confirmed using $^1$H NMR and FTIR. FIG. 22 displays the $^1$H NMR spectrum for OH-polyVESFA which showed peaks between 3.2 and 3.3 ppm associated with the protons of the methoxy groups. From the FTIR spectrum (FIG. 23), the broad band centered at 3400 cm$^{-1}$, attributed to the hydroxyl group produced by epoxy ring opening with methanol, can be easily seen.

Coatings were prepared to compare the difference between OH-polyVESFA and OH—SBO in polyurethane coating systems. A polyol-isocyanate coating solution was prepared by mixing OH-polyVESFA, isophorone diisocyanate trimer (Tolonate® IDT from the Perstorp Group), dibutyl tin dilaurate (DBTDL), and toluene together using a FlackTek mixer at 3500 rpm for 3 minutes. An analogous reference coating was produced by replacing OH-polyVESFA with OH—SBO. Table 21 describes the compositions of the coatings produced.

Each liquid coating solution was cast into a template for producing free film specimens. The materials were cured by heating in an air oven at 80° C. overnight. Free films were characterized using dynamic mechanical thermal analysis.

TABLE 21

Compositions used to compare the difference between OH-polyVESFA and OH-SBO in polyurethane coating systems.

| Sample ID | OH-polyVESFA solution[1] (g) | OH-SBO[2] (g) | Tolonate® IDT[3] (g) | DBTDL solution[4] (mg) | Toluene (g) |
|---|---|---|---|---|---|
| OH-polyVESFA/IDT | 10.0 | — | 2.4 | 74.6 | — |
| OH-SBO/IDT | — | 5.0 | 7.1 | 200 | 21.2 |

[1]OH-polyVESFA solution: OH-polyVESFA dissolved in toluene at 20.5 wt. % solid.
[2]OH-SBO: Used as 100% solid.
[3]Tolonate® IDT: Used as supplied (70 wt. % solid in butyl acetate).
[4]DBTDL solution: 1 wt % DBTDL in toluene and butyl acetate mixture.

The viscoelastic properties of the polyurethanes were investigated by measuring storage modulus as a function of temperature. Table 22 lists the values of $T_g$, storage modulus, and crosslink density obtained from the data. The crosslink density (moles of crosslinks per unit volume) was calculated from the storage moduli in the rubbery plateau region. As shown in FIG. 4, the storage modulus of cured films produced from OH-polyVESFA was significantly higher than the analogous films produced from OH—SBO. This result is due to the much higher number of hydroxyl groups per molecule for OH-polyVESFA as compared to OH—SBO, which translates to a higher crosslink density (see Table 22).

TABLE 22

Storage modulus and $T_g$ data obtained from free films produced from OH-polyVESFA and OH-SBO in a polyurethane coating system.

| Formulation | Storage Modulus (MPa) at 170° C. | Crosslink Density (mole/lit) at 170° C. | $T_g$ (° C.) |
|---|---|---|---|
| OH-polyVESFA/IDT | 20.49 | 1.85 | 120.3 |
| OH-SBO/IDT | 7.29 | 0.66 | 118.8 |

Example XXI

Cured Films from Epoxy-Functional Poly(VESFA-r-CHVE)

A series of radiation curable liquid coatings were prepared by mixing E-poly(VESFA-r-CHVE), 3-methyloxetane-3-yl) methanol (Oxetane 101 from Dow Chemical), tetrahydrofuran (THF), and 50 wt. % triarylsulfonium hexafluoroantimonate salt in propylene carbonate (UVI 6974 photoinitiator from Dow Chemical) together using a FlackTek mixer at 3500 rpm for 3 minutes. Table 23 describes the compositions of the coatings produced. Each liquid coating mixture was cast over one Teflon® coated glass, two cold rolled steel Q-panels, two aluminum Q-panels, and one glass panel using a square draw down bar (BYK Gardner) to produce wet films about 200 microns in thickness. Liquid coatings produced from 70/30CoP(50/50VESFA/CHVE)/Ox-LI were dried at room temperature for 2 hours to remove THF. The films were then cured by passing coated substrates once under a F300 UVA lamp from Fusion UV Systems (UVA light intensity ~1420 mW/cm$^2$ as measured by UV Power Puck® II from EIT Inc.) equipped with a bench top conveyor belt set at a belt speed of 24 feet/min. Free films were characterized using dynamic mechanical thermal analysis (Q800 from TA Instruments). The experiment was carried out from −50° C. to 120°

C. using a heating rate of 5° C./min., frequency of 1 Hz, and strain amplitude of 0.02%. The $T_g$ was obtained from the peak maximum in the tan δ response. Cured coatings over metal substrates and the glass panel were characterized by MEK double rubs (ASTM D 5402-93), pencil hardness test (ASTM D 3363-00), Konig pendulum hardness test (ASTM D 4366-95), impact resistance test (ASTM D 2794-93), and mandrel bend test (ASTM D 522-90a). Table 24 lists $T_g$ and storage modulus of the rubbery plateau region (at 90° C.) for films produced using one pass under the UVA lamp, while Table 25 lists various properties obtained from coated substrates and the use of the different ASTM methods.

TABLE 23

Coating compositions based on E-poly(VESFA-r-CHVE) copolymers.

| Sample ID | wt. % E-poly(VESFA-r-CHVE)-75/25 (g) | wt. % E-poly(VESFA-r-CHVE)-50/50 (g) | Wt. % Oxetane 101 (g) | Wt. % UVI 6974 (g) | THF (g) |
|---|---|---|---|---|---|
| 70/30CoP(75/25VESFA/CHVE)/Ox-LI | 5 | — | 2.14 | 0.178 | — |
| 50/50CoP(75/25VESFA/CHVE)/Ox-LI | 5 | — | 5 | 0.25 | — |
| 70/30CoP(50/50VESFA/CHVE)/Ox-LI | — | 5 | 2.14 | 0.178 | 2.44 |

TABLE 24

$T_g$ and storage modulus of the rubbery plateau region (at 90° C.) for films produced from the coating compositions described in Table 23.

| Coating ID | $T_g$ form tan δ (° C.) | Storage modulus at 90° C. (MPa) |
|---|---|---|
| 70/30CoP(75/25VESFA/CHVE)/Ox-LI | 26.8 | 16.95 |
| 50/50CoP(75/25VESFA/CHVE)/Ox-LI | 19.2 | 0.83 |
| 70/30CoP(50/50VESFA/CHVE)/Ox-LI | 40 | 5.7 |

TABLE 25

The properties of cured films derived from the coating compositions described in Table 23.

| Coating ID | Thickness (μm) | Pencil hardness | König pendulum hardness (s) | Reverse impact (in-lb) | MEK double rubs | Mandrel bend Test |
|---|---|---|---|---|---|---|
| 70/30CoP(75/25VESFA/CHVE)/Ox-LI | 105 | 5H | 27 | 92 | 303 | Pass |
| 50/50CoP(75/25VESFA/CHVE)/Ox-LI | 104 | 4H | 19 | 88 | 124 | 21.5% |
| 70/30CoP(50/50VESFA/CHVE)/Ox-LI | 78 | 6H | 45 | 32 | 83 | Pass |

Example XL

Block Copolymers Produced from VESFA and CHVE

Figure 25:
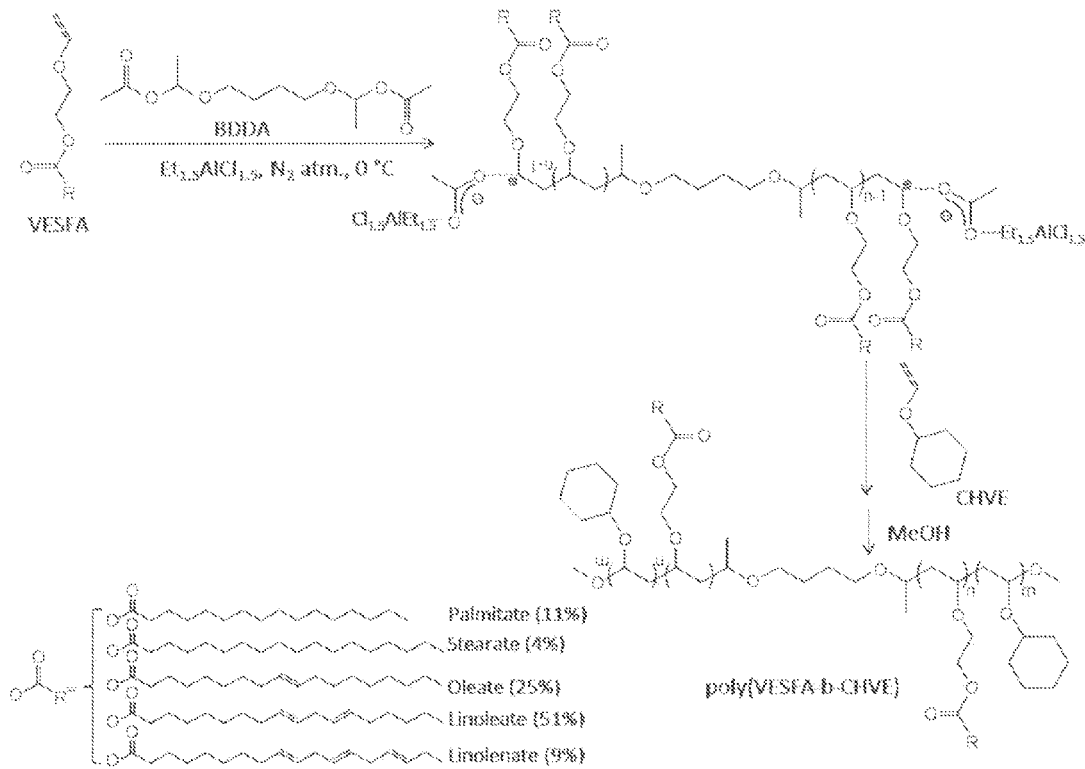
FIG. 25 shows a synthetic scheme used to produce a poly(CHVE-b-VESFA-b-CHVE) A-B-A triblock copolymer.
Figure 26:
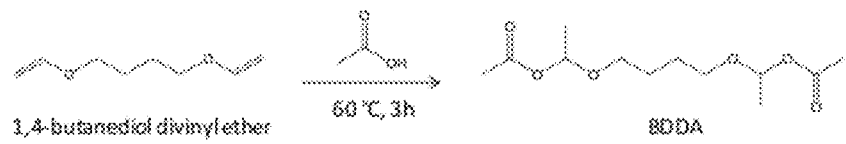
FIG. 26 shows a synthetic scheme used to produce BDDA.

Block copolymers of VESFA and CHVE monomers were produced by employing the carbocationic polymerization scheme shown in FIG. 25. CHVE (TCI America, >95%), methyl acetate (MAc), and toluene were distilled over calcium hydride before use. VESFA was dried with magnesium sulfate before use. A di-functional initiator, 1,1'-(butane-1,4-diylbis(oxy))bis(ethane-1,1-diyl)diacetate (BDDA), was used to produce the A-B-A block copolymer in which the A blocks were derived from polymerization of CHVE and the B block was derived from polymerization of VESFA. The synthesis of BDDA, illustrated in FIG. 26, was accomplished as follows: 7.09 g of glacial acetic acid and 6 g of 1,4-butanediol divinyl ether (Sigma-Aldrich, 98%) were combined in a 250 ml, 2-neck round bottom flask fitted with a reflux condenser and heated at 60° C. for 3 hours. Next, the reaction mixture was cooled down to room temperature and diluted with 100 ml of diethyl ether. The organic layer was washed thrice with deionized water (DI) and dried with anhydrous magnesium sulfate. The product was recovered by rotary evaporation of the diethyl ether and dried with anhydrous magnesium sulfate. Proton NMR was used to confirm the production of BDDA: $^1$H NMR (CDCl$_3$) δ 5.87 ppm (q, 2H, O—CH—O), 3.63, 3.46 ppm (m, 4H, O—CH$_2$—C), 2.04 ppm (s, 6H, O=C—CH$_3$), 1.35 ppm (d, 6H, O—C—CH$_3$).

A poly(CHVE-b-VESFA-b-CHVE) block copolymer was synthesized as follows: To a dry 40 ml vial partially submerged in a heptanes bath at 0° C. inside a dry box, a 194 mg solution of BDDA in toluene (4.7 mg of BDDA in 189 mg of toluene) and 2.5 g of VESFA monomer ([VESFA]$_o$:[BDDA]$_o$=400:1) were dissolved in 13.125 g of toluene and the solution chilled to 0° C. The polymerization was started by the addition of 0.354 ml of ethylaluminum sesquichloride solution (25 wt. % in toluene) to the reaction mixture. After 25 hours of reaction, an aliquot (Composition-A) of known weight was removed and terminated with methanol to determine the percent conversion of VESFA, number average molecular weight, and molecular weight distribution. Next, the remaining polymerization mixture was divided into three dry, chilled 40 ml vials labeled copolymer-1, copolymer-2, and copolymer-3. Pre-chilled toluene and methyl acetate (MAc) were added to each of the polymerization mixtures at the levels listed in Table 26 and mixed vigorously. Immediately after that, the second monomer, pre-chilled CHVE, was added and reactions were continued for 4 hours. The copolymers were precipitated from the reaction mixture by the addition of 10 ml of methanol and washed thrice with excess methanol. PolyVESFA and copolymer yields were determined gravimetrically after drying the purified polymer at 48° C. under vacuum overnight.

TABLE 26

Chemical composition of Copolymer-1, 2, and 3.

| Block Copolymer | wt. of polyVESFA reaction mixture (g) | wt. of methyl acetate (g) | wt. of toluene (g) | wt. of CHVE (g) | $[VESFA]_o:[CHVE]_o:$ $[BDDA]_o:[MAc]_o:$ $[Et_{1.5}AlCl_{1.5}]_o$ | VESFA/ CHVE wt. %/wt. % |
|---|---|---|---|---|---|---|
| Copolymer-1 | 3.5 | 0.106 | — | 0.181 | 400:370:1:370:36 | 75/25 |
| Copolymer-2 | 3.5 | — | 0.949 | 0.181 | 400:370:1:370:36 | 75/25 |
| Copolymer-3 | 3.5 | 0.106 | 0.949 | 0.181 | 400:370:1:370:36 | 75/25 |

For comparison purposes, the homopolymer of CHVE (i.e. polyCHVE) was produced using carbocationic polymerization as follows: To a dry 500 ml two neck round bottom flask partially submerged in a heptanes bath at 0° C. inside a dry box, 108 mg of initiator (1-isobutoxyethyl acetate, IBEA), 17 g of CHVE monomer ($[CHVE]_o:[IBEA]_o=200:1$) that had been previously dried by distillation over calcium hydride, and 3.49 g of methyl acetate, MAc, ($[CHVE]_o:[MAc]_o=200:70$) were dissolved in 89.25 g of dry toluene and the solution chilled to 0° C. The polymerization was started by the addition of 1.844 ml of ethylaluminum sesquichloride solution (25 wt. % in toluene) ($[CHVE]_o: [Et_{1.5}AlCl_{1.5}]_o=200:5$) to the reaction mixture. The reaction was terminated after 5 minutes of reaction by the addition of 100 ml of chilled methanol which caused the polymer to precipitate. The polymer was washed with methanol thrice. Polymer yield, which was determined gravimetrically after drying the purified polymer at 60° C. under vacuum overnight, was found to be 97%. Polymer molecular weight was characterized using a high-throughput Symyx Rapid Gel Permeation Chromatography (GPC) equipped with an evaporative light scattering detector (PL-ELS 1000) and polystyrene standards. Table 27 shows the percentage of conversion, number average molecular weight (expressed relative to polystyrene standards), and molecular weight distribution for polyVESFA, polyCHVE, and copolymer-1, 2, and 3.

TABLE 27

Monomer conversion, number average molecular weight (Mn), and molecular weight distribution (MWD) data obtained for polyVESFA, polyCHVE, and Copolymers 1, 2, and 3.

| Polymer | Conversion (%) | $M_n$ | MWD |
|---|---|---|---|
| polyVESFA | 71 | 32,130 | 1.24 |
| polyCHVE | 97 | 20,090 | 1.41 |
| Copolymer-1 | 84 | 46,990 | 1.42 |
| Copolymer-2 | 84 | 47,010 | 1.54 |
| Copolymer-3 | 84 | 47,190 | 1.4 |

The thermal property of the copolymer-3 was determined using differential scanning calorimetry (Q1000 from TA Instruments) by first heating the sample from −120° C. to 70° C. at a heating rate of 10° C./minute ($1^{st}$ heat), cooling from 70° C. to −120° C. at a cooling rate of 10° C./minute (cooling), and reheating from −120° C. to 120° C. at a heating rate 10° C./minute ($2^{nd}$ heat). The thermogram obtained from the $2^{nd}$ heat showed two glass transitions at −98° C. and 45° C., and a very weak, diffuse melting transition with an enthalpy of melting of 5.8 J/g and a peak maximum at −32° C.

Example XXIII

Block Copolymers Produced from VECFA and CHVE

A-B-A triblock copolymers possessing A blocks derived from CHVE and a B block derived from VECFA were produced as follows: To a dry 40 ml vial partially submerged in a heptanes bath at 0° C. inside a dry box, a 194 mg solution of BDDA in toluene (4.7 mg of BDDA in 189 mg of toluene) and 2.5 g of VECFA dried over magnesium sulfate ($[VECFA]_o:[BDDA]_o=400:1$) were dissolved in 13.125 g of toluene and the solution chilled to 0° C. The polymerization was started by the addition of 0.354 ml of ethylaluminum sesquichloride solution (25 wt. % in toluene). After 25 hours of reaction, an aliquot of the reaction mixture (Composition-A) was removed and terminated with methanol to determine the percent conversion of VECFA monomer, polymer number average molecular weight, and molecular weight distribution. Next, the remaining polymerization mixture was divided into two dry, chilled 40 ml vials labeled Copolymer-1 and Copolymer-2. Pre-chilled methyl chloroacetate acetate (MCAc) was added to the Copolymer-2 mixture at the level indicated in Table 28 and mixed vigorously. Immediately after that, the second monomer, CHVE, was added to each of the two vials and reactions were continued for 17 hours. The copolymers were precipitated from the reaction mixtures by the addition of 10 ml of methanol and washed thrice with excess methanol. PolyVECFA and copolymers yields were determined gravimetrically after drying the purified polymers at 48° C. under vacuum overnight. Polymer molecular weight was characterized using a high-throughput Symyx Rapid Gel Permeation Chromatography equipped with an evaporative light scattering detector (PL-ELS 1000) and polystyrene standards. Table 29 lists the yield and molecular weight data obtained for the polymers. From Table 29, it can be seen that the addition of MCAc prior to the addition of CHVE significantly reduced the molecular weight distribution of the copolymer.

TABLE 28

Chemical composition data used for the production of Copolymers 1 and 2.

| Block Copolymer | wt. of the polyVECFA reaction mixture (g) | wt. of methyl chloroacetate (g) | wt. of CHVE (g) | $[VECFA]_o:[CHVE]_o:$ $[BDDA]_o:[MCAc]_o:$ $[Et_{1.5}AlCl_{1.5}]_o$ | VECFA/CHVE wt. %/wt. % |
|---|---|---|---|---|---|
| Copolymer-1 | 3.5 | — | 0.543 | 400:1110:1:—:36 | 50/50 |
| Copolymer-2 | 3.5 | 0.583 | 0.543 | 400:1110:1:1380:36 | 50/50 |

TABLE 29

Monomer conversion, number average molecular weight (Mn), and molecular weight distribution data (MWD) obtained for polyVECFA and Copolymers 1, 2, and 3.

| Polymer | Conversion (%) | GPC $M_n$ | MWD |
|---|---|---|---|
| polyVECFA | 90 | 29,060 | 1.27 |
| Copolymer-1 | 99 | 62,610 | 2.42 |
| Copolymer-2 | 97 | 64,520 | 1.88 | ization was terminated after 17 hours by the addition of chilled methanol, which caused the polymer to precipitate. The polymer was isolated and washed multiple times with methanol using centrifugation. The purified polymer was collected as a viscous liquid after centrifuging at 4500 rpm at 21° C. for 5 minutes. Polymer yield was determined gravimetrically after drying the purified polymer at 48° C. under vacuum overnight. Polymer molecular weight was characterized using a high-throughput Symyx Rapid Gel Permeation Chromatography equipped with an evaporative light scattering detector (PL-ELS 1000) and polystyrene standards. Table 30 lists the monomer conversion and molecular weight data obtained for the two polymers.

TABLE 30

Compositional information and characterization data obtained for the polymerization of 4-VOBS.

| Polymer | wt. of 4-VOBS (g) | wt. of IBEA (mg) | wt. of toluene (g) | wt. of $Et_{1.5}AlCl_{1.5}$ (g) | $[VOBS]_o:[IBEA]_o:$ $[Et_{1.5}AlCl_{1.5}]_o$ | Conversion (%) | GPC Mn | MWD |
|---|---|---|---|---|---|---|---|---|
| polyVOBS-LMW | 3 | 6.35 | 15.75 | 0.353 | 200:1:18 | 80.5 | 18,470 | 1.25 |
| polyVOBS-HMW | 3 | 0.25 | 15.75 | 0.353 | 200:0.04:18 | 69 | 25,320 | 1.49 |

The thermal properties of Copolymer-2 were determined using differential scanning calorimetry (Q1000 from TA Instruments) by first heating the sample from −120° C. to 70° C. at a heating rate of 10° C./minute (1$^{st}$ heat), cooling from 70° C. to −120° C. at a cooling rate of 10° C./minute (cooling), and reheating from −120° C. to 120° C. at a heating rate 10° C./minute (2$^{nd}$ heat). The thermogram obtained from the 2$^{nd}$ heat showed two glass transitions at −94.4° C. and 44.2° C., and a very weak, diffuse melting transition with an enthalpy of melting of 1.27 J/g and a peak maximum at −34.9° C.

Example XXIV

Polymerization of 4-vinyloxybutyl soyate (4-VOBS) Monomer

Homopolymers of 4-VOBS were synthesized as follows: To a test tube dried by heating to 200° C. and partially submerged in a hexanes bath at 0° C. within a glove box, 4-VOBS, 1-isobutoxyethyl acetate (IBEA), and dry toluene were combined in the amounts listed in Table X. Each polymerization was initiated by the addition of ethylaluminum sesquichloride solution (25 wt. % in toluene). Each polymer- The thermal properties of polyVOBS-LMW (see Table 30) were determined using differential scanning calorimetry (Q1000 from TA Instruments) by first heating the sample from −120° C. to 50° C. at a heating rate of 10° C./minute (1$^{st}$ heat), cooling from 50° C. to −120° C. at a cooling rate of 10° C./minute (cooling), and reheating from −120° C. to 120° C. at a heating rate 10° C./minute (2$^{nd}$ heat). The thermogram obtained from the 2$^{nd}$ heat showed a glass transition at −92.3° C. and a very weak, diffuse melting transition with an enthalpy of melting of 11.3 J/g and a peak maximum at −29.8° C.

Figure 27:
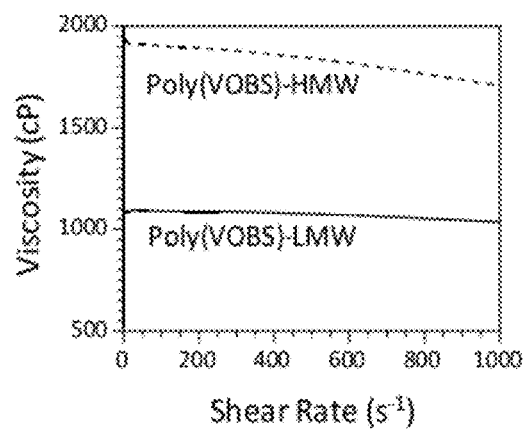
FIG. 27 shows a plot of viscosity as a function of shear rate for polyVOBS homopolymers at 25° C.

The rheological properties of the two polyVOBS samples were characterized using an ARES Rheometer from TA Instruments. A cone and plate configuration was used to determine the viscosity. The shear rate was varied from 0.1 sec$^{-1}$ to 1000 sec$^{-1}$ while temperature was held constant at 25° C. As shown in FIG. 27, the low shear viscosity of polyVOBS-LMW was 1088 centipoise, while that of polyVOBS-HMW was 1887 centipoise. As expected, the viscosity of higher molecular weight sample, polyVOBS-HMW, exhibited higher shear sensitivity.

Example XXV

Copolymer of VESFA and Maleic Anhydride Produced Using Free-Radical Polymerization A copolymer derived from VESFA and maleic anhydride (MA) was synthesized as follows: To a dry 20 ml glass vial inside a glove box, 8.75 g (25 mmol) of VESFA, 2.45 g (25 mmol) of MA, 80 mg of azobisisobutyronitrile (Sigma-Aldrich), and 60 mg of 2-mercaptoethanol were combined and mixed. The resulting solution was heated to 60° C. under stirring until it became a very viscous material (3 h). The reaction mixture was cooled to room temperature before 50 ml of methanol was added to produce a white solid precipitate, which was isolated by filtration. To purify the polymer, it was dissolved in chloroform (20 ml) and the solution dripped into a large excess of rapidly stirring methanol. The purified polymer was isolated by filtration and dried under vacuum. Yield: 6.1 g (55%). $^1$H NMR (δ, ppm): 5.33 (bs, 3H), 4.14 (bs, 2H), 3.92-3.29 (m, 5H), 2.77-2.73 (m, 1.3H), 2.27 (b, 2.66H), 2.04-2.00 (m, 4H), 1.56 (bs, 2.3H), 1.29-1.24 (m, 18.4H), 0.88 (bs, 3H). GPC ($M_n$, 6532, PDI, 1.62).

The thermal properties of the copolymer produced were determined using differential scanning calorimetry (DSC Q1000 from TA Instruments). The sample size was 2.06 mg. The sample was first cooled from room temperature to −90° C. at a cooling rate 10° C./min, heated from −90° C. to 120° C. at a heating rate 10° C./min (1$^{st}$ heating cycle), cooled down to −90° C. at cooling rate 10° C./min, and reheated from −90° C. to 120° C. at a heating rate of 10° C./min (2$^{nd}$ heating cycle). The thermogram obtained on the 2$^{nd}$ heating cycle displayed a single glass transition at 60° C.

Synthesis of 2-Hydroxyethyl 1-Propenyl Ether

In a 1 L round bottom flask, 70 g of potassium tert-butoxide and 300 mL of dimethyl sulfoxide were mixed together at room temperature. Then, 30 g of 2-allyloxyethanol was added using an addition funnel and the reaction temperature was set to 110° C. for 90 minutes. The mixture was cooled down to room temperature before adding 1 L of DI water. The product was extracted with hexane and diethyl ether (1:1 volume ratio). To dry the solution, MgSO4 was added to the mixture. After filtration of MgSO4, the product was recovered by vacuum stripping of the solvents. The product was then purified by vacuum distillation at 60° C. and 15 mmHg pressure. Yield—20 g (67%). $^1$H NMR (400 MHz, CDCl$_3$, TMS): δ (ppm) 5.95 (q, 1H, —OCH=CH—), 4.41 (m, 1H, —OCH=CH—), 3.82 (m, 2H, —CH$_2$O—), 3.75 (m, 2H, HOCH$_2$—), 2.32 (t, 1H, —OH). 1.56 (d, 3H, —CH$_3$). IR (neat, cm-1): 3371 ($v_{OH}$), 3043 ($v_{C-H}$), 2923, 2874 ($v_{CH2, CH3}$), 1670 ($v_{C=C}$), 1106 ($v_{C-O}$). $^{13}$C NMR (100 MHz, CDCl$_3$, TMS): δ (ppm) 145.5 (—OCH=), 101.8 (=CH—), 73.2 (—CH$_2$O—), 61.8 (HOCH$_2$—), 9.2 (—CH$_3$).

Synthesis of 2-(1-Propenyl)oxyethyl Soyate (POES)

POES was synthesized from 2-hydroxyethyl 1-propenyl ether and soybean oil as follows: 0.42 g of KOH was dried in an oven for 30 minutes at 140° C. to remove moisture. Then, 15 g of soybean oil, 15 g of 2-hydroxyethyl 1-propenyl ether, and the dried KOH were mixed together in a two neck round bottom flask and stirred for 3 hr at 70° C. The reaction mixture was cooled down to room temperature and then transferred to a 250 ml separating funnel. 100 ml of n-hexane was added to mixture the product extracted into the organic layer. The organic layer was washed with acidic DI water (pH 3-3.5) for twice, followed by multiple washings with DI water, and finally with a brine solution. The organic layer was dried with MgSO4 and the product isolated by vacuum stripping the volatiles. Yield: 13 g (81%). $^1$H NMR (400 MHz, CDCl$_3$, TMS): δ (ppm) 5.93 (dd, 1H, =CH—O—), 5.34 (m, 1.5H, CH$_2$—CH=CH—CH$_2$), 4.43 (q, 1H, CH$_3$—CH=), 4.24 (t, 2H, =CH—O—CH$_2$—CH$_2$—) 3.90 (t, 2H, =CH—O—CH$_2$—CH$_2$—), 2.76 (m, 1.5H, =CHCH$_2$CH=), 2.32 (t, 2H, —C=OCH$_2$—). 2.03 (m, 4H, —CH$_2$CH$_2$CH=) 1.57 (m, 5H, —CH$_3$—CH=, —C=OCH$_2$CH$_2$—), 1.29 (m, 18H, —CH$_2$CH$_2$CH$_2$—), 0.96-0.87 (m, 3H, —CHCH$_3$). IR (neat, cm-1): 3008 ($v_{C-H}$), 2925, 2854 ($v_{CH2,CH3}$), 1741 ($v_{C=O}$), 1669 ($v_{C=C}$), 1112 ($v_{C-O}$).

Synthesis of Poly(2-(1-Propenyl)oxyethyl Soyate) (polyPOES)

PolyPOES was synthesized as follows: First, POES was dried with MgSO$_4$ inside a glove box to remove trace amounts of moisture. All glassware used for the polymerization was baked at 200° C. Using a dry 40 ml glass vial, 1.00 g of POES and 3.5 mg of initiator (1-isobutoxyethyl acetate (IBEA)) were dissolved in 6 mL of dry toluene and chilled to 0° C. inside a glove box. The polymerization was initiated by the addition of 300 mL of the coinitiator, ethylaluminum sesquichloride solution (25 wt % in toluene) ([M]$_0$:[Et$_3$Al$_2$Cl$_3$]$_0$=200:40). The reaction was terminated after 17.5 h by the addition of 6 mL of chilled methanol. Termination of the reaction by methanol caused precipitation of the polymer. The polymer was isolated and washed four times with methanol. The purified polymer was collected as a viscous liquid after drying under vacuum (5-7 mm of Hg) overnight. $^1$H NMR (400 MHz, CDCl$_3$, TMS): δ (ppm) 5.36 (m, 1.5H, CH$_2$—CH=CH—CH$_2$), 4.24 (m, 2H, —CH—O—CH$_2$—CH$_2$—) 3.90 (m, 3H, —CH—O—CH$_2$—CH$_2$—, —OCH-(backbone)), 2.79 (m, 1.5H, =CHCH$_2$CH=), 2.30 (m, 2H, —C=OCH$_2$—). 2.03 (m, 4H, —CH$_2$CH$_2$CH=), 1.9-1.57 (m, —C=OCH$_2$CH$_2$—, —CHCH$_2$CH—), 1.29 (m, 18H, —CH$_2$CH$_2$CH$_2$—), 0.96-0.87 (m, 6H, —CH$_2$CH$_3$, —CH$_3$—CH-(backbone)). IR (neat, cm-1): 3008 ($v_{C-H}$), 2925, 2854 ($v_{CH2,CH3}$), 1740 ($v_{C=O}$), 1112 ($v_{C-O}$).

The thermal properties of the poly(POES) produced was determined using differential scanning calorimetry (DSC Q1000 from TA Instruments). The 6.2 mg specimen was first heated from room temp to 60° C. at a heating rate of 10° C./min (1st heat cycle), cooled from 60 to 130° C. at a cooling rate of 10° C./min (cooling cycle), and reheated from 120° C. to 100° C. at a heating rate 10° C./min (2nd heating cycle). The thermogram obtained from the 2$^{nd}$ heating cycle displayed glass transition temperature at −86° C. and a small, diffuse melting endotherm at −27° C.

The molecular weight and molecular weight distribution of the polymer were characterized using gel permeation chromatography. The number average molecular weight expressed relative to polystyrene standard was 16,000 g/mole and the molecular weight distribution was 1.28.

Example XXVI

The Influence of the Addition of a Lewis Base (i.e. Methyl chloroacetate) on Copolymerizations Involving VESFA Homopolymers of VESFA, CHVE, and TEGEVE, and their random copolymers were produced as follows: Prior to use, VESFA and TEGEVE were dried with magnesium sulfate inside a glove box. CHVE, methyl chloroacetate (MCAc), and toluene were distilled over calcium hydride before use. Dried monomer, co-monomer, initiator (i.e. 1-isobutoxyethyl acetate, IBEA), and MCAc were dissolved in dry toluene in a series of dry 40 ml vials and chilled to 0° C. Polymerizations were initiated by the addition of ethylaluminum sesquichloride solution (25 wt. % in toluene). The reactions were terminated after 17 hours by the addition of chilled methanol, which, with the exception of polymer 5 and 9, caused the polymers to precipitate. All polymers except polymer-5 to polymer-9 were isolated and washed multiple times with methanol using centrifugation. The purified polymers were collected as viscous liquids after centrifuging at 4500 rpm at 21° C. for 5 minutes. Polymer-5 to polymer-9 were isolated after rotary evaporation of all volatiles at a temperature of 48° C. and a pressure of 5-7 mm of Hg for 1 hour. Polymer yields were determined gravimetrically after drying all polymers at 48° C. under vacuum (5-7 mm of Hg) overnight. Polymer molecular weight was characterized using a high-throughput Symyx Rapid Gel Permeation Chromatography equipped with an evaporative light scattering detector (PL-ELS 1000) and polystyrene standards. Table 31 lists the compositions of the polymerization reaction mixtures produced.

98%) were mixed with a FlackTek mixer using 3500 rpm for 30 seconds. Then, hexahydro-4-methylphthalic anhydride (HHMPA, Aldrich, 96%, mixture of cis and trans) was added and the mixture mixed using 3500 rpm for 1 minute. Table 33 describes the chemical compositions of the coatings produced. Each liquid coating mixture was cast over two cold rolled steel Q-panels, two aluminum Q-panels, and one glass panel using a square draw down bar (BYK Gardner) to produce wet films about 200 microns in thickness. The films were then cured by heating at 100° C. in an air oven for 12 hours. A reference coating based on epoxidized soybean oil (Vikoflex-7170 from Arkema) was produced by mixing the epoxidized soybean oil (ESO) with DBU followed by the addition of HHMPA using the FlackTek mixer and cured by heating at 100° C. in an air oven for 12 hours. Cured coatings over metal substrates and glass panels were characterized by

TABLE 31

Composition of raw materials used to produce polymers and copolymers at a total polymerization time of 17 hours at 0° C.

| Polymer | wt. of VESFA (g) | wt. of CHVE ($M_2$), g | wt. of TEGEVE ($M_2$), g | wt. of IBEA (mg) | wt. of Toluene (g) | wt. of MCAc (g) | wt. of $Et_{1.5}AlCl_{1.5}$ (g) | $[VESFA]_o:[M_2]_o:[IBEA]_o:[MCAc]_o:[Et_{1.5}AlCl_{1.5}]_o$ | $[VESFA + M_2]_o/$ aliquot wt. %/vol. % |
|---|---|---|---|---|---|---|---|---|---|
| Polymer-1  | 1 | 1 | —  | 8.62 | 11.25 | —     | 0.48  | 53:147:1:—:18   | 13 |
| Polymer-2  | 1 | 1 | —  | 8.62 | 10.5  | 1.07  | 0.48  | 53:147:1:183:18 | 13 |
| Polymer-3  | 1 | 1 | —  | 8.62 | 5.42  | —     | 0.48  | 53:147:1:—:18   | 23 |
| Polymer-4  | 1 | 1 | —  | 8.62 | 4.67  | 1.07  | 0.48  | 53:147:1:183:18 | 23 |
| Polymer-5  | 1 | — | 1  | 6.22 | 10.96 | —     | 0.346 | 73:127:1:—:18   | 13 |
| Polymer-6  | 1 | — | 1  | 6.22 | 10.5  | 0.667 | 0.346 | 73:127:1:158:18 | 13 |
| Polymer-7  | 1 | — | 1  | 6.22 | 5.06  | —     | 0.346 | 73:127:1:—:18   | 24 |
| Polymer-8  | 1 | — | 1  | 6.22 | 4.6   | 0.667 | 0.346 | 73:127:1:158:18 | 24 |
| Polymer-9  | — | — | 1  | 3.92 | 2.74  | 0.667 | 0.218 | —:200:1:250:18  | 20 |
| Polymer-10 | 1 | — | —  | 2.28 | 3.32  | —     | 0.127 | 200:—:1:—:18    | 20 |
| Polymer-11 | — | 1 | —  | 6.34 | 2.33  | 1.07  | 0.353 | —:200:1:250:18  | 20 |

Monomer conversion, number average molecular weight relative to polystyrene standards (Mn), and molecular weight distribution data for the 11 polymerizations described in Table 31 are shown in Table 32. From the data shown in Table 32, it can be seen that copolymerization in the presence of MCAc resulted in narrower molecular weight distributions.

TABLE 32

Monomer conversion, number average molecular weight relative to polystyrene standards (Mn), and molecular weight distribution data for the 11 polymerizations described in Table 31.

| Polymer | Conversion (%) | GPC Mn | MWD |
|---|---|---|---|
| Polymer-1  | 90.5 | 13,850 | 1.6  |
| Polymer-2  | 91.5 | 13,050 | 1.36 |
| Polymer-3  | 93   | 13,170 | 1.5  |
| Polymer-4  | 91.3 | 11,550 | 1.42 |
| Polymer-5  | —    | 9,968  | 1.44 |
| Polymer-6  | —    | 9,817  | 1.41 |
| Polymer-7  | —    | 10,004 | 1.43 |
| Polymer-8  | —    | 9,783  | 1.4  |
| Polymer-9  | —    | 10,110 | 1.46 |
| Polymer-10 | 82.8 | 23,270 | 1.18 |
| Polymer-11 | 99.8 | 10,070 | 1.81 |

Example XXVII

Thermoset Coatings Based on PolyVESFA and an Anhydride Curing Agent

An example of the production of an anhydride-cured film produced from E-polyVESFA is as follows: E-polyVESFA and 1,8-diazabicyclo[5.4.0]undec-7-ene (BDU, Aldrich, 98%) were mixed with a FlackTek mixer using 3500 rpm for 30 seconds. Then, hexahydro-4-methylphthalic anhydride (HHMPA, Aldrich, 96%, mixture of cis and trans) was added and the mixture mixed using 3500 rpm for 1 minute. Table 33 describes the chemical compositions of the coatings produced.

MEK double rubs (ASTM D 5402-93), pencil hardness test (ASTM D 3363-00), Konig pendulum hardness test (ASTM D 4366-95), impact resistance test (ASTM D 2794-93), and mandrel bend test (ASTM D 522-90a). The properties obtained for the cured materials are shown in Table 34. From Table 34, it can be seen that the use of E-polyVESFA provided enhanced hardness and chemical resistance.

Cured films over the glass substrates were peeled off carefully and the viscoelastic properties of the free films were characterized using a TA800 dynamic mechanical thermal analyzer from TA Instruments. Temperature was ramped from 40° C. to 120° C. using a heating rate of 5° C./min, strain rate of 0.02%, and frequency of 1 Hz. The viscoelastic properties obtained for the cured materials are shown in Table 35. The data shown in Table 35 show dramatic enhancements in moduli and Tg with the use of E-polyVESFA as opposed to ESO.

Figure 28:
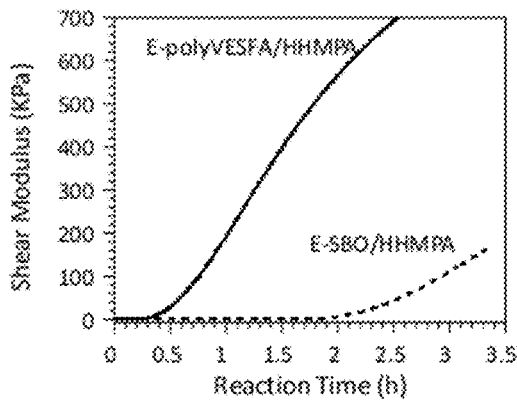
FIG. 28 shows a shear modulus as a function of time at 100° C. for a blend of E-polyVESFA and HHMPA as well as E-SBO and HHMPA. A 1/0.5 stoichiometry between the epoxy groups and anhydride groups was used.

The rate of crosslinked network formation was characterized by a dynamic time sweep using an ARES Rheometer (TA Instruments). A liquid mixture (Table 33) was placed in between the two parallel plates and heated for 3.5 hours at a constant frequency of 10 rad/s, strain rate of 1%, and temperature of 100° C. A 1/0.5 stoichiometry between the epoxy groups and anhydride groups was used. As shown in FIG. 28, the coatings based on E-polyVESFA showed a sharp increase in shear modulus after 20 minutes of reaction and shear modulus increased from 5.5 KPa to 567 KPa over the period of 2 hours while the reference coating based on E-SBO showed no increase in modulus until 2 hours at 100° C. These results indicate that E-polyVESFA develops a crosslinked network much faster than the analogous material based on E-SBO.

TABLE 33

Chemical composition of coatings based on E-polyVESFA or ESO and cured using HHMPA.

| Coatings ID | wt. of E-polyVESFA (g) | wt. of E-SBO (g) | wt. of HHMPA (g) | wt. of DBU (g) | Epoxides/ HHMPA wt. %/ wt. % |
|---|---|---|---|---|---|
| E-polyVESFA/HHMPA 1/1 | 10 | — | 5.8 | 0.237 | 63.3/36.7 |
| E-ESO/HHMPA 1/1 | — | 10 | 7.25 | 0.259 | 58/42 |
| E-polyVESFA/HHMPA 1/0.5 | 10 | — | 2.9 | 0.193 | 77.5/22.5 |
| E-ESO/HHMPA 1/0.5 | — | 10 | 3.63 | 0.204 | 73.4/26.6 |

TABLE 34

Properties of cured coatings described in Table 33.

| Coatings ID | Thickness (µm) | Pencil hardness | König pendulum hardness, sec. (glass substrate) | Reverse impact (in-lb) | MEK double rubs | Mandrel bend Test |
|---|---|---|---|---|---|---|
| E-polyVESFA/HHMPA 1/1 | 86 | 3H | 25 | 116 | 223 | Pass |
| E-ESO/HHMPA 1/1 | 83 | 1H | 15 | >172 | 58 | Too soft to measure |

TABLE 35

Thermal and viscoelastic properties of cured films.

| Cured film ID | Storage modulus (MPa), 25° C. | Storage modulus (MPa), 90° C. | $T_g$ (tan δ) |
|---|---|---|---|
| E-polyVESFA/HHMPA 1/1 | 92.9 | 17.2 | 30.6 |
| E-ESO/HHMPA 1/1 | 0.25 | 0.18 | −6.9 |

Example XXVIII

The Influence of the Addition of a Lewis Base (i.e. Methyl Acetate) on Block Copolymerizations Involving VESFA An A-B-A triblock copolymer possessing A blocks derived from CHVE and a B block based on VESFA was synthesized as follows: The reaction was carried out in a dry 40 ml vial partially submerged in a heptanes bath at 0° C. inside a dry box. In the reaction vial, 194 mg of a solution of BDDA in toluene (4.7 mg of BDDA in 189 mg of toluene) and 2.5 g of VESFA monomer ([VESFA]$_o$:[BDDA]$_o$=400:1) were dissolved in 13.125 g of toluene and the solution chilled to 0° C. The polymerization was started by the addition of 0.354 ml of ethylaluminum sesquichloride solution (25 wt. % in toluene) to the reaction mixture. After 25 hours of reaction, an aliquot (Composition-B) of known weight was terminated with methanol to determine the percent conversion of VESFA monomer, number average molecular weight, and molecular weight distribution of polyVESFA. Next, the remaining polymerization mixture was divided into two dry and previously chilled 40 ml vials labeled copolymer-4 and control polymer. Pre-chilled toluene and methyl acetate (MAc) were added to the copolymer-4 polymerization mixture and the control polymer polymerization mixture at the concentrations listed in Table 36 and mixed vigorously. Immediately after that, the second monomer, CHVE, was added to the copolymer-4 polymerization mixture and the reaction continued for 4 hours. For the Control polymer, no CHVE was added and the reaction continued for 4 hours. The copolymer-4 and control polymer were precipitated from the reaction mixture by the addition of 10 ml methanol and washed thrice with excess methanol. PolyVESFA, copolymer-4, and control polymer yields were determined gravimetrically after drying the purified polymers at 48° C. under vacuum overnight. Table 37 lists the monomer conversion, number average molecular weight relative to polystyrene standards (Mn), and molecular weight distributions (MWDs) of the polymers.

TABLE 36

Chemical composition of copolymer-4 and the control polymer.

| Polymer/co-polymer name | wt. of VESFA polymerization mixture (g) | wt. of methyl acetate (g) | wt. of toluene (g) | wt. of CHVE (g) | [VESFA]$_o$:[CHVE]$_o$: [BDDA]$_o$:[MAc]$_o$: [Et$_{1.5}$AlCl$_{1.5}$]$_o$ | VESFA/ CHVE wt. %/wt. % |
|---|---|---|---|---|---|---|
| Copolymer-4 | 3.5 | 0.212 | 0.949 | 0.181 | 400:370:1:740:36 | 75/25 |
| Control polymer | 3.5 | 0.212 | 0.949 | — | 400:—:1:740:36 | 100/0 |

TABLE 37

Monomer conversion, number average molecular weight relative to polystyrene standards (Mn), and molecular weight distributions (MWDs) of the polymers described.

| Polymer | Conversion (%) | GPC $M_n$ | MWD |
|---|---|---|---|
| polyVESFA | 89 | 36,590 | 1.26 |
| Copolymer-4 | 98 | 50,800 | 1.33 |
| Control polymer | 89 | 36,980 | 1.25 |

Example XXIX

Properties of Copolymers Produced from VESFA and TEGEVE

The water solubility of the six different copolymers based on VESFA and TEGEVE was investigated using the thin film method. Following this method, various amounts of copolymer were dissolved in acetone solution of Nie Red dye (9-diethylamino-5-benzo[α]phenoxazinone) (3 mL, 0.2 mg/mL). The actual amount of polymer sample was varied in order to produce a series of resulting aqueous solutions of polymer with concentration range $1\times10^{-5}$-0.2% w/w. The solvent was removed by rotary evaporation at 30° C. for 1 hour to obtain a solid dye/polymer matrix. Residual acetone remaining in the dye/polymer matrix was evaporated until constant weight of sample was reached. The resultant thin film was hydrated with Millipore water (20 mL). Temperature of Millipore water was kept at either 25 or 37° C. To allow sufficient hydration, mixture was stirred at 500 rpm for 24 hours at 25 or 37° C. Before examining solutions, all unincorporated dye crystals were removed by filtration through 0.45 and 0.2 μm PTFE filters. The results showed that Copolymer1 and Copolymer2 were essentially insoluble in water while the solubilities for Copolymer3, Copolymer4, Copolymer5, and Copolymer6 were 0.01, 0.30, 0.20, and 0.30, respectively.

For Copolymer2, Copolymer3, Copolymer4, Copolymer5, and Copolymer6, surface tension measurements of aqueous solutions were measured by drop shape analysis on a pendant drop produced with a Contact Angle/Surface Tension Analyzer from First Ten Angstroms (FTÅ125). Measurements were carried out at room temperature on polymer solutions of varying concentration ($1\times10^{-5}$-0.2% w/w). All glassware was washed in a 1 N NaOH bath and thoroughly rinsed with acetone and Millipore water before use. Surface tensions at maximum solubility in water were determined to be 71.4, 61.2, 40.1, 39.5, and 39.2 mN/m for Copolymer2, Copolymer3, Copolymer4, Copolymer5, and Copolymer6, respectively. These results show that the copolymers possessing a TEGEVE content of 50 weight percent or higher were highly surface active.

Figure 29:
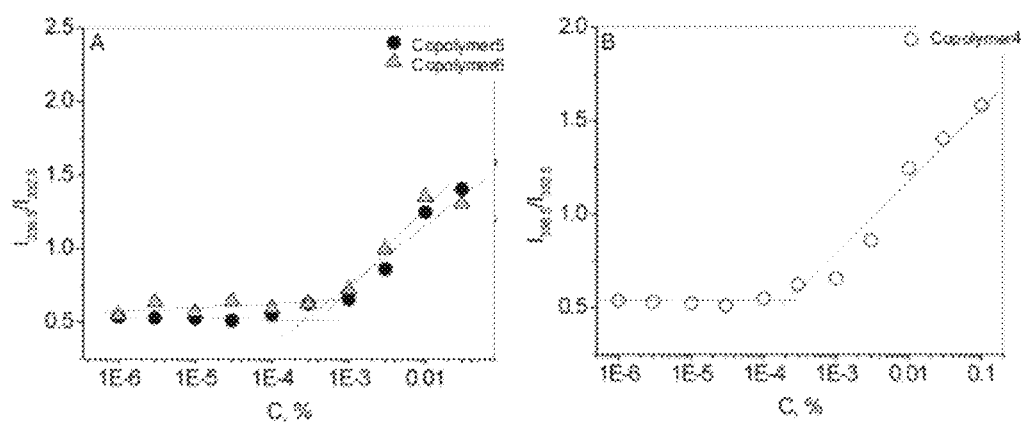
FIG. 29 shows fluorescence data used to determine CMC for Copolymer4, Copolymer5, and Copolymer6.

For Copolymer4, Copolymer5, and Copolymer6, the critical micelle concentration (CMC) was measured using fluorescence spectroscopy. Each sample was prepared by adding the 20 μL pyrene solution ($5\times10^{-4}$ mol/L) into an empty vial, evaporating the acetone for 2 h at room temperature, adding the copolymer solution (20 mL) and stirring the solution for at least 24 h. The final pyrene concentration in solution was $5\times10^{-7}$ mol/L which is slightly below the pyrene saturation concentration in water at room temperature. For fluorescence measurements, the solution (ca. 3 mL) was placed in a 1.0× 1.0 cm² cell. All spectra were taken using a Fluoromax-3 Fluorescence Spectrometer (Jobin Yvon Horiba) with 90° geometry and a slit opening of 0.5 nm. For fluorescence excitation spectra, $\lambda_{em}$=390 nm was used. Spectra were recorded with an integration time of 0.5 nm/s. FIG. 29 shows fluorescence intensity as a function of copolymer concentration. From the data, CMC for Copolymer4, Copolymer5, and Copolymer6 were determined to be $5\times10^{-4}$, $7\times10^{-4}$, and $3\times10^{-4}$ wt./vol. %, respectively.

ADDITIONAL REFERENCES

Eckey et al., J. Am. Oil Chemist's Soc., 32(4):185 (1955)
Teeter et al., J. Am. Oil Chemist's Soc., 40(4):143-156 (1963)
U.S. Pat. No. 2,692,256 (Bauer et al., 1951)
Brekke et al., J. Am. Oil Chemist's Soc., 37(11):568-570 (1963)
Dufek et al., J. Am. Oil Chemist's Soc., 37:37-40 (1960)
Teeter et al., Ind. Eng. Chem., 5o(11):1703-1704 (1958)
Teeter et al., J. Am. Oil Chemist's Soc., 33:399-404 (1956)
Schneider et al., J. Am. Oil Chemist's Soc., 34(5):244-247 (1957)
Gast et al., J. Org. Chem., 42:160-165 (1958)
Gast et al., J. Am. Oil Chemist's Soc., 37:78-80 (1959)
Dufek et al., J. Am. Oil Chemist's Soc., 39:238-241 (1961)
Schneider et al., J. Am. Oil Chemist's Soc., 39:241-244 (1961)

The complete disclosures of all patents, patent applications including provisional patent applications, and publications, and electronically available material cited herein are incorporated by reference. The foregoing detailed description and examples have been provided for clarity of understanding only. No unnecessary limitations are to be understood therefrom. The invention is not limited to the exact details shown and described; many variations will be apparent to one skilled in the art and are intended to be included within the invention defined by the claims.

What is claimed is:

1. A polymer comprising:
   at least one vinyl ether monomer unit, wherein the vinyl ether monomer has the structure

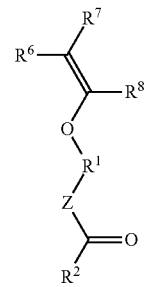

wherein $R^1$ is a divalent organic group; Z is a heteroatom selected from O, N or S; $R^2$ comprises an aliphatic group derived from a plant oil and is heterogeneous such that each $R^2$ independently comprises a saturated or unsaturated aliphatic group and at least one $R^2$ comprises an unsaturated aliphatic group comprising one, two or three double bonds; and $R^6$, $R^7$, and $R^8$ are each independently H or alkyl; and
   an organic initiator fragment from a carbonyl-containing initiator compound; wherein the polymer has a polydispersity index of less than 1.6.

2. The polymer of claim 1 wherein the vinyl ether monomer comprises vinyl ether soybean fatty acid esters (VESFA).

3. The polymer of claim 1 wherein the vinyl ether monomer comprises esters of stearic acid, oleic acid, linoleic acid, palmitic acid and linolenic acid.

4. The polymer of claim 1 which is a polymer of vinyl ether soybean fatty acid esters (polyVESFA).

5. The polymer of claim 1 which is a copolymer, the polymer further comprising a comonomer comprising a vinylether monomer.

6. The polymer of claim 1 which is a copolymer, the polymer further comprising a comonomer comprising a vinylether polyethyleneglycol monomer, a tri(ethylene glycol) ethyl vinyl ether monomer, a cyclohexyl vinyl ether monomer, or a styrene monomer.

* * * * *